United States Patent
Nakai et al.

(10) Patent No.: US 8,843,885 B2
(45) Date of Patent: Sep. 23, 2014

(54) PROGRAM CREATION SUPPORT DEVICE

(75) Inventors: Satoru Nakai, Tokyo (JP); Tomonori Sato, Tokyo (JP); Naoki Nakamura, Tokyo (JP); Terumasa Yasui, Tokyo (JP); Hirofumi Kai, Tokyo (JP); Hiroaki Onishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 4 days.

(21) Appl. No.: 13/503,747

(22) PCT Filed: Aug. 24, 2010

(86) PCT No.: PCT/JP2010/064244
§ 371 (c)(1),
(2), (4) Date: Apr. 24, 2012

(87) PCT Pub. No.: WO2011/080945
PCT Pub. Date: Jul. 7, 2011

(65) Prior Publication Data
US 2012/0222001 A1    Aug. 30, 2012

(30) Foreign Application Priority Data

Dec. 28, 2009   (JP) .................................. 2009-296780

(51) Int. Cl.
*G06F 9/44* (2006.01)
(52) U.S. Cl.
USPC ............ 717/110; 717/124; 717/126; 717/170
(58) Field of Classification Search
None
See application file for complete search history.

(56) References Cited

U.S. PATENT DOCUMENTS

| 4,870,575 | A  | * | 9/1989 | Rutenberg | 716/136 |
|---|---|---|---|---|---|
| 5,237,652 | A  | * | 8/1993 | McManus | 715/839 |
| 5,752,033 | A  |   | 5/1998 | Suda et al. | |
| 7,272,825 | B2 | * | 9/2007 | Inoue et al. | 717/126 |
| 7,275,236 | B1 | * | 9/2007 | Kabe | 717/106 |
| 7,536,590 | B2 | * | 5/2009 | Okeda et al. | 714/11 |

(Continued)

FOREIGN PATENT DOCUMENTS

| CN | 1677290 A | 10/2005 |
|---|---|---|
| CN | 101169646 A | 4/2008 |

(Continued)

OTHER PUBLICATIONS

International Search Report issued Oct. 5, 2010 in PCT/JP2010/064244.

(Continued)

*Primary Examiner* — Don Wong
*Assistant Examiner* — Roberto E Luna
(74) *Attorney, Agent, or Firm* — Oblon, Spivak, McClelland, Maier & Neustadt, L.L.P.

(57) ABSTRACT

A program creation support device includes a program component creating, upon a user setting a content of a reuse parameter corresponding to each program element, a program in accordance with the set content, and a program component holding unit editing the program by reuse of that. The program component includes a program element creating, upon a plurality of parameters being enumerated and set in the reuse parameter, a program in which a plurality of elements corresponding to respective parameters are combined. The program creation support device can reduce efforts in the selection and combination of program components for creating a program conforming to predetermined specifications, to thereby enhance the efficiency of creating a program.

9 Claims, 50 Drawing Sheets

(56) References Cited

U.S. PATENT DOCUMENTS

| | | | |
|---|---|---|---|
| 8,079,027 B2 * | 12/2011 | Fong et al. | 717/170 |
| 2005/0228629 A1 * | 10/2005 | Dalton | 703/16 |
| 2006/0155889 A1 * | 7/2006 | Furushima et al. | 710/8 |
| 2006/0253838 A1 * | 11/2006 | Fujii | 717/124 |

FOREIGN PATENT DOCUMENTS

| | | | |
|---|---|---|---|
| JP | 03-109603 A | | 5/1991 |
| JP | 7-49651 | | 2/1995 |
| JP | 7-49651 A | | 2/1995 |
| JP | 07049651 A | * | 2/1995 |
| JP | 7-311606 A | | 11/1995 |
| JP | 8-221107 | | 8/1996 |
| JP | 9-282015 A | | 10/1997 |
| JP | 09282015 A | * | 10/1997 |
| JP | 11-338514 A | | 12/1999 |
| JP | 2002-229612 | | 8/2002 |
| JP | 2002-229612 A | | 8/2002 |
| JP | 2002229612 | * | 8/2002 |
| JP | 2005-92808 A | | 4/2005 |
| JP | 2008204237 | * | 4/2008 |
| JP | 2008-204237 A | | 9/2008 |
| JP | 4302146 B2 | | 5/2009 |
| WO | WO 2005/101147 A1 | | 10/2005 |

OTHER PUBLICATIONS

"GX Developer Version 8 Operating Manual", Mitsubishi Electric Corporation, Manual No. SH-080356, Apr. 2009, 3 pages.

"High Productivity High Accuracy Easy Operability Mitsubishi CNC" Mitsubishi CNC, IB-1500035-F, Mar. 2007.

"High Productivity High Accuracy Easy Operability Mitsubishi CNC" Mitsubishi CNC, IB-1500035-F, Aug. 2007.

International Preliminary Report on Patentability and Written Opinion issued Aug. 23, 2012 in PCT/JP2010/064244, filed Aug. 24, 2010, with English language translation.

"High Productivity High Accuracy Easy Operability Mitsubishi CNC" Mitsubishi CNC, IB-1500000-F, Aug. 2007.

Office Action issued Jul. 16, 2013 in Japanese Patent Application No. 2011-547356 (with partial English translation).

Office Action in Taiwanese Patent Application No. 099137909, issued Dec. 16, 2013 (with partial English translation).

GX Developer Version 8 Operating Manual, Mitsubishi Electric Corporation, Manual No. SH-080356, Mar. 2003.

Office Action issued Apr. 10, 2014 in Chinese Patent Application No. 201080053863.5 (with English Translation).

* cited by examiner

FIG. 3

PROGRAM COMPONENT DEFINITION SCREEN

DEFINITION OF REUSE PARAMETER :

| No. | ENUMERATION | REUSE PARAMETER | DESCRIPTION |
|---|---|---|---|
| — | | | PROGRAM COMMENT (CHARACTER STRING) |
| — | | | JUMP LABEL (PROGRAM POINTER) |
| 1 | * | VB1 | SELF-HOLDING COMMAND CONDITION (RELAY STRING) |
| 2 | * | VB2 | SELF-HOLDING CANCELLATION CONDITION (RELAY STRING) |
| 3 | | VB3 | SELF-HOLDING OUTPUT (RELAY) |
| 4 | | | |

PROGRAM COMPONENT NAME : SELF-HOLDING PROCESS

F I G. 4
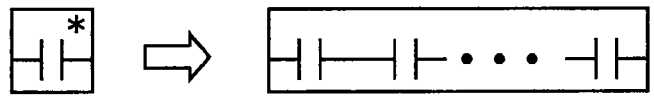
F I G. 5
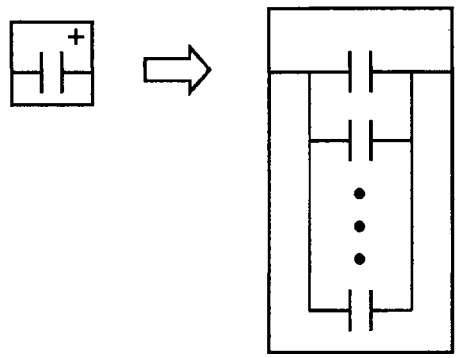
F I G. 6
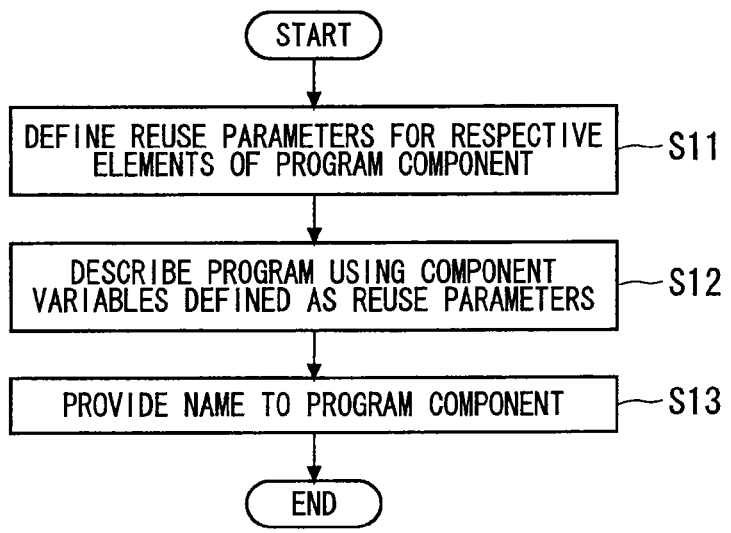

```
;START OF SPINDLE FORWARD ROTATION
P3
LD      M3
OR      Y1898
ANI     M4
ANI     M19
OUT     Y1898
RET
;END OF SPINDLE FORWARD ROTATION
```

FIG. 10

PROGRAM COMPONENT REUSE SCREEN

PROGRAM COMPONENT NAME : SELF-HOLDING PROCESS

APPLICATION OF REUSE PARAMETER :

| No. | ENUMERATION | DESCRIPTION | REUSE PARAMETER |
|---|---|---|---|
| - | | PROGRAM COMMENT (CHARACTER STRING) | SPINDLE FORWARD ROTATION |
| - | | JUMP LABEL (PROGRAM POINTER) | P3 |
| 1 | * | SELF-HOLDING COMMAND CONDITION (RELAY STRING) | M3 |
| 2 | * | SELF-HOLDING CANCELLATION CONDITION (RELAY STRING) | M4, M19 |
| 3 | | SELF-HOLDING OUTPUT (RELAY) | Y1898 |

APPLY

FIG. 12

| PROGRAM COMPONENT REUSE SCREEN | | |
|---|---|---|
| PROGRAM COMPONENT NAME : SELF-HOLDING PROCESS ▶ | | |
| APPLICATION OF REUSE PARAMETER : | | |

| No. | ENUMERATION | DESCRIPTION | REUSE PARAMETER |
|---|---|---|---|
| – | | PROGRAM COMMENT (CHARACTER STRING) | SPINDLE ORIENTATION |
| – | | JUMP LABEL (PROGRAM POINTER) | |
| 1 | * | SELF-HOLDING COMMAND CONDITION (RELAY STRING) | M19, XC18 |
| 2 | * | SELF-HOLDING CANCELLATION CONDITION (RELAY STRING) | M3, M4 |
| 3 | | SELF-HOLDING OUTPUT (RELAY) | Y189E |

[APPLY]

| DEVICE | COMMENTS |
|---|---|
| P3 | SELF-HOLDING PROCESS JUMP LABEL |
| M3 | SELF-HOLDING PROCESS SELF-HOLDING COMMAND CONDITION |
| M4 | SELF-HOLDING PROCESS SELF-HOLDING CANCELLATION CONDITION |
| M19 | SELF-HOLDING PROCESS SELF-HOLDING CANCELLATION CONDITION |
| Y1898 | SELF-HOLDING PROCESS SELF-HOLDING OUTPUT |

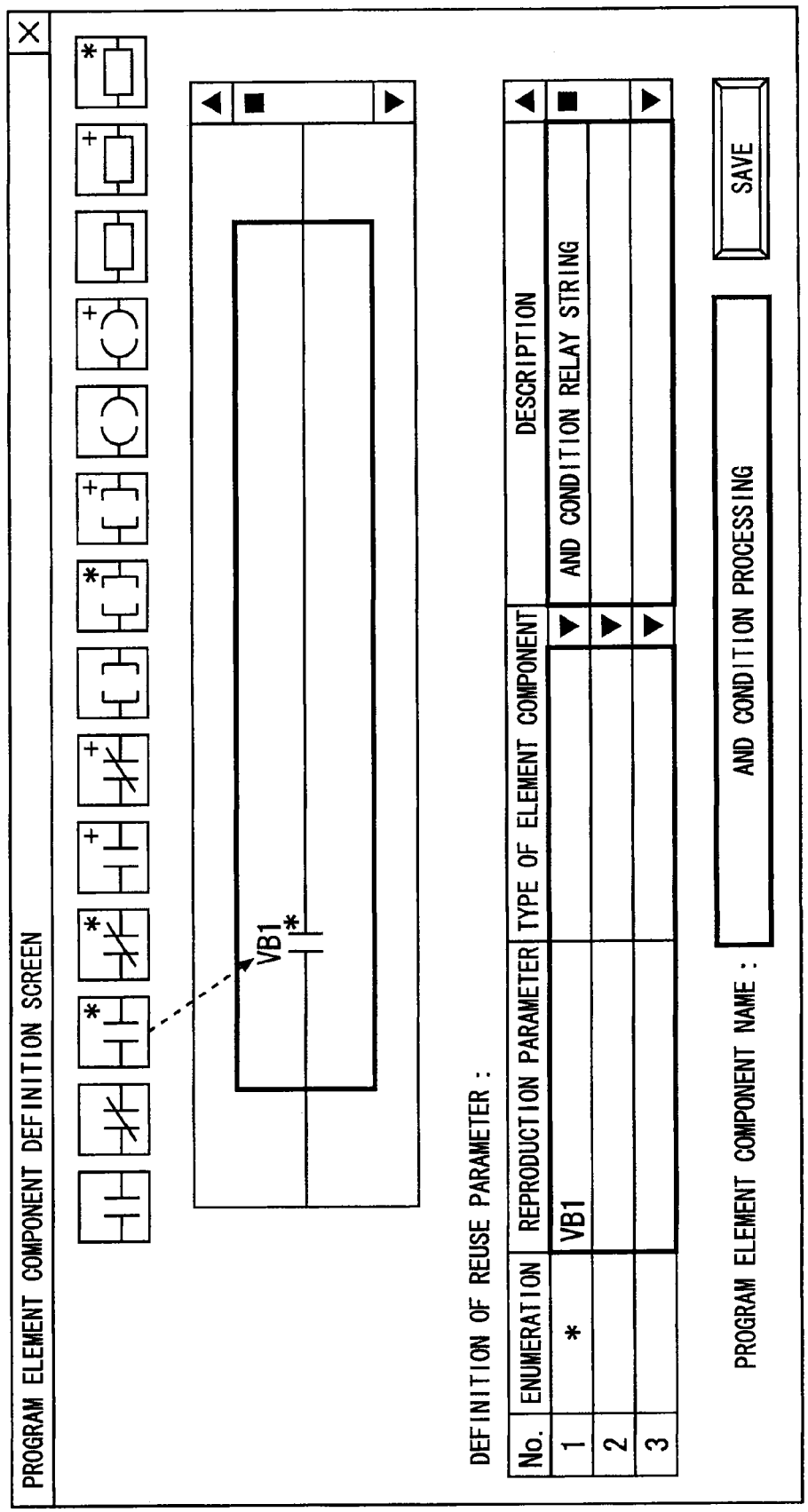

F I G . 1 8

PROGRAM COMPONENT DEFINITION SCREEN

(YC1E)

VE1

DEFINITION OF REUSE PARAMETER :

| No. | ENUMERATION | REPRODUCTION PARAMETER | TYPE OF ELEMENT COMPONENT | DESCRIPTION |
|---|---|---|---|---|
| – | | | | PROGRAM COMMENT (CHARACTER STRING) |
| – | | | | JUMP LABEL (PROGRAM POINTER) |
| 1 | + | VE1 | AND CONDITION PROCESSING | OR CONDITION (AND CONDITION PROCESS PROGRAM ELEMENT COMPONENT STRING) |
| 2 | | | | |
| 3 | | | | |

PROGRAM COMPONENT NAME :    M CODE COMPLETION PROCESS

SAVE

FIG. 19

PROGRAM COMPONENT REUSE SCREEN

PROGRAM COMPONENT NAME : [ M CODE COMPLETION PROCESS ▶ ]

APPLICATION OF REUSE PARAMETER :

| No. | ENUMERATION | DESCRIPTION | TYPE OF ELEMENT COMPONENT | REPRODUCTION PARAMETER |
|---|---|---|---|---|
| — | — | PROGRAM COMMENT (CHARACTER STRING) | | |
| — | — | JUMP LABEL (PROGRAM POINTER) | | |
| 1 | + | OR CONDITION (AND CONDITION PROCESS PROGRAMM ELEMENT COMPONENT STRING) | AND CONDITION PROCESSING | EXPAND |
| 1 | | OR CONDITION (AND CONDITION PROCESS PROGRAMM ELEMENT COMPONENT STRING) | AND CONDITION PROCESSING | |
| 2 | | OR CONDITION (AND CONDITION PROCESS PROGRAMM ELEMENT COMPONENT STRING) | AND CONDITION PROCESSING | EXPAND |

[ ADDITION OF ROW ]  [ DELETION OF ROW ]  [ APPLY ]

FIG. 20

| PROGRAM ELEMENT COMPONENT REUSE SCREEN | | | |
|---|---|---|---|
| PROGRAM ELEMENT COMPONENT NAME : AND CONDITION PROCESSING (1) ▶ | | | |
| APPLICATION OF REUSE PARAMETER : | | | |
| No. | ENUMERATION | DESCRIPTION | TYPE OF ELEMENT COMPONENT | REUSE PARAMETER |
| 1 | * | AND CONDITION RELAY STRING | | M3 |
| ADDITION OF ROW | DELETION OF ROW | | APPLY |

FIG. 21

PROGRAM ELEMENT COMPONENT REUSE SCREEN

PROGRAM ELEMENT COMPONENT NAME : [ AND CONDITION PROCESSING (2) ▶ ]

APPLICATION OF REUSE PARAMETER :

| No. | ENUMERATION | DESCRIPTION | TYPE OF ELEMENT COMPONENT | REUSE PARAMETER ◀ ▶ |
|---|---|---|---|---|
| 1 | * | AND CONDITION RELAY STRING | | M19, X188E |

[ ADDITION OF ROW ] [ DELETION OF ROW ]

[ APPLY ]

F I G . 2 2
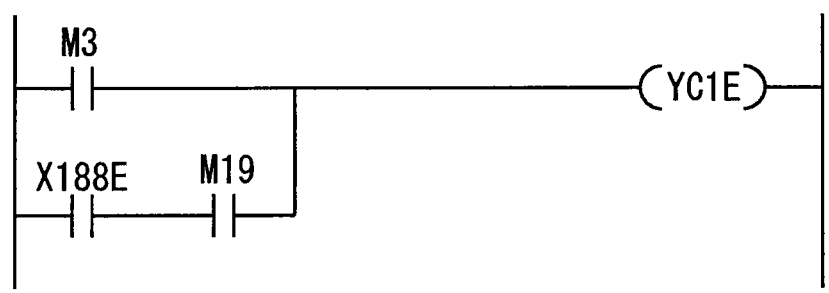

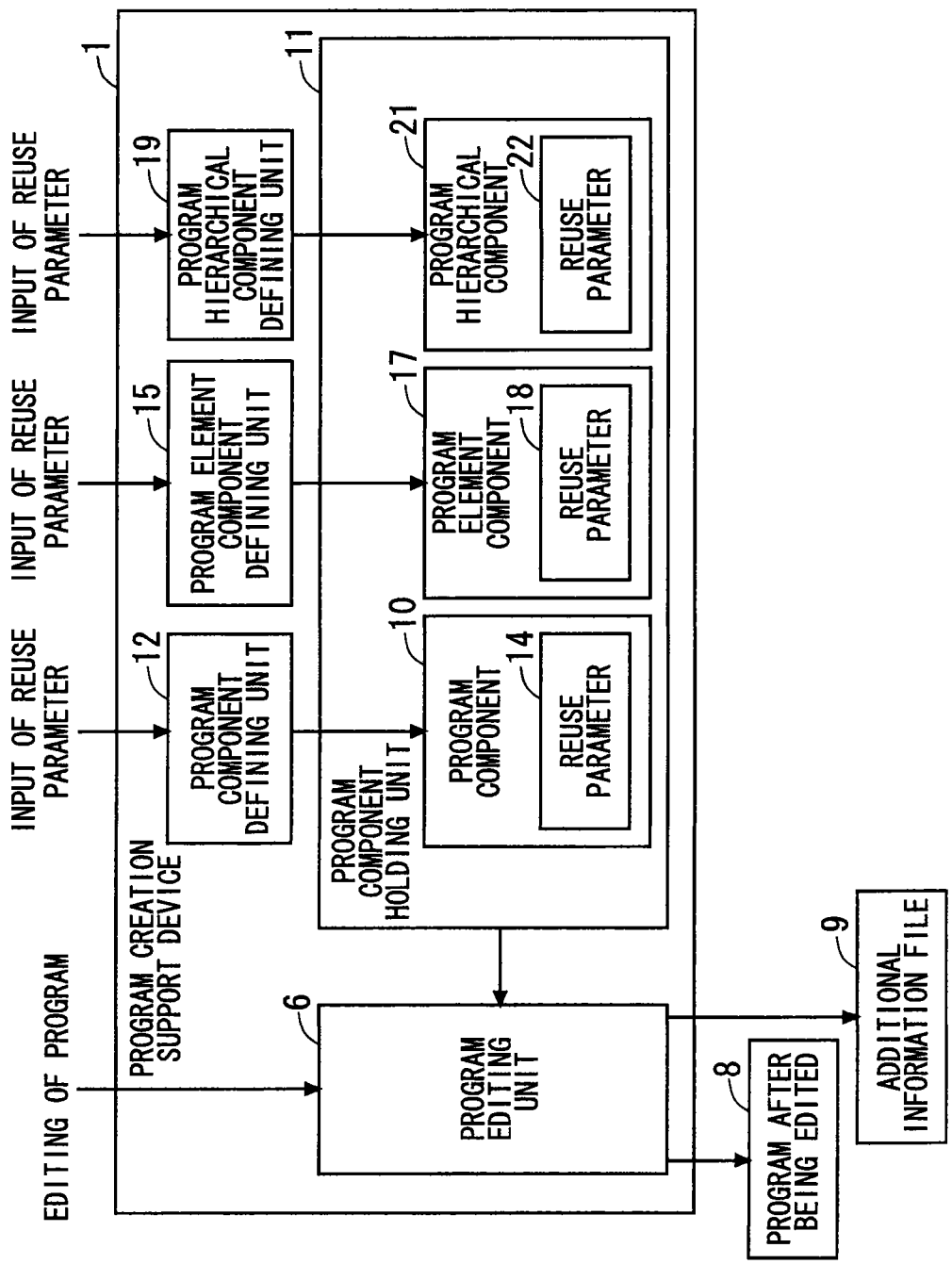

FIG. 25

| PROGRAM HIERARCHICAL COMPONENT DEFINITION SCREEN | | | | | |
|---|---|---|---|---|---|

PROGRAM COMPONENT ORDER:

[SELF-HOLDING PROCESS]
[NUMERICAL VALUE SETTING PROCESS]

SELF-HOLDING PROCESS
M CODE DECODING PROCESS
NUMERICAL VALUE SETTING PROCESS

APPLICATION OF REUSE PARAMETER:

| No. | ENUMERATION | DESCRIPTION | TYPE OF ELEMENT COMPONENT | REUSE PARAMETER |
|---|---|---|---|---|
| – | | PROGRAM COMMENT (CHARACTER STRING) | | |
| – | | JUMP LABEL (PROGRAM POINTER) | | |
| 1 | * | SELF-HOLDING COMMAND CONDITION (RELAY STRING) | | VB@ |
| 2 | * | SELF-HOLDING CANCELLATION CONDITION (RELAY STRING) | | VB@! |
| 3 | | SELF-HOLDING OUTPUT (RELAY) | | VM@ |

DEFINITION OF REUSE PARAMETER:

| No. | ENUMERATION | REUSE PARAMETER | DESCRIPTION |
|---|---|---|---|
| – | | | PROGRAM COMMENT (CHARACTER STRING) |
| – | | | JUMP LABEL (PROGRAM POINTER) |
| 1 | ☑ | VB | COMMAND (RELAY STRING) |
| 2 | ☑ | VK | SETTING NUMERICAL VALUE (NUMERICAL VALUE/REGISTER STRING) |
| 3 | ☑ | VM | INTERNAL LOCAL (RELAY STRING) |
| 4 | ☐ | VD | SETTING DESTINATION (REGISTER) |

PROGRAM HIERARCHICAL COMPONENT NAME: EXCLUSIVE SELECTION NUMERICAL VALUE SETTING

[SAVE]

FIG. 26

| PROGRAM HIERARCHICAL COMPONENT DEFINITION SCREEN | | | | | ✕ |
|---|---|---|---|---|---|

PROGRAM COMPONENT ORDER :

[SELF-HOLDING PROCESS]
[NUMERICAL VALUE SETTING PROCESS]

<<  ↑  ↓  DELETE

SELF-HOLDING PROCESS
M CODE DECODING PROCESS
NUMERICAL VALUE SETTING PROCESS

APPLICATION OF REUSE PARAMETER :

| No. | ENUMERATION | DESCRIPTION | TYPE OF ELEMENT COMPONENT | REUSE PARAMETER |
|---|---|---|---|---|
| – | | PROGRAM COMMENT (CHARACTER STRING) | | |
| – | | JUMP LABEL (PROGRAM POINTER) | | |
| 1 | * | NUMERICAL VALUE SPECIFICATION COMMAND (RELAY) | | VM@ |
| 2 | * | SETTING NUMERICAL VALUE (NUMERICAL VALUE/REGISTER) | | VK@ |
| 3 | | SETTING DESTINATION (REGISTER) | | VD |

DEFINITION OF REUSE PARAMETER :

| No. | ENUMERATION | REUSE PARAMETER | DESCRIPTION |
|---|---|---|---|
| – | | | PROGRAM COMMENT (CHARACTER STRING) |
| – | | | JUMP LABEL (PROGRAM POINTER) |
| 1 | ☑ | VB | COMMAND (RELAY STRING) |
| 2 | ☑ | VK | SETTING NUMERICAL VALUE (NUMERICAL VALUE/REGISTER STRING) |
| 3 | ☑ | VM | INTERNAL LOCAL (RELAY STRING) |
| 4 | ☐ | VD | SETTING DESTINATION (REGISTER) |

PROGRAM HIERARCHICAL COMPONENT NAME : [EXCLUSIVE SELECTION NUMERICAL VALUE SETTING]   [SAVE]

PROGRAM HIERARCHICAL COMPONENT REUSE SCREEN

PROGRAM HIERARCHICAL COMPONENT NAME : | EXCLUSIVE SELECTION NUMERICAL VALUE SETTING ▶ |

APPLICATION OF REUSE PARAMETER :

| No. | ENUMERATION | DESCRIPTION | REPRODUCTION PARAMETER |
|---|---|---|---|
| – | | PROGRAM COMMENT (CHARACTER STRING) | CUTTING OVERRIDE SETTING SWITCH |
| – | | JUMP LABEL (PROGRAM POINTER) | |
| 1 | ✓ | COMMAND (RELAY STRING) | X285, X286, X287, X288 |
| 2 | ✓ | SETTING NUMERICAL VALUE (NUMERICAL VALUE/REGISTER STRING) | 25, 50, 75, 100 |
| 3 | ✓ | INTERNAL LOCAL (RELAY STRING) | M4002, M4003, M4004, M4005 |
| 4 | | SETTING DESTINATION (REGISTER) | R2500 |

APPLY

FIG. 35

| NAME | DEVICE ADDRESS |
|---|---|
| . . . | . . . |
| M CODE STROBE | XC60 |
| . . . | . . . |
| JOG | YC00 |
| HANDLE | YC01 |
| . . . | . . . |
| MEMORY | YC08 |
| . . . | . . . |
| SINGLE BLOCK | YC12 |
| . . . | . . . |
| DRY RUN | YC15 |
| . . . | . . . |
| COMPLETION OF MOVEMENT INSTRUCTION | XC18 |
| . . . | . . . |
| COMPLETION OF M CODE | YC1E |
| . . . | . . . |
| M CODE DATA | R504 |
| . . . | . . . |
| CUTTING OVERRIDE | R2500 |
| . . . | . . . |

FIG. 38

CONTROL PANEL SPECIFICATION SETTING SCREEN

| | SWITCH TYPE | | SWITCH OPERATION | | SWITCH INPUT |
|---|---|---|---|---|---|
| 1 | MODE REVERSE | ▶ | SINGLE BLOCK | ▶ | X280 |
| 2 | MODE REVERSE | ▶ | DRY RUN | ▶ | X281 |
| 3 | OPERATION MODE SELECTION | ▶ | JOG | ▶ | X282 |
| 4 | OPERATION MODE SELECTION | ▶ | HANDLE | ▶ | X283 |
| 5 | OPERATION MODE SELECTION | ▶ | MEMORY | ▶ | X284 |
| 6 | CUTTING OVERRIDE | ▶ | 25 | ▶ | X285 |
| 7 | CUTTING OVERRIDE | ▶ | 50 | ▶ | X286 |
| 8 | CUTTING OVERRIDE | ▶ | 75 | ▶ | X287 |
| 9 | CUTTING OVERRIDE | ▶ | 100 | ▶ | X288 |
| 10 | | | | | |

FIG. 39

M CODE SPECIFICATION SETTING SCREEN

| | M CODE | FUNCTION NAME | START OF FUNCTION | | CANCELLATION OF FUNCTION | OUTPUT OF FUNCTION | COMPLETION OF FUNCTION |
|---|---|---|---|---|---|---|---|
| 1 | M3 | SPINDLE FORWARD ROTATION | SIMULTANEOUSLY WITH BLOCK START | ▶ | M4 , M5 | Y1898 | X188D |
| 2 | M4 | SPINDLE REVERSE ROTATION | SIMULTANEOUSLY WITH BLOCK START | ▶ | M3 , M5 | Y1899 | X188D |
| 3 | M5 | SPINDLE STOP | SIMULTANEOUSLY WITH BLOCK START | ▶ | | YC1A | X188C |
| 4 | M30 | END OF DATA | AFTER COMPLETION OF BLOCK AXIS MOVEMENT | ▶ | | | |
| 5 | | | | ▶ | | | |
| 6 | | | | | | | |

FIG. 41

PROGRAM COMPONENT DEFINITION SCREEN

```
      VB1
  ──| |──[ = VD2  VK3 ]──( VB4 )──
```

DEFINITION OF PARAMETER:

| No. | ENUMERATION | REUSE PARAMETER | DESCRIPTION |
|---|---|---|---|
| - | | | PROGRAM COMMENT (CHARACTER STRING) |
| - | | | JUMP LABEL (PROGRAM POINTER) |
| 1 | | VB1 | M CODE STROBE (RELAY) |
| 2 | | VD2 | M CODE DECODING TARGET (REGISTER) |
| 3 | | VK3 | M CODE VALUE (NUMERICAL VALUE) |
| 4 | | VB4 | OUTPUT OF M CODE DECODING RESUTLS (RELAY) |

PROGRAM COMPONENT NAME: M CODE DECODING

SAVE

FIG. 42

PROGRAM COMPONENT DEFINITION SCREEN

DEFINITION OF PARAMETER :

| No. | ENUMERATION | REUSE PARAMETER | DESCRIPTION |
|---|---|---|---|
| - | | | PROGRAM COMMENT (CHARACTER STRING) |
| - | | | JUMP LABEL (PROGRAM POINTER) |
| 1 | * | VB1 | AND CONDITIONS (ENUMERATION OF RELAY) |
| 2 | | VB2 | OUTPUT (RELAY) |

PROGRAM COMPONENT NAME : AND CONDITION PROCESSING

SAVE

| SWITCH TYPE | MODE REVERSE |
|---|---|
| SWITCH OPERATION | SINGLE BLOCK, DRY RUN |
| USED COMPONENT | MODE REVERSE PROCESS PROGRAM COMPONENT |

| DEVICE ADDRESS | DEVICE COMMENT |
|---|---|
| X280 | MODE REVERSE SINGLE BLOCK |
| M4000 | MODE REVERSE SINGLE BLOCK |
| YC12 | SINGLE BLOCK |

| SWITCH TYPE | OPERATION MODE SELECTION |
| --- | --- |
| SWITCH OPERATION | JOG, HANDLE, MEMORY |
| USED COMPONENT | SELF-HOLDING PROCESS PROGRAM COMPONENT |

F I G . 5 0

| SWITCH TYPE | CUTTING OVERRIDE | |
|---|---|---|
| SWITCH OPERATION | NUMERICAL VALUE SETTING | |
| USED COMPONENT | SELF-HOLDING PROCESS PROGRAM COMPONENT | |
| | NUMERICAL VALUE SETTING PROCESS PROGRAM COMPONENT | |

| USED COMPONENT | M CODE DECODING PROCESS PROGRAM COMPONENT |
| --- | --- |
| | SELF-HOLDING PROCESS PROGRAM COMPONENT |
| | AND CONDITION PROCESS PROGRAM COMPONENT |
| | M CODE COMPLETION PROCESS PROGRAM COMPONENT |

F I G . 5 5
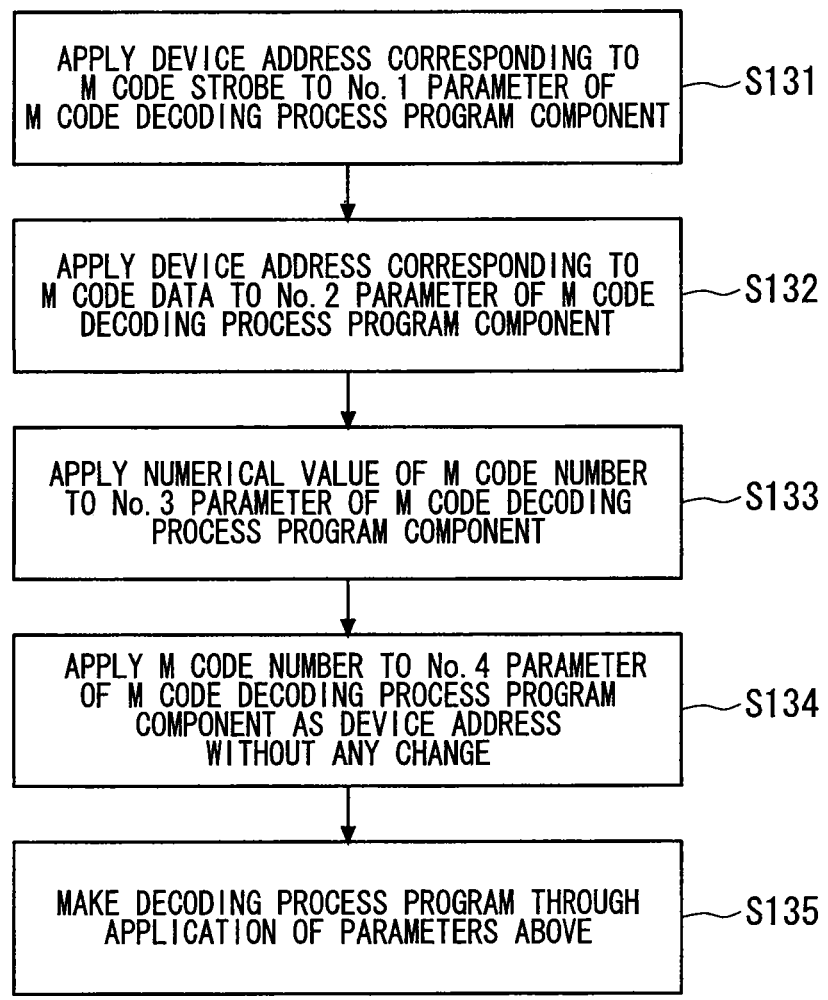

F I G . 5 7
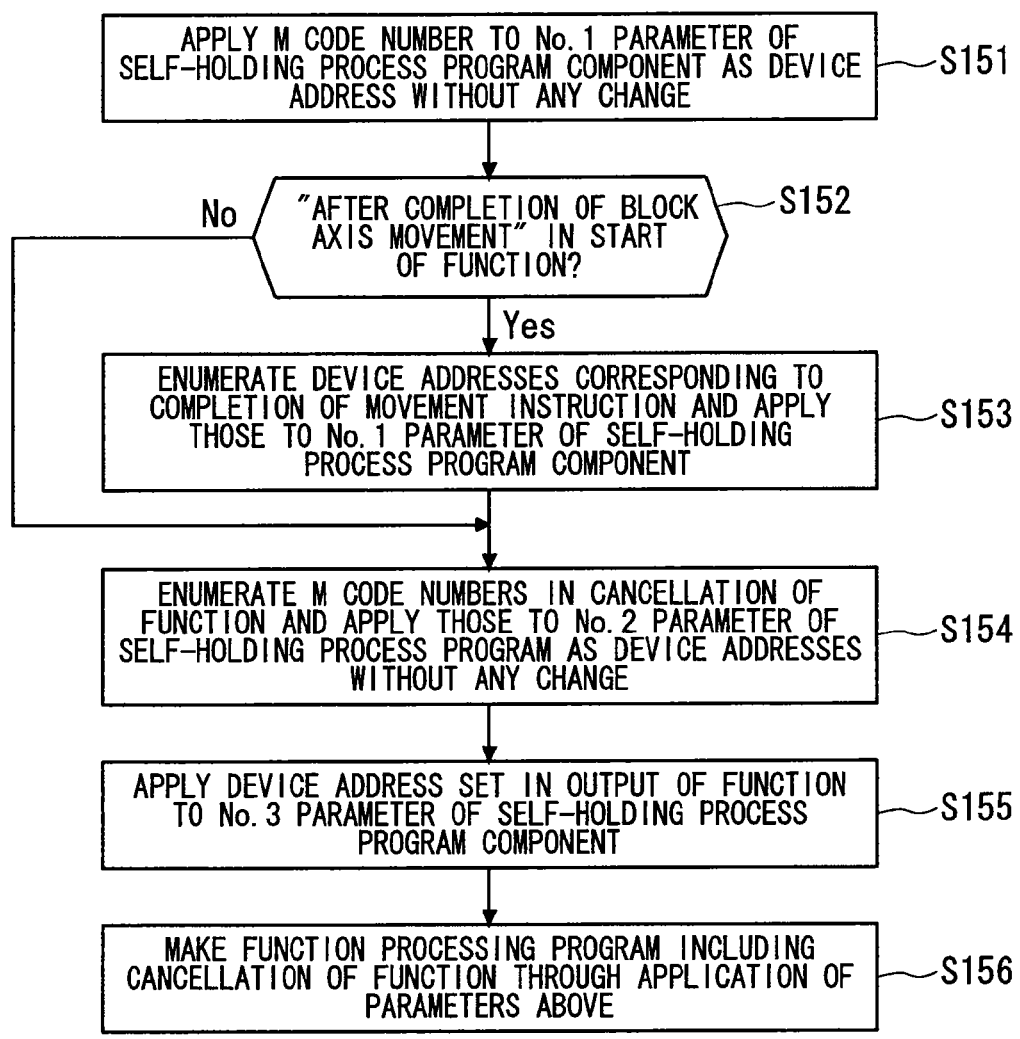

F I G . 5 8
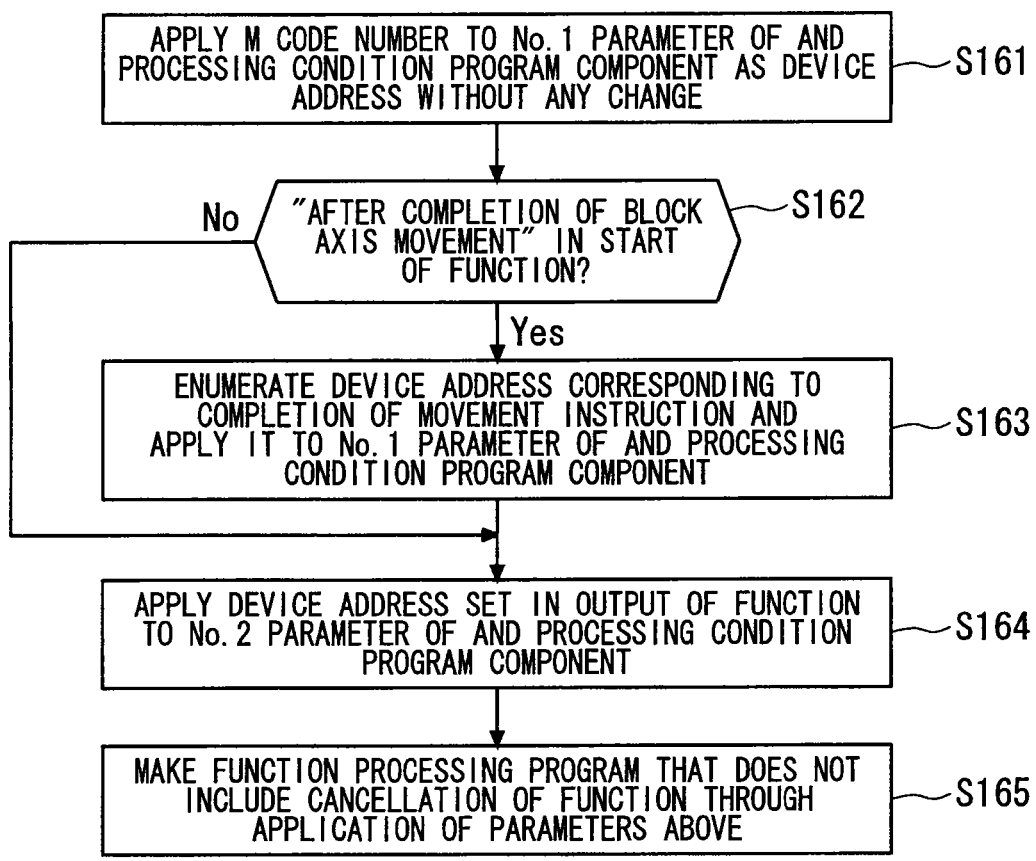

PROGRAM CREATION SUPPORT DEVICE

TECHNICAL FIELD

The present invention relates to a program creation support device, and more particularly, to a device that supports the creation of a measurement, monitoring and control program executed by an industrial controller and a microcomputer.

BACKGROUND ART

Conventionally, industrial controllers such as programmable controller (PC), motion controller (MC), numerical controller (NC), test controller and graphic operation terminal (GOT) have been used for measuring, monitoring and controlling various facilities. Examples of the languages used in measurement, monitoring and control programs executed by industrial controllers include the language in conformity with the IEC 61131-3 standard such as a ladder and a language dedicated to a controller. Further, examples of the languages for measurement, monitoring and control programs in a case of using a microcomputer in place of an industrial controller include the C language and assembly language.

Description is given below by taking a programmable controller (hereinafter, "PC") as an example. The PC executes a measurement, monitoring and control program (hereinafter, "program") to, for example, obtain the status of an object to be measured, monitored and controlled and direct an operation. The program is created with a predetermined program creation support device (for example, ladder creation support device) and is described mainly by variables, devices and numerical values.

The devices herein refer to ones obtained by assigning the input/output between the PC and an object to be measured, monitored and controlled which is connected with the PC to the memory address of the PC, and memory addresses used internally by the PC. For example, in the PC that supports the program creation support device (ladder creation support device) of Non-Patent Document 1 below, device characters are determined in advance in accordance with a data type such that one to which an input is assigned is a device X, one to which an output is assigned is a device Y, bit data that is internally used (internal relay) is a device M, and pieces of word data that are internally used (registers) are a device D and a device R. The addresses of the respective devices are expressed in hexadecimal for the device X and device Y and are expressed in decimal for the device M, device D and device R.

Variables indicate devices. In the PC that supports the program creation support device of Non-Patent Document 1, the variable is referred to as a "label" and is assigned to a specific device in compiling. A label is assigned to a device by being directly specified by a programmer in some cases or is assigned automatically in compiling in other cases. The characters usable as labels are characters other than the characters determined in advance, such as device characters. In the case of describing the program with the use of labels, it is possible to change the devices assigned to the labels of a program without changing the description of the program per se.

In the case of describing the numerical values in the ladder program, each numerical value is headed with a symbol K in decimal or a symbol H in hexadecimal. For example, "K25" represents a numerical value "25" in decimal form.

A program creation support device is typically provided as a software tool that operates on a personal computer (hereinafter, "computer") and has a function of supporting editing of a program for measuring, monitoring and controlling facilities by the PC, as well as a function of transferring the program edited by a computer (or an execution code obtained by compilation thereof) to the PC through connection of the PC to the computer and a function of monitoring a status of a facility and a variable value and a device value that vary upon execution of the program.

Further, there is a graphic operation terminal (GOT) with a program edit function and a monitoring function provided by a program creation support device. This enables to edit a program or monitor a status on the GOT constantly connected to the PC.

While the specifications and program of a facility to be measured, monitored and controlled are electrically turned into data through description with a software tool that operates on a computer, the specifications and program are not related to each other in terms of electronic data. Therefore, the measuring, monitoring and control program is manually created with a program creation support device based on the specifications. This requires considerable efforts for creating a program that causes the functions described in the specifications to sufficiently operate without problems.

Nowadays, there is a program creation support device that segmentalizes a frequently-used program into components as program modules (program organization units (POUs)), and reuses the POUs that conform to the specifications of the facility, to thereby compose a program from a plurality of POUs. In a case where a program language is a ladder, POU corresponds to a subroutine or a functional block (FB), while in a case of a structured text (ST) or C language, POU corresponds to a subroutine or function.

Moreover, there is a program creation support device that has a macro function of naming (macro-naming) an appropriate program pattern consisting of a plurality of program components, registering the program pattern, and then in creating a program, invoking the program pattern for reuse (macro diversion). The use of a program creation support device capable of reusing program components in this manner reduces the efforts in creating a program.

PRIOR ART DOCUMENT

Non-Patent Document

Non-Patent Document 1: "GX Developer Version 8 Operating Manual", Mitsubishi Electric Corporation, Manual No. SH-080356

SUMMARY OF THE INVENTION

Problem to be Solved by the Invention

As described above, a program is manually created by a creator, that is, a man after understanding the description of the specifications of an object to be measured, monitored and controlled. In a recent program creation support device, the efforts of creating a program are reduced to some extent by reuse of program components, but it is difficult to judge how to select program components and combines those for creating a program that conforms to the specifications. Therefore, it is desired to reduce such efforts.

The present invention has an object of reducing the efforts to select and combine program components for creating a program that conforms to the use of an object to be measured, monitored and controlled and to enhance the efficiency of creating a program in creating a measuring, monitoring and control program.

Means to Solve the Problem

A program creation support device according to the present invention includes: a program component including at least one program element, for creating, upon a user setting a content of a reuse parameter corresponding to each program element, a program in accordance with the set content; a program component holding unit holding the program component; and a program editing unit editing the program by reuse of the program component, wherein: the program component includes an ANDed program element indicating AND combination of the same program elements or an ORed program element indicating OR combination of the same program elements; and the program creation support device creates, upon a plurality of parameters being enumerated and set in the reuse parameter of said ANDed program element or said ORed program element, a program in which a plurality of the same program elements corresponding to the plurality of enumerated parameters are ANDed or ORed.

Effects of the Invention

According to the present invention, it is possible to define program components so as to conform more directly to the specifications in measuring, monitoring and controlling facilities. This reduces the efforts in the design regarding the selection of program components and combination of the program components for creating a program to conform to the specifications, leading to a significant reduction of the efforts in creating a program that causes the functions described in the specifications to sufficiently operate without problems.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a diagram showing an example of a program component definition screen of the program creation support device according to the first embodiment.

FIG. 4 is a diagram for describing an element to which a symbol "*" is added which is included in a program component according to the first embodiment.

FIG. 5 is a diagram for describing an element to which a symbol "+" is added which is included in the program component according to the first embodiment.

FIG. 6 is a flowchart showing the procedure of defining the program component according to the first embodiment.

FIG. 10 is a diagram showing an example of a program component reuse screen according to the first embodiment.

FIG. 12 is a diagram showing an example of the program component reuse screen according to the first embodiment.

FIG. 17 is a diagram showing an example of a program element component definition screen according to the second embodiment.

FIG. 18 is a diagram showing an example of a program component definition screen according to the second embodiment.

FIG. 19 is a diagram showing an example of a program component reuse screen according to the second embodiment.

FIG. 20 is a diagram showing an example of a program element component reuse screen accompanying the program component reuse screen according to the second embodiment.

FIG. 21 is a diagram showing an example of the program element component reuse screen accompanying the program component reuse screen according to the second embodiment.

FIG. 22 is a diagram showing a program created by reusing an M code completion process program component according to the second embodiment.

FIG. 23 is a diagram showing a software configuration of a program creation support device according to a third embodiment.

FIG. 25 is a diagram showing an example of a program hierarchical component definition screen according to the third embodiment.

FIG. 26 is a diagram showing the example of the program hierarchical component definition screen according to the third embodiment.

FIG. 27 is a diagram showing an example of a program component definition screen according to the third embodiment.

FIG. 28 is a diagram showing an example of a program hierarchical component reuse screen according to the third embodiment.

FIG. 35 is a diagram showing setting in specifications of a device.

FIG. 38 is a diagram showing setting in specifications of a control panel.

FIG. 39 is a diagram showing setting in specifications of an M code.

FIG. 41 is a diagram showing an M code decoding process program component according to the fourth embodiment.

FIG. 42 is a diagram showing an AND condition process program component according to the fourth embodiment.

FIG. 50 is a diagram showing attributes of a cutting override function creating unit.

FIG. 55 is a flowchart showing an operation of creating the M code decoding process program by the M code function creating unit.

FIG. 57 is a flowchart showing the operation of creating the function processing program by the M code function creating unit.

FIG. 58 is a flowchart showing the operation of creating the function processing program by the M code function creating unit.

EMBODIMENTS FOR CARRYING OUT THE INVENTION

<First Embodiment>

A first embodiment describes the method of creating a ladder program as an example of the method of creating a measurement, monitoring and control program in which a program component is defined and reused.

Figure 1:
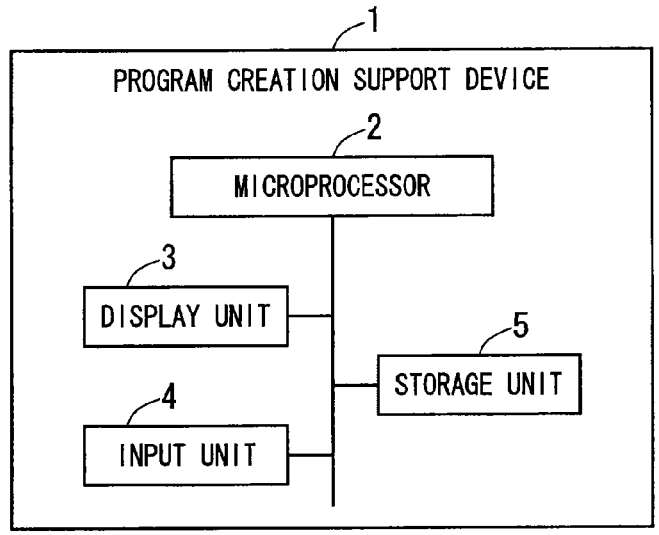
FIG. 1 is a diagram showing a hardware configuration of a program creation support device according to a first embodiment.

FIG. 1 is a diagram showing a hardware configuration of a program creation support device according to the first embodiment. A program creation support device 1 includes a microprocessor 2, a display unit 3, an input unit 4 and a storage unit 5. The description of the specifications of a facility to be measured, monitored and controlled and a measurement, monitoring and control program (hereinafter, "program") are held as a file in the storage unit 5. The display unit 3 is capable of displaying various information of the program creation support device 1. For example, in a case where a user inputs the facility specifications to the program creation support device 1 with the input unit 4, input items thereof are displayed on the display unit 3. Various operation screens described below are displayed on the display unit 3. The microprocessor 2 executes the program creation process based on the facility specifications input by the user and stored in the storage unit 5.

Figure 2:
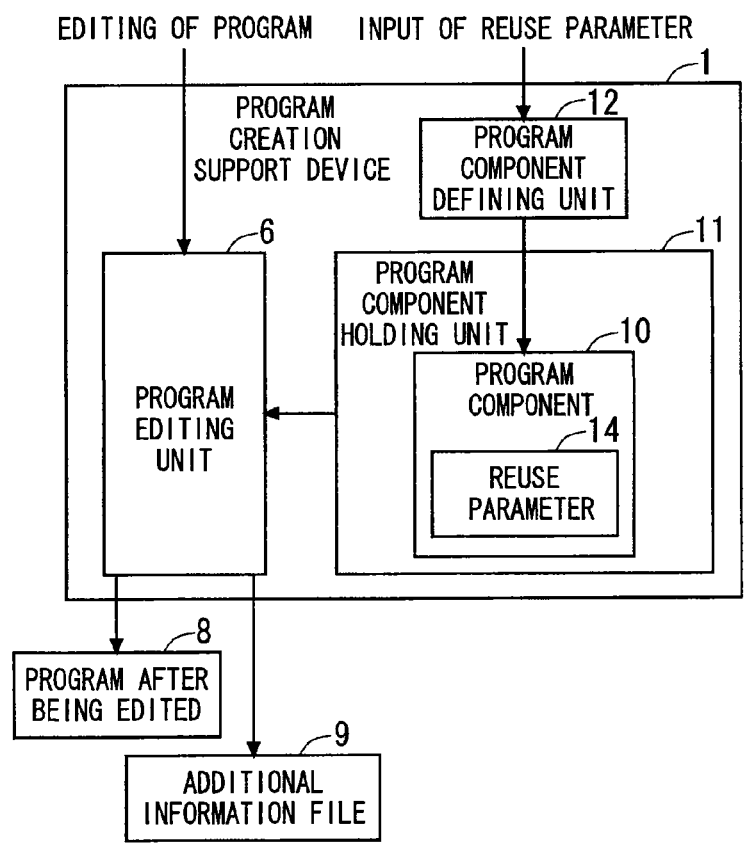
FIG. 2 is a diagram showing a software configuration of the program creation support device according to the first embodiment.

FIG. 2 is a diagram showing a functional block configuration (software block configuration) of the program creation support device 1. The respective functional blocks shown in FIG. 2 are implemented through control of the respective pieces of hardware shown in FIG. 1, by the software executed by the microprocessor 2.

The program creation support device 1 includes a program editing unit 6 that edits a program based on the operation of the user (program editing), a program component defining unit 12 that defines a reusable program component 10 based on the operation of the user (program component definition input), and a program component holding unit 11 that stores the program component 10 defined by the program component defining unit 12. In the present invention, the program component 10 includes a reuse parameter 14 that is set in the case of reuse, and the program component 10 may take various forms in accordance with the setting content thereof (which is described below in detail).

The program editing unit 6 according to the present embodiment outputs a program after being edited 8, and is also capable of outputting an additional information file 9 related thereto (for example, such as comments explaining the content of a device) if required.

While FIG. 2 shows the configuration in which the program component defining unit 12 is contained in the program creation support device 1, the program component defining unit 12 may be defined as another device different from the program creation support device 1.

Description is given below of the operation of the program creation support device 1 according to the present embodiment and the method of creating a program by the program creation support device 1. Described here is an example in which the program creation support device 1 creates a ladder program.

FIG. 3 shows an example of an operation screen display (program component definition screen) in a case where the user defines the program component 10 with the program component defining unit 12. Shown here is an example of defining a program component of self-holding process that is frequently used in the ladder program.

The program component definition screen (ladder component definition screen) shown in FIG. 3 has a configuration where an icon display area in which icons used in the creation of a ladder diagram are displayed, a program edit area for editing the ladder diagram of the program component through operation of the icons, a parameter definition area for defining reuse parameters of the program component, and a program component name input area for inputting the name of the created program component are arranged in order from the top.

In addition to the icons of typical program elements such as contacts (A contact "-| |-" and B contact "-|/|-"), an instruction ("-[ ]-") and a coil ("-( )"), icons obtained by adding a symbol "*" or "+" thereto are provided in the icon display area. The icons to which the symbol "*" or "+" is added correspond to an aggregate (collection) consisting of one or more program elements, where the icon to which the symbol "*" is added corresponds to a relay string in which program elements are ANDed as shown in FIG. 4, and the icon to which the symbol "+" is added corresponds to a relay string in which program elements are ORed as shown in FIG. 5. The coils are not ANDed in the ladder diagram, and there is no icon for a coil to which "*" is added.

The program edit area is an area in which the ladder diagram can be edited through operation of the various icons described above, which may be configured similarly to the program edit screen (ladder edit screen) included in a conventional ladder program creation support device.

The parameter definition area is an area for defining reuse parameters to be set in the case of reusing a program component, to which predetermined items are input by a user in the case of creating (defining) a program component.

FIG. 6 is a flowchart showing the procedure of creating a program component according to the present embodiment. The procedure of creating a program component is described with reference to this figure. Illustrated here is the case of creating the program component of self-holding process as shown in FIG. 3.

First, reuse parameters added to respective elements of a program component are defined as component variables used for the description of the program component (S11). This is performed by setting reuse parameters in the parameter definition area of the program component definition screen by a user. In an example of FIG. 3, a component variable VB1 is defined as No. 1 reuse parameter, a component variable VB2 is defined as No. 2 reuse parameter, and a component variable VB3 is defined as No. 3 reuse parameter.

A program comment and a jump label (program pointer) may be prepared as the reuse parameters of the program component. They may be defined as the reuse parameters that are included in each program component without exception.

Figures 7, 8:
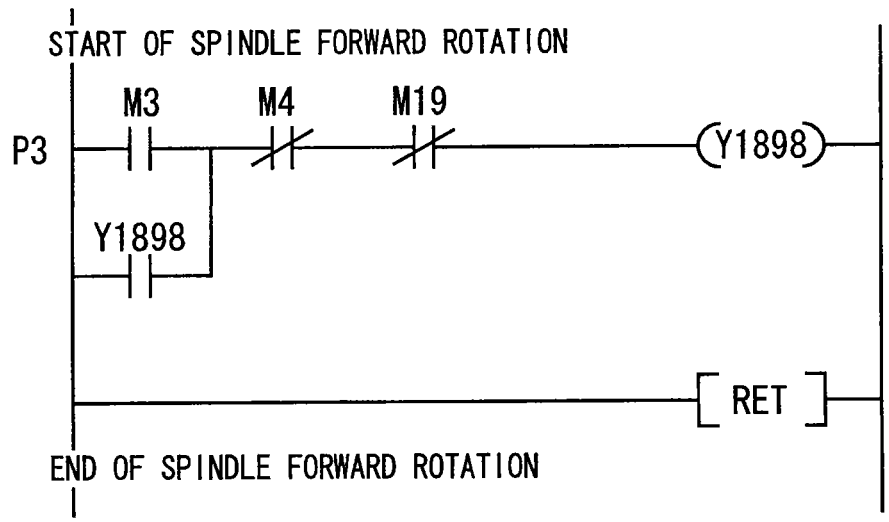
FIG. 7 is a diagram showing a spindle forward rotation processing program (ladder diagram format) created by reusing a self-holding processing program component according to the first embodiment.
FIG. 8 is a diagram showing a spindle forward rotation processing program (instruction list format) created by reusing the self-holding processing program component according to the first embodiment.

In the case of creating a program by reuse of a program component, a character string of the comment related to the program to be created is set in the program comment as the reuse parameter. That is used for, for example, describing a program comment in which a character string "start" is added to the top of the program to be created and describing a program comment in which a character string "end" is added to the end of the program to show the content of the program therebetween. In the ladder program, the program comment is treated as a statement and, in a case where "spindle forward rotation" is set as the program comment, comments are described in the created program as shown in FIG. 7 and FIG. 8. FIG. 7 shows a program in ladder diagram format, and FIG. 8 shows a program in instruction list format.

Even when the reuse parameter of a program comment has been defined, a character string does not need to be set in the program component unless required. In that case, a program that does not include a program comment is created.

When a jump (call) process from another program is performed on a program created by reuse of the program component, a label indicating the location of the program is set in the jump label (program pointer) as a reuse parameter. In the case of the ladder program, the program pointer is treated as one kind of device. In the case where "P3" is set as a program pointer, a program pointer is described as shown in FIG. 7 (ladder diagram format) and FIG. 8 (instruction list format) in the created program. Alternatively, a return (RET) instruction for returning to a jump source may be added to the end of the program including a program pointer.

Even when the reuse parameter of the jump label has been set in the program component, nothing needs to be set unless required. In that case, a program that does not include a jump label is created (in a ladder program, a program that does not include a program pointer and a RET instruction is created).

Next, the configuration of the program component is described in the program edit area (S12). Here, the ladder diagram is described. This is performed by operating icons of the program component definition screen by a user.

While devices or variables (labels) are provided as parameters of the respective elements such as contacts in normal program creation, devices, variables (labels) or component variables defined as the reuse parameters are provided to the respective elements of a program component as parameters. As to the elements to which component variables are added, in the case of reusing the program component, it is required to specify the devices or variables (labels) applied thereto by a user. As to the element to which a device or variable (label) is added, the device or variable (label) is applied without any change in the case of reusing the program component.

It is possible to specify the number of contacts included in the element (collection) to which "*" or "+" is added, from the number of parameters that are set in the case of reusing a program component. At the stage of creating a program component, a device or variable (label) is not provided to the collection, but one component variable is provided thereto.

The ladder program of self-holding process has only one self-holding relay, and thus a normal A contact and a normal coil are used for self-holding relay. On the other hand, various structures are conceivable in the holding instruction condition (ON condition) relay and holding cancellation condition (OFF condition) relay. In the example of FIG. 3, it is assumed that the program component of the self-holding process that is reusable in the creation of a program of exclusive selection process or M code function process is defined, and a relay string in which one or more contacts are ANDed (elements to which "*" is added) is used as an ON condition relay and an OFF condition relay. That is, the A contact to which "*" is added is used as the ON condition relay string and the B contact to which "*" is added is used as the OFF condition relay string.

The component variable VB1 defined as No. 1 reuse parameter is provided to the ON condition relay string, the component variable VB2 defined as No. 2 reuse parameter is provided to the OFF condition relay string, and the component variable VB3 defined as No. 3 reuse parameter is provided to the self-holding relay, which can be judged from the correspondence between the display of the program edit area and the display of the parameter definition area on the program component definition screen. Besides, the user can input comments (character strings) that describe elements to which reuse parameters are assigned to the field "description" of the parameter definition area for easily recognizing the correspondence, as shown in FIG. 3.

As shown in FIG. 3, in the parameter definition area, a symbol "*" is displayed in the field "enumeration" of No. 1 and No. 2 reuse parameters provided to the relay string to which "*" is added. Though not shown in FIG. 3, a symbol "+" is displayed in the field "enumeration" of the reuse parameter provided to the relay string to which "+" is added. This demonstrates that the reuse parameter has been added to the collection. There is only one self-holding relay, and accordingly the field "enumeration" of No. 3 reuse parameter is blank.

After describing the ladder diagram of the program component, a name is provided to the program component (S13). This is performed by inputting a character string to the program component name input area on the program component definition screen by a user. In the example of FIG. 3, a name "self-holding process" is provided to the created program component. Through the above, the creation of a program component is completed.

The description has been given of the procedure in which reuse parameters are first defined (S11), and then, the program (ladder diagram) of the program component is described the use thereof (S12), which may be reverse in order.

Figure 9:
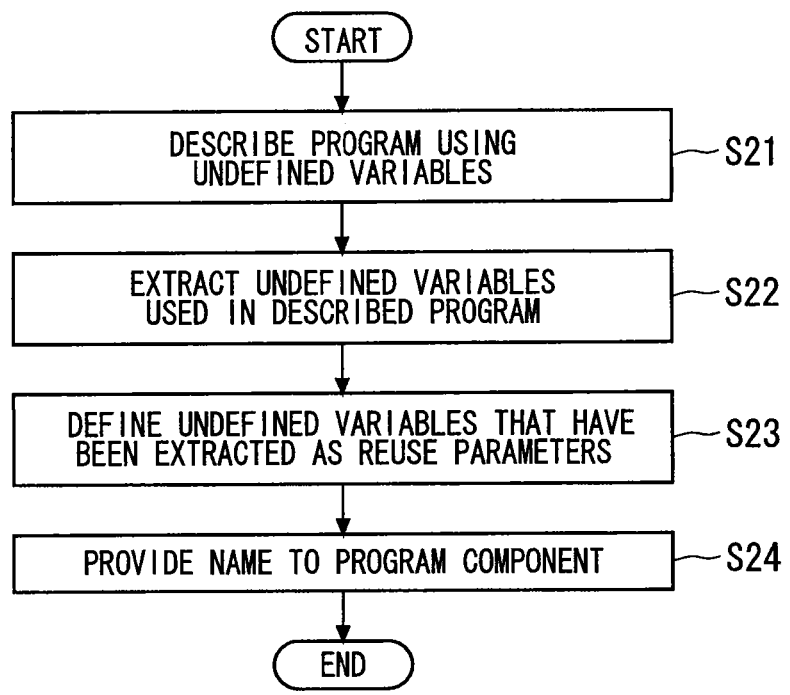
FIG. 9 is a flowchart showing an example of changing the procedure of defining the program component according to the first embodiment.

That is, the procedure may be such that as shown in a flowchart of FIG. 9, a program (ladder diagram) of a program component is first described with the use of undefined variables (S21), the undefined variables are extracted from the described program (S22), the undefined variables that have been extracted are defined as reuse parameters (component variables) (S23), and then, the program component is named (S24). The undefined variables may be extracted and defined as reuse parameters (component variables) by inputting the predetermined items to the parameter definition area by a user, or by searching for undefined variables by the program component defining unit 12. It suffices that an appropriate method is used as long as there is no contradiction between the reuse parameters and the component variables used in the described program.

Next, the procedure of causing the program creation support device 1 to automatically create a program is described. FIG. 10 shows an example of an operation screen display (program component reuse screen) in a case of causing the program creation support device 1 to reuse a program component, to thereby automatically create a program. This diagram shows a case of reusing the self-holding process program component defined as shown in FIG. 3.

Figure 32:
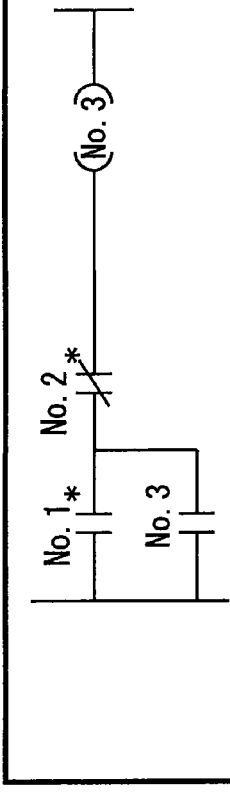
FIG. 32 is a diagram showing an example of a program component reuse screen according to the first embodiment.

The program component reuse screen includes a program component name display area in which the name of a program component to be reused is displayed, and a parameter application area for inputting parameters devices, variables (labels) and the like to be applied to the reuse parameters. As shown in FIG. 32, the program component reuse screen may be provided with a program display area in which the structure of the selected program component and the numbers (Nos.) of the reuse parameters provided to respective elements thereof are displayed. In that case, the user is capable of easily obtaining the structure of the program component intended to be reused and the correspondence between each element and each reuse parameter.

The program component name display area has not only a function of displaying the name of a program component to be reused but also a function as a selection menu for selecting one to be reused from a plurality of program components that have been defined.

On the program component reuse screen, the contents defined in the parameter definition area of the program component definition screen of FIG. 3 are displayed in the fields "No.", "enumeration" and "description" of the reuse parameters displayed in the parameter application area.

A user inputs parameters to be applied to the reuse parameters in the parameter application area. In this case, two or more parameters can be enumerated and input to the reuse parameter in which "*" or "+" is displayed in the field "enumeration". Further, a comment (character string) on a program to be created can be input to the program comment as a reuse parameter.

FIG. 10 shows an example in which "spindle forward rotation" is applied to the program comment, "P3" is applied to the jump label, "M3" is applied to No. 1 reuse parameter (VB1), "M4, M19" is applied to No. 2 reuse parameter (VB2), and "Y1898" is applied to No. 3 reuse parameter (VB3).

In this case, the program creation support device 1 creates a ladder program obtained by replacing the ON condition relay string VB1 with one A contact M3, the OFF condition relay string VB2 with two B contacts M4 and M19, and the self-holding relay VB3 with a relay VB3, and adding a program pointer P3, a return instruction (RET), and program comments "start of spindle forward rotation" and "end of spindle forward rotation" thereto in the ladder diagram shown in FIG. 3, that is, the ladder diagram shown in FIG. 7. Alternatively, the program creation support device 1 may create the program shown in FIG. 8 in which the above is described in instruction list format (the ladder diagram of FIG. 7 is equivalent to the instruction list of FIG. 8).

Figure 11:
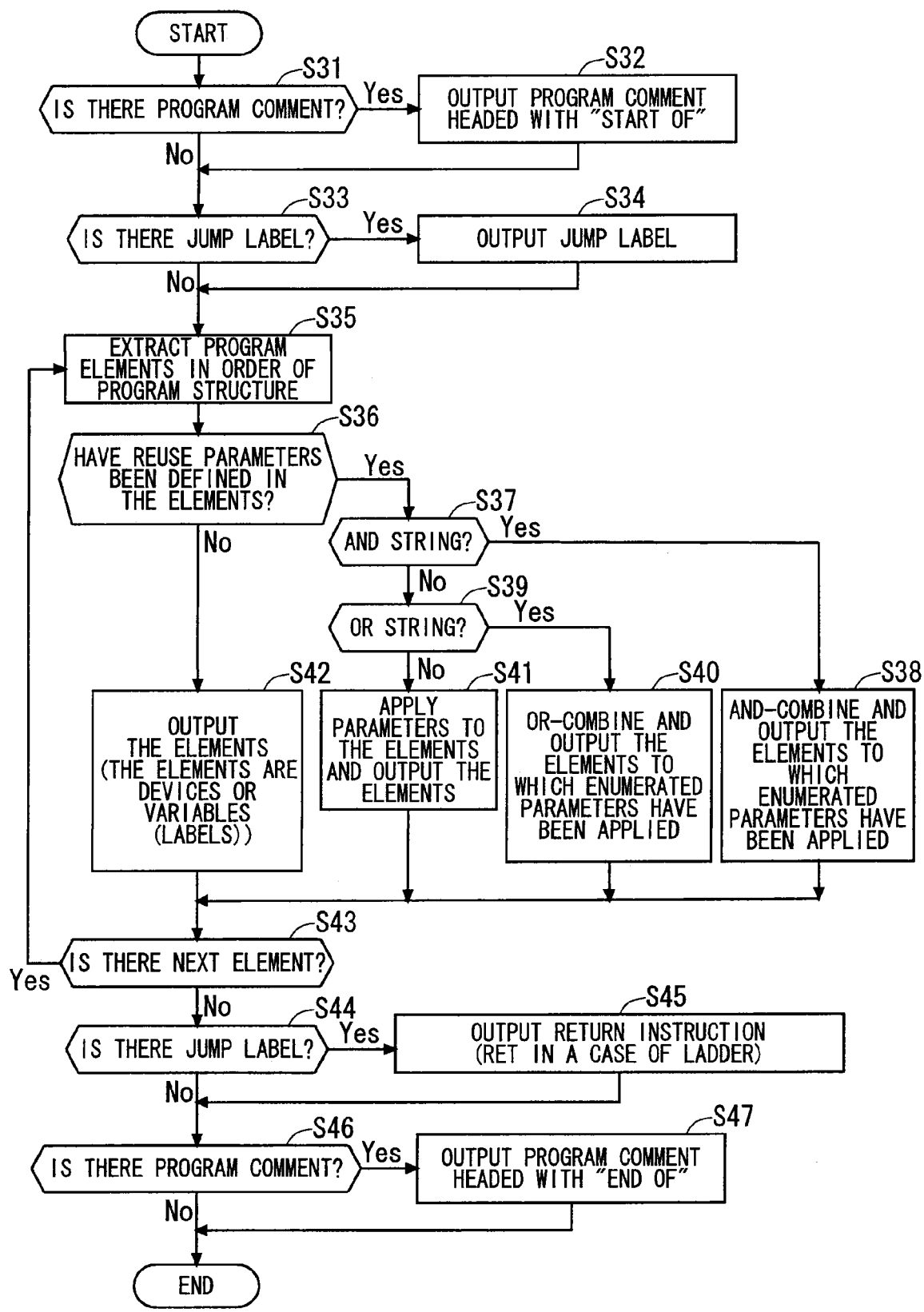
FIG. 11 is a flowchart showing the method of creating a program in which the program component according to the first embodiment is reused.

The creation method for a program in which a program component is reused, performed by the program creation support device 1, is described below. FIG. 11 is a flowchart of the creation method. Here, the case where the ladder program shown in FIG. 7 is created is taken as an example.

As shown in FIG. 10, when the user inputs the information required for the program component reuse screen and orders the creation of a program, first, the program creation support device 1 checks whether or not a character string has been set in the program comment of the reuse parameter (S31). If a character string has been set in the program comment, the program creation support device 1 outputs a program comment headed by "start of" (S32). In the case of FIG. 10, the character string "spindle forward rotation" has been set in the program comment, and accordingly, "start of spindle forward rotation" obtained by providing "start of" thereto is output as a program comment.

Then, the program creation support device 1 checks whether any label has been set as a reuse parameter of the jump label (program pointer) (S33) and, if any label has been set, outputs a jump label corresponding thereto. In the case of FIG. 10, the label P3 has been set, and thus "P3" is output as a jump label.

Next, elements constituting the program are extracted in order of the program structure of the program component (S35), and the following process is performed on each of the extracted elements.

First, the program creation support device 1 checks whether or not the reuse parameters have been defined for the extracted elements (S36). If the reuse parameters have been set, the program creation support device 1 checks whether the element is one to which "*" is added (AND string) (S37), and, in a case of the AND string, ANDs and outputs the elements to which the parameters enumerated in the parameter application area of FIG. 10 are applied.

On the other hand, if the element to which the reuse parameter has been set is one to which "+" is added (OR string) (S39), the program creation support device 1 ORs and outputs the elements to which the parameters enumerated in the reuse parameters are applied (S40).

If "*" or "+" has not been added to the element in which the reuse parameter has been set, the program creation support device 1 outputs the element to which the parameter set in the reuse parameter has been applied (S41).

In the case where the element is one in which a reuse parameter has not been set, that is, one to which not a component variable but a device or variable (label) has been added, the device or variable (label) is output without any change (S42).

The process above is performed on all the elements of a program component to be reused (S43). For example, the first element in the program component defined in FIG. 3 is an AND string "-| |-*", where No. 1 reuse parameter VB1 has been defined. In the example of FIG. 10, only M3 has been set in No. 1 reuse parameter and, in this case, one A contact M3 is output (S38).

The second element is an A contact that is ORed with the first element (VB1), in which No. 3 reuse parameter VB3 has been defined, and to which "*" or "+" has not been added. Y1898 has been set in No. 3 reuse parameter, and thus the A contact Y1898 is output to the location at which it is ORed with the A contact M3 that has been output (S41).

The third element is an AND string (-|/|-*) of the B contact that is ANDed with the first element (VB1) and the second element (VB3), in which No. 2 reuse parameter VB2 has been defined. M4 and M19 have been enumerated in No. 2 reuse parameter, and thus the element in which the B contacts M4 and M19 are ANDed is output to the location at which it is ANDed with the A contacts M3 and Y1898 that have been output (S38).

The last (fourth) element is a coil (-( )-) that is ANDed with the third element (VB3), in which No. 3 reuse parameter VB3 has been defined. Y1898 has been set in No. 3 reuse parameter, and thus the coil Y1898 is output to the location at which it is ANDed with the B contacts M4 and M19 that have been output (S41).

When the process above is completed for all the elements of a program component (S43), the program creation support device 1 checks again whether a specific label has been set to a jump label (program pointer) as a reuse parameter (S44) and, if it has been set, outputs a return instruction to return to the caller of jump (S45). In the example of FIG. 10, a return instruction (-[RET]-) is output to the location at which it is ORed with the first to fourth elements above.

Then, the program creation support device 1 checks again whether or not a character string has been set to the program comment of the reuse parameter (S46) and, if the character string has been set, outputs a program comment headed with "end of" (S47). In the case of FIG. 10, "end of spindle forward rotation" obtained by providing "end of" to "spindle forward rotation" is output as a program comment.

Through the process above, the program (ladder diagram of FIG. 7 or instruction list of FIG. 8) obtained by applying the parameters set in the program component reuse screen (FIG. 10) to the reuse parameters of the program component defined in the program component definition screen (FIG. 3) is automatically created.

The behavior of the ladder program of FIG. 7 is now described. In the initial state, the devices M3, M4, M19 and Y1898 are all turned off. Upon turning-on of the A contact M3 that is a holding instruction condition (ON condition) relay of self-holding, the A contact Y1898 is turned on. After that, the A contact Y1898 is held to be turned on even if the A contact M3 is turned off. The ON state of the A contact Y1898 continues until any of the B contacts M4 and M19 that are holding cancellation conditions (OFF conditions) is turned on. Upon turning-on of any of the B contacts M4 and M19, the A contact Y1898 is turned off (that is, self-holding is canceled).

The program creation support device 1 according to the present embodiment is capable of creating programs in various forms from one program component by changing the contents of reuse parameters set on the program component reuse screen. For example, in the case of reusing a program component of the self-holding process defined as shown in FIG. 3 similarly to the above, the ladder program shown in FIG. 13 can be created if the contents of the reuse parameters are set on the program component reuse screen as shown in FIG. 12.

Figure 13:
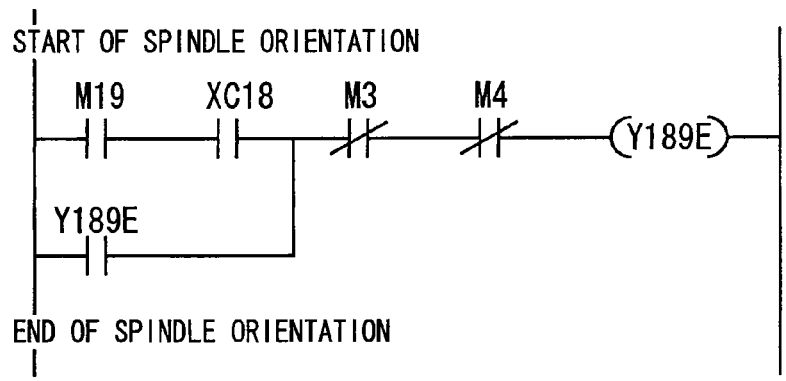
FIG. 13 is a diagram showing a spindle orientation processing program created by reusing the self-holding process program according to the first embodiment.

The behavior of the ladder program of FIG. 13 is described. In the initial state, devices M19, XC18, M3, M4 and Y189E are all turned off. Upon turning-on of both of the A contacts M19 and XC18 that are ON condition relays, the A contact Y189E is turned on. After that, the A contact Y189E is held to be turned on even if the A contacts M19 and XC18 are turned off. The A contact Y189E is held to be turned on until any of the B contacts M3 and M4 that are OFF condition relays is turned on. Upon turning-on of any of the B contacts M3 and M4, the A contact Y189E is turned off (that is, self-holding is canceled).

As described above, the program creation support device 1 is capable of outputting the created program 8 as well as the additional information file 9 related thereto. Described in the additional information file 9 is, for example, the comments describing the contents of the devices or variables (labels) reused in the created program (device or variable (label) in which reuse parameters are defined by the program component).

Figure 14:
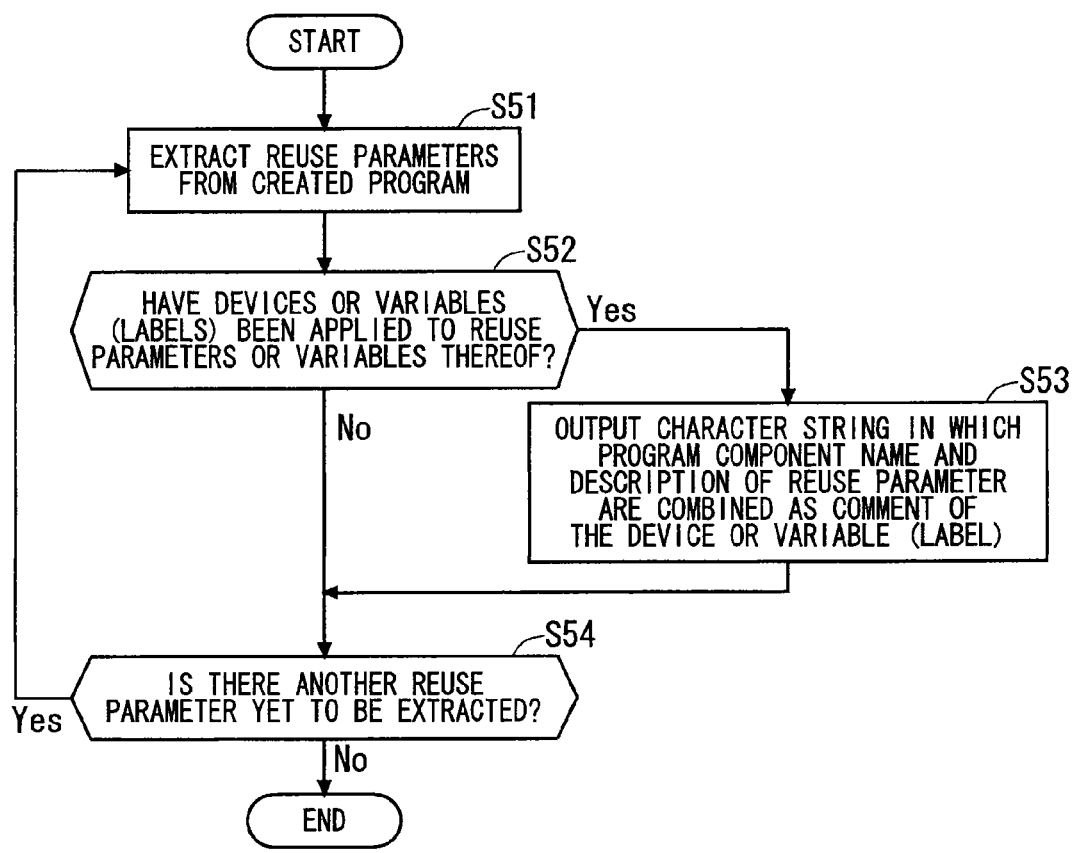
FIG. 14 is a flowchart showing the method of creating the additional information file according to the first embodiment.

The additional information file may be created through operation of the program creation support device 1 by a user or may be automatically created. FIG. 14 is a flowchart showing the method of automatically creating an additional information file in which the comments describing the contents of the devices or variables (labels) reused in the created program are described.

With reference to FIG. 14, the method of automatically creating an additional information file is described. The program creation support device 1 creates the program by reusing the program component, extracts the parameters ("spindle forward rotation", P3, M3, M4, M19 and Y1898 in the example of FIG. 10) applied to the reuse parameters therefrom in order (S51), and then checks whether the parameters are devices or variables (labels) (S52). If the parameters are devices (M3, M4, M19, Y1898) or variables (labels), the program creation support device 1 combines the program component name and the character string of "description" corresponding to the parameter, and then outputs them as the comments of the devices or variables (labels) (S53). The process described above is repeated until the parameters applied to the reuse parameters are all extracted (S54). The additional information file is automatically created through the process described above.

Figures 15, 16:
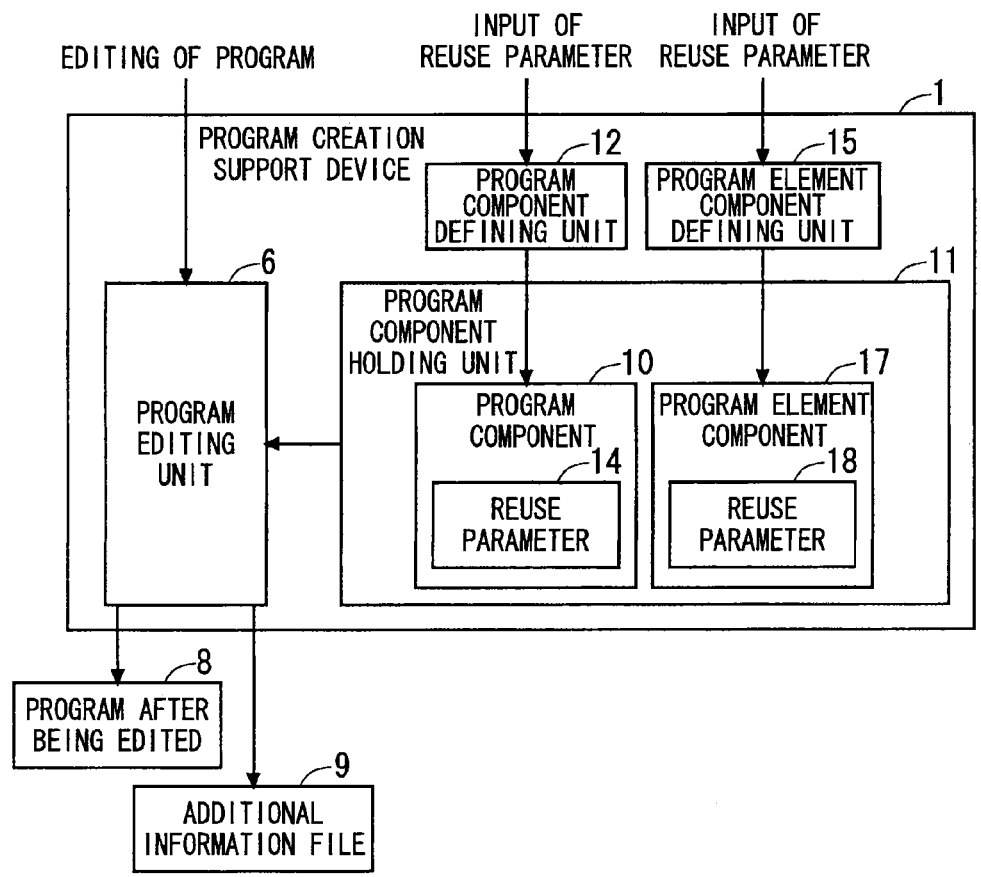
FIG. 15 is a diagram showing an example of an additional information file of a program created by the program creation support device according to the first embodiment.
FIG. 16 is a diagram showing a software configuration of a program creation support device according to a second embodiment.

For example, in the case where reuse parameters are set as shown in FIG. 10, the program creation support device 1 is capable of creating an additional information file as shown in FIG. 15 in addition to the program of FIG. 7 or FIG. 8.

The program component according to the present embodiment is characterized by including a program element (relay string) in which a plurality of elements are created in a predetermined form (AND combination or OR combination) by enumerating a plurality of parameters (devices, variables (labels) or numerical values) and applying those to the reuse parameters in the case of reuse. The program component may take various forms in accordance with the number of parameters enumerated that are applied to the reuse parameters. That is, it is possible to create programs in a plurality of forms from one program element. The program creation support device 1 according to the present embodiment is characterized by including the program component defining unit 12 capable of defining such a program component.

A conventional program creation support device cannot create programs in different forms, for example, the program of FIG. 7 and the program of FIG. 13 with the use of the same program component, which is enabled in the present invention. Accordingly, the range in which a program component is applicable is widened, which enables to define the program component so as to conform more directly to the specification description of a facility to be measured, monitored and controlled.

Therefore, it is possible to reduce the efforts in the design regarding the selection of program components and combination thereof for creating the program conforming to the specification description, leading to a significant reduction of the efforts in creating a program that adequately has the functions described in the specifications. Further, it is possible to automatically create the additional information file of the program created by reusing a program component, and the presence of the additional information facilitates the understanding of the created program, leading to a reduction of the efforts in understanding the created program.

<Second Embodiment>

The first embodiment has described the program component that has the structure workable as a program (program component POU) independently. Described below is an embodiment in which a program component (hereinafter, "program element component") is used, which is not workable as a program (program component POU) but workable as an element of a program component independently.

For example, contacts, instructions and coils are workable as the most fundamental program element components that cannot be segmentalized further. The contacts, instructions and coils are capable of serving as the constituent elements of a program and a program component and are constituent elements of a program element component as well. Similarly, a program element component is also capable of serving as a constituent element of a program and a program component as well as a constituent element of another program element component.

Hereinafter, the methods of defining and reusing a program element component are described. FIG. 16 is a diagram showing a functional block configuration (software block configuration) of a program creation support device 1 according to the second embodiment. The program creation support device 1 further includes a program element component defining unit 15 for defining a program element component 17 in addition to the configuration of the first embodiment (FIG. 2). The program element component 17 that has been defined is stored in the program component holding unit 11. The program element component 17 includes a reuse parameter 18 set in the case of the reuse thereof.

While FIG. 16 shows the configuration in which the program component defining unit 12 and the program element component defining unit 15 are contained in the program creation support device 1, those may be external devices.

FIG. 17 is a diagram showing an example of an operation screen display (program element component definition screen) in the case of defining the program element component 17 with the use of the program element component defining unit 15 by a user. Shown here is an example in a case of defining a program element component (AND condition process program element component) described in ladder diagram format.

The program element component definition screen (ladder element component definition screen) has a configuration similar to that of the program component definition screen (ladder component definition screen) shown in FIG. 3. That is, as shown in FIG. 17, the program element component definition screen has a configuration where an icon display area in which icons used in the creation of a ladder diagram are displayed, a program edit area for editing the ladder diagram of the program element component through operation of the icons, a parameter definition area for defining reuse parameters of the program element component, and a program element component name input area for inputting the name of the created program element component are arranged in order from the top.

In addition to the icons of the program component definition screen shown in FIG. 3, an icon of a program element component (-□-) and icons obtained by adding "*" or "+" thereto are arranged in the icon display area. The symbol "*" represents the string of the program element components that are ANDed, and the symbol "+" represents the string of program element components that are ORed.

The program edit area is an area in which the ladder diagram can be edited through operation of various icons described above, which may be configured similarly to the program edit screen (ladder edit screen) included in a conventional ladder program creation support device. However, the program element component is not workable as a program by itself, and thus differently from the program edit area shown in FIG. 3, has a form in which a left bus and a right bus are not provided and the internal structure of one element that constitutes the ladder diagram is edited.

The parameter definition area is an area for defining reuse parameters to be set in the case of reusing a program element component, to which predetermined items are input by a user.

The procedure of defining the program element component is similar to the procedure of defining the program component shown in FIG. 6 or FIG. 9, which is not described here. FIG. 17 shows an example in which the program element component has a configuration composed of one A contact to which "*" is provided (relay string in which the A contact is ANDed). Further, the component variable VB1 defined as No. 1 reuse parameter is provided to the relay string of the A contact, and the description "AND condition relay string" is provided to the component variable VB1. The program element component has been named "AND condition processing".

If a ladder diagram including another program element component is configured with the use of icons ("-□-", "-□-+" and "-□-*") of the program element component on the program element component definition screen, it is also possible to define a program element component that reuses another program element component.

FIG. 18 shows an example of the program component definition screen of the program creation support device 1 according to the present embodiment. As in FIG. 3, the icon display area, program edit area, parameter definition area and program component name input area are arranged in order from the top.

In addition to the icons of the program component definition screen shown in FIG. 3, an icon of a program element component (-□-) and icons obtained by adding "*" or "+" thereto are arranged in the icon display area. The user is capable of creating a program component in which a program element component is reused through operation of the icons.

The parameter definition area is an area to which a user inputs predetermined items when creating a program component. In addition to the field shown in FIG. 3, a field "type of element component" for specifying the type of the program element component in a case of defining a program component including a program element component is provided. When defining a program component with the use of a program element component, the user operates the field "type of element component", to thereby select and specify one to be used from the program element components that have been defined.

In FIG. 18, a program component in which the string of the ORed program element components (-☐-+) and the coil (-( )-) are ANDed is defined in the program edit area. Then, a component variable VE1 defined as No. 1 reuse parameter is provided to the string of the program element components above and, in the parameter definition area, "AND condition processing" (that is, program element component defined in FIG. 17) is specified as the type of the program element component of the component variable VE1. Further, the description "OR condition (AND condition process program element component string)" is set thereto by a user.

Provided to the above-mentioned coil is not a component variable defined as a reuse parameter but YC1E being an output device that represents M code completion. In this case, the device YC1E is always described when the program component is reused. Note that it is not allowed to provide a device or variable (label) to a program element component used in a program component, and a component variable of a reuse parameter needs to be provided without fail.

In FIG. 18, the program component is named "M code completion process" with the use of the program component name input area.

As to the program element components used in the definition of a program component, it is also possible to enumerate and specify the types of the program element components. In this case, the program component that may reuse any program element component is defined among the enumerated types.

Further, it is also possible not to specify the types of program element components regarding (component variables provided to) the program element components used in the definition of a program component. In this case, the types of program element components are not limited, and a program component that may reuse any program element component is defined. As to the component variable in which the type of a program element component has not been specified, which has been provided to the program element component, it is required to apply the program element component in reusing a program component. Further, as to the component variable in which the type of a program element component has not been specified, which has been provided to icons of contacts, instructions and coils, it is required to apply devices and variables (labels) in reusing a program component as in the first embodiment.

Next, description is given of the procedure of causing the program creation support device 1 to automatically create a program with the use of a program component including program element components. FIG. 19 shows an example of an operation screen display (program component reuse screen) in the case of causing the program creation support device 1 to automatically create a program by reusing a program component. This diagram shows the case of reusing an M code completion process program component defined as in FIG. 18.

A program component reuse screen according to the second embodiment (FIG. 19) is obtained by adding the field "type of element component" in which the types of the program element components included in the program component are displayed and buttons "addition of row" and "deletion of row" to the program component reuse screen according to the first embodiment (FIG. 10).

The M code completion process program component shown in FIG. 18 includes the program element component whose type is "AND condition processing", and accordingly in the example of FIG. 19, "AND condition processing" is displayed in the field "type" of No. 1 reuse parameter, and the description "OR condition (AND condition process program element component string)" corresponding thereto is displayed on the field "description".

In a case where a program component includes a program element component whose type has not been specified or includes a plurality of program element components whose types have been specified, a user specifies and selects the type thereof on the program component reuse screen (FIG. 19).

The program element component includes a plurality of elements to be reused in some cases, and thus it is difficult to set reuse parameters on the screen as shown in FIG. 19 only. Therefore, in the case where the program component to be reused includes a program element component, a button for expanding another screen for setting reuse parameters of the program element component (hereinafter, "expansion button") is displayed in the field "reuse parameter" of the program element component on the program component reuse screen. A user presses the expansion button, to thereby open the screen (program element component reuse screen) on which reuse parameters for a program element component are set.

In a case where a program component includes the collection of program element components and the application of a plurality of parameters to reuse parameters thereof is intended, setting thereof is difficult on one program element component reuse screen. Accordingly, in a case where the collection of program element components is included, as shown in FIG. 19, buttons "addition of row" and "deletion of row" are displayed on the program component reuse screen. The button "addition of row" serves to increase the number of program element components constituting the collection, and upon pressing this, the field for setting reuse parameters of a program element component increases by one row (one expansion button is added). One row of them can be deleted by pressing the button "deletion of row".

With reference to the program component reuse screen of FIG. 19, the M code completion process program component (FIG. 18) includes the collection in which AND condition process program element components are ORed ("+" is displayed in the field "enumeration"), and the collection is associated with No. 1 reuse parameter. In the case where a plurality of AND condition process program element components are ORed in a program to be created, a user presses the button "addition of row", to thereby add a row to the parameter application area. FIG. 19 shows an example in a case where two AND condition process program element components are ORed.

After that, the user sets reuse parameters of each element, and the reuses parameters for a program element component are set as follows.

For example, upon pressing the first expansion button ("1" is displayed in the field "enumeration") of two AND condition process program element components to be ORed, the program element component reuse screen as shown in FIG. 20 is opened. The configuration of the program element component reuse screen is similar to that of the program component reuse screen (FIG. 19). A user inputs a parameter to be set in the parameter application area on this screen. FIG. 20 shows an example in which the device M3 is applied to the reuse parameter of the first AND condition process program element component.

In a case where a program element component to be reused includes another program element component, the type thereof is displayed in the field "type of element component" (in a case where the type is not set or a plurality of types are set, a desired type is selected using the field). Further, an expansion button is displayed also in the field "reuse parameter", which enables to set a reuse parameter of another program element component. In FIG. 20, the AND condition process program element component does not include a program element component, and thus the field "type of element component" is blank and an expansion button is not displayed as well.

On the program component reuse screen, upon pressing an expansion button of the second AND condition process program element component ("2" is displayed in the field "enumeration"), a program element component reuse screen as shown in FIG. 21 similar to that of FIG. 20 is opened. FIG. 21 shows an example in which the device M3 is applied to the reuse parameter of the first AND condition process program element component. FIG. 21 shows an example in which the devices M19 and X188E are enumerated and applied to the reuse parameters of the second AND condition process program element component.

FIG. 22 shows the results of setting reuses parameters as shown in FIG. 19, FIG. 20 and FIG. 21 and causing the program creation support device 1 to create a program. In this case, the program creation support device 1 creates a program in which the portion of the program element component VE1 is replaced with the OR combination of the AND condition process program element component M3 set in FIG. 20 and the AND condition process program element components M19 and X188E set in FIG. 21 in the M code completion process program component (FIG. 18).

The program component according to the present embodiment is characterized by including a string of program element components in which a plurality of program element components are created in a predetermined form (AND combination or OR combination) by enumerating a plurality of parameters (devices, variables (labels) or numerical values) and applying those to the reuse parameters in the case of reuse. In the program component, the number of program element components to be reused may vary in accordance with the number of reuse parameters applied to a program element component, and the program element component per se may take various forms in accordance with a parameter to be applied to thereto. Therefore, in the second embodiment, it is possible to create programs in more forms from one program element compared with the first embodiment. The program creation support device 1 according to the present embodiment is characterized by including the program component defining unit 12 capable of defining such a program component.

Accordingly, it is possible to reduce the efforts in the design regarding the selection of program components and combination thereof for creating a program conforming to a specification description, leading to a significant reduce of the efforts in creation of a program that adequately has the functions described in the specification. In addition, it is possible to automatically create an additional information file of the program created through reuse of a program component. The presence of this additional information facilitates the understanding of the created program, which reduces the efforts in understanding the created program.

<Third Embodiment>

A third embodiment describes the embodiment of using a larger program component (hereinafter, "program hierarchical component") obtained by combining a plurality of specific program components.

FIG. 23 is a diagram showing a functional block configuration (software block configuration) of a program creation support device 1 according to the third embodiment. The program creation support device 1 further includes a program hierarchical component defining unit 19 for defining a program hierarchical component 21, in addition to the configuration of the second embodiment (FIG. 16). The program hierarchical component 21 that has been defined is stored in the program component holding unit 11. The program hierarchical component 21 includes a reuse parameter 22 set in the case of reuse thereof.

While FIG. 23 shows the configuration in which the program component defining unit 12, program element component defining unit 15 and program hierarchical component defining unit 19 are contained in the program creation support device 1, those may be external devices.

Figure 24:
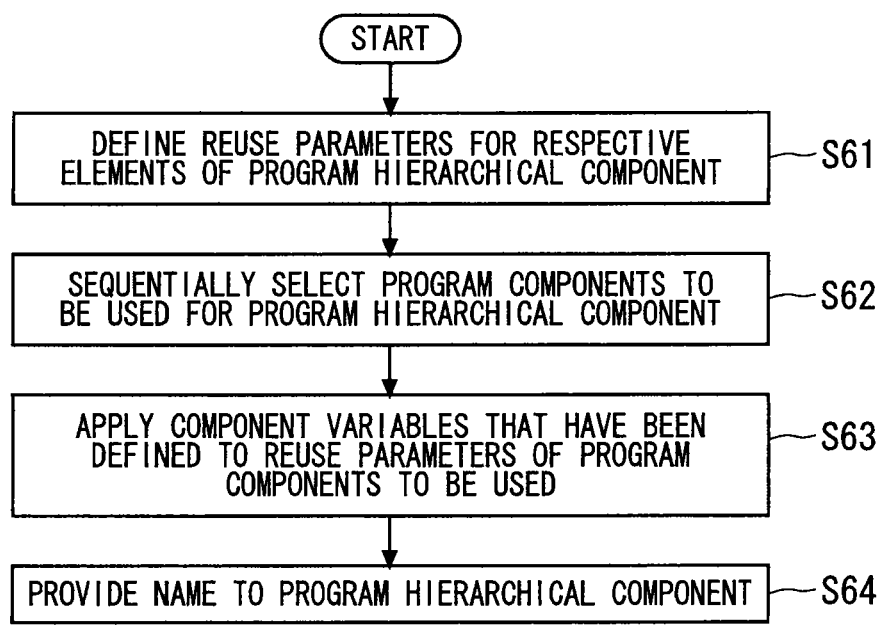
FIG. 24 is a flowchart showing the procedure of defining a program hierarchical component according to the third embodiment.

FIG. 24 is a flowchart showing the procedure of defining the program hierarchical component 19. FIG. 25 and FIG. 26 shows an example of the operation screen display (program hierarchical component definition screen) in the case of defining a program hierarchical component with the program hierarchical component defining unit 19. Shown here is an example of the screen for defining a program hierarchical component that processes the exclusive selection numerical value setting in ladder diagram format.

The program hierarchical component definition screen (ladder hierarchical component definition screen) has a configuration where a program component setting area for setting program components included in the program hierarchical component to be created, a parameter definition area for defining reuse parameters of the program hierarchical component, and a program hierarchical component name input area to which the name of the program hierarchical component is input are arranged in order from the top. The program component setting area further includes a program component order setting area for setting the arrangement of program components in the program hierarchical component and a parameter application area for applying predetermined parameters to the reuse parameters of the respective program components that constitute the program hierarchical component.

Hereinafter, the procedure of defining a program hierarchical component is described by taking, as an example, an exclusive selection numerical value setting program hierarchical component consisting of the self-holding process program component shown in FIG. 3 and the numerical value setting process program component defined as in FIG. 27.

First, reuse parameters set in the case of reusing a program hierarchical component are defined as component variables used in the description of the program hierarchical component (S61). In the example of FIG. 25 and FIG. 26, a component variable VB to be provided to a command relay (A contact to which the component variable VB1 as a reuse parameter is provided in FIG. 27) of an exclusive selection numerical value setting program is denied as No. 1 reuse parameter. In addition, a component variable VK to be provided to a numerical value (variable VK2 of FIG. 27) to be set by a numerical value setting process instruction (MOV) is defined as No. 2 reuse parameter, a component variable VM representing an internal local variable (internal relay) is defined as No. 3 reuse parameter, and a component variable VD to be provided to a register to which a numerical value is set (variable VD3 of FIG. 27) is defined as No. 4 reuse parameter.

Here, check boxes of "enumeration" of the parameter definition area serve to set whether or not parameters can be enumerated and set for the reuse parameters. In the example of FIG. 25 and FIG. 26, Nos. 1 to 3 reuse parameters checked (with "v") are defined as ones in which parameters can be enumerated and set. The program hierarchical component creates a program by reusing predetermined program components for the number of enumerated parameters.

As shown in the parameter definition areas of FIG. 25 and FIG. 26, a program comment and a program pointer may be prepared as the reuse parameters of a program hierarchical component.

Next, the program components reused in the program hierarchical component and the order thereof are selected with the use of the program component order setting area (S62). In the case of creating a program with the use of the program hierarchical component, the program components selected in this process are reused in the order of selection.

In the example of FIG. 25 and FIG. 26, a list of program components that have been defined is displayed in the right box of the program component order setting area, and upon selecting one from the list and pressing a selection button ("<<"), the selected one is added to a ladder diagram of the left box. Meanwhile, one program component displayed in the left box (ladder diagram) is selected and a deletion button is pressed, whereby the program component can be deleted from the ladder diagram. Further, one program component displayed in the left box is selected and a going up/down button (arrow button "↑" or "↓") is pressed, whereby the order of the program component is changed.

FIG. 25 and FIG. 26 show the example in which a self-holding process program component is first selected from the list of program components and added to the ladder diagram, and then a numerical value setting process program component is selected and added next to the self-holding process program component of the ladder diagram. This results in the definition of a program hierarchical component capable of creating a program in which the self-holding process program component and the numerical value setting process program component are reused in this order. Upon enumerating and setting parameters in reuse parameters, the program hierarchical component is capable of creating a program in which the self-holding process program component and the numerical value setting process program component are repeatedly reused for the number of the enumerated parameters.

Next, the component variables defined as reuse parameters in the program hierarchical component are applied to the reuse parameters of the program components included in the program hierarchical component (S63). In the example of FIG. 25 and FIG. 26, if the program component in the left box (ladder diagram) of the program component order setting area is selected, a list of reuse parameters of the selected program component is displayed in the parameter application area therebelow.

In FIG. 25, the self-holding process program component is selected in the left box of the program component order setting area, and a list of reuse parameters thereof is displayed in the parameter application area. Here, one (VB@) obtained by adding a symbol "@" to No. 1 reuse parameter VB of the program hierarchical component is applied to No. 1 reuse parameter (VB1 of FIG. 3) of the self-holding process program component, one (VB@!) obtained by adding a symbol "@!" to No. 1 reuse parameter VB of the program hierarchical component is applied to No. 2 reuse parameter (VB2 of FIG. 3) of the self-holding process program component, and one (VM@) obtained by adding a symbol "@" to No. 3 reuse parameter VM of the program hierarchical component is applied to No. 3 reuse parameter (VB3 of FIG. 3) of the self-holding process program component.

In FIG. 26, the numerical value setting process program component is selected in the left box of the program component order setting area, and a list of reuse parameters thereof is displayed in the parameter application area. Here, one (VM@) obtained by adding the symbol "@" to No. 3 reuse parameter VM of the program hierarchical component is applied to No. 1 reuse parameter (VB1 of FIG. 27) of the numerical value setting process program component, one (VK@) obtained by adding the symbol "@" to No. 2 reuse parameter VK of the program hierarchical component is applied to No. 2 reuse parameter (VK2 of FIG. 27) of the numerical value setting process program component, and No. 4 reuse parameter VD of the program hierarchical component is applied to No. 3 reuse parameter (VD3 of FIG. 27) of the numerical value setting process program component.

Note that the symbol "@" represents that the enumerated parameters are sequentially applied one by one in the case of repeatedly reusing the program components in the program hierarchical component for the number of enumerated parameters. The symbol "@!" represents that all parameters excluding the parameters applied based on the symbol "@" are enumerated and applied in the case of repeatedly reusing the program components in the program hierarchical component for the number of enumerated parameters.

In the case of reusing the program hierarchical component, the program components included in the program hierarchical component are repeatedly reused for the number of parameters enumerated and applied to the reuse parameters. For example, assuming that three parameters X1, X2 and X3 are enumerated and applied to the reuse parameters VB, reuse is performed three times. In that case, in the first reuse, the first parameter X1 is applied to VB@, while the other parameters X2 and X3 are applied to VB@!. In the second reuse, the second parameter X2 is applied to VB@, while the other parameters X1 and X3 are applied to VB@!. In the third reuse, the third parameter X3 is applied to VB@, while the other parameters X1 and X2 are applied to VB@!.

Finally, a name is input to the program hierarchical component created in the program hierarchical component name input area (S64), and is saved, whereby the definition of the program hierarchical component is completed.

Note that a program hierarchical component can serve as a constituent element of another program hierarchical component. In a case where there is a program hierarchical component that has been defined and stored, that is displayed in the right box of the program component order setting area on the program hierarchical component definition screen and can be selected similarly to a normal program component. This enables to define a program hierarchical component that reuses another program hierarchical component.

FIG. 28 shows an example of an operation screen display (program hierarchical component reuse screen) in the case of causing the program creation support device 1 to automatically create a program through reuse of a program hierarchical component. The program hierarchical component reuse screen has almost the same configuration as that of FIG. 10, and includes a program hierarchical component name display area in which the name of a program hierarchical component to be reused is displayed and a parameter application area for inputting parameters such as devices or variables (labels) applied to reuse parameters.

FIG. 28 shows the case of reusing the program hierarchical component defined as shown in FIG. 25 and FIG. 26. The contents defined in the parameter definition area of the program hierarchical component definition screen of FIG. 25 and FIG. 26 are displayed in the fields "No.", "enumeration" and "description" of the reuse parameters displayed in the parameter application area.

The user inputs parameters applied to reuse parameters in the parameter application area. On this occasion, it is possible to input two or more enumerated parameters to the reuse parameters whose field "enumeration" is checked (with "v"). However, it is required that the same number of parameters be enumerated and applied to the respective reuse parameters (limited to ones where parameters can be enumerated and applied).

FIG. 28 shows an example in which "cutting override setting switch" is applied to the program comment, "X285, X286, X287, X288" is applied to No. 1 reuse parameter (VB), "25, 50, 75, 100" is applied to No. 2 reuse parameter (VK), "M4002, M4003, M4004, M4005" is applied to No. 3 reuse parameter (VM), and "R2500" is applied to No. 3 reuse parameter (VD). In this case, the ladder program as shown in FIG. 29 is created by the program creation support device 1.

Figure 29:
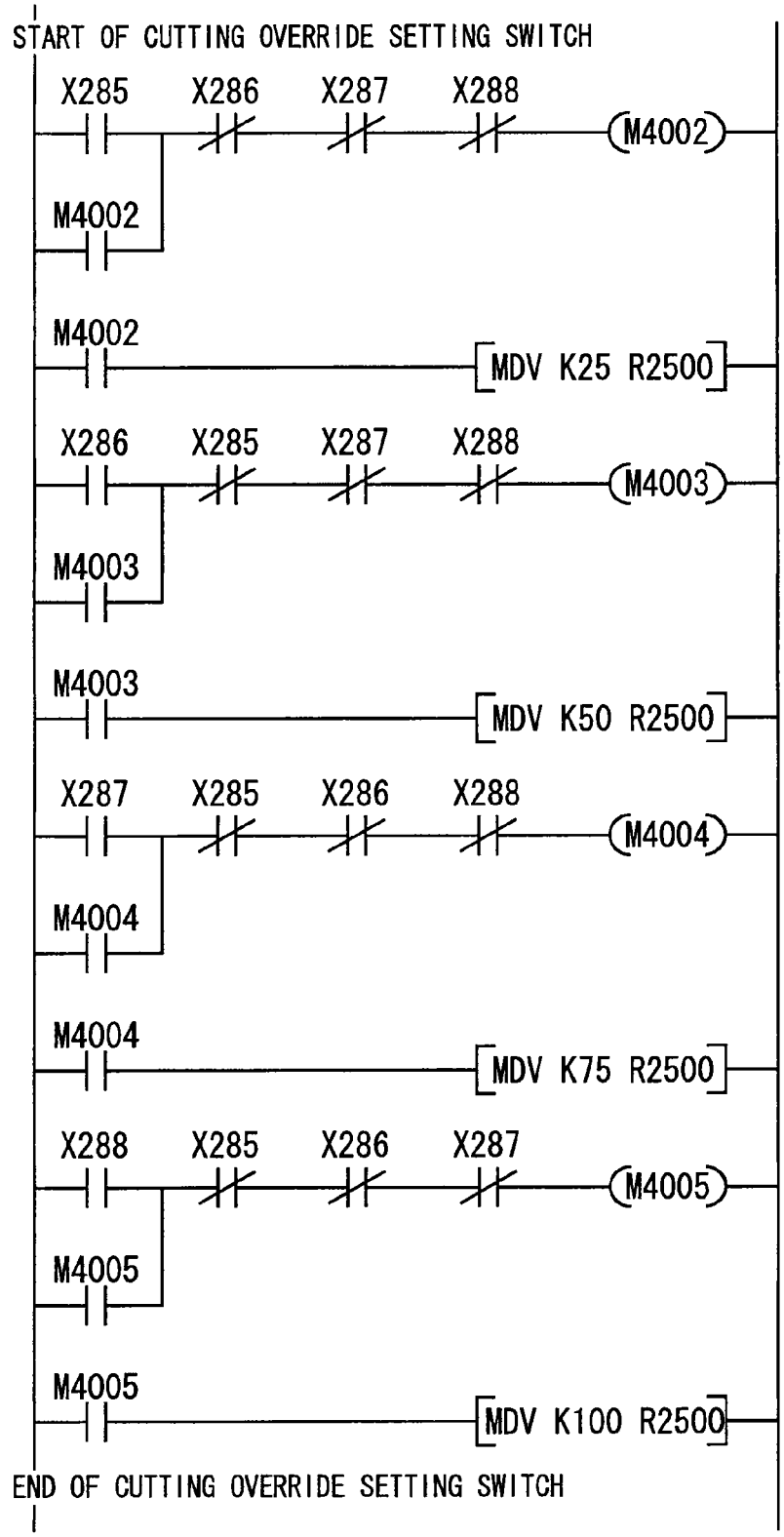
FIG. 29 is a diagram showing a cutting override setting switch program created by reusing an exclusive selection value setting program hierarchical component according to the third embodiment.
Figure 30:
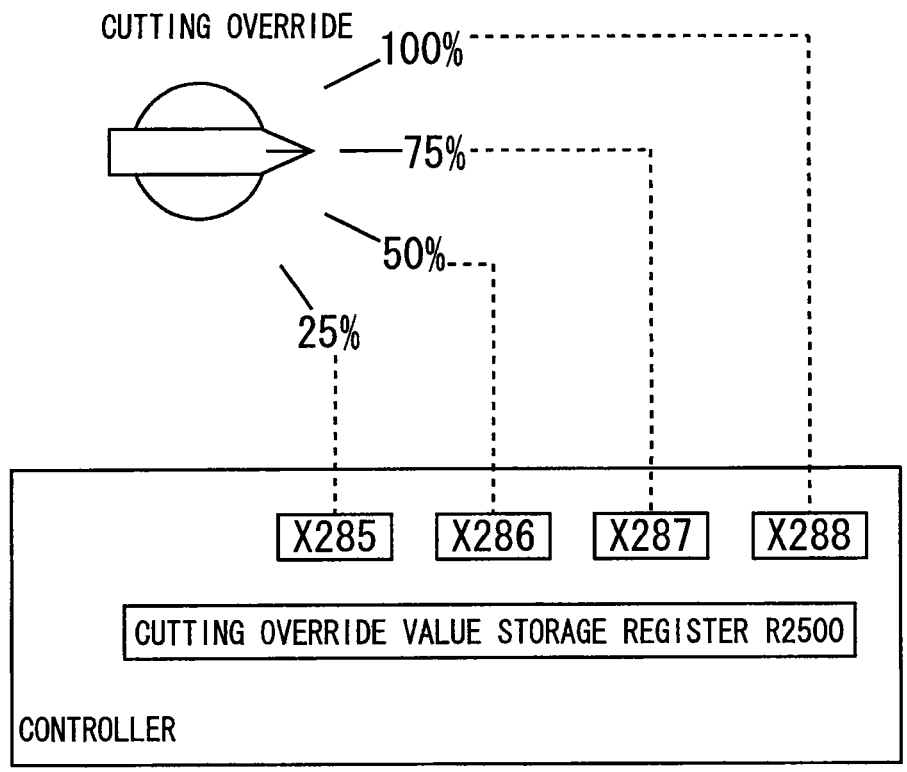
FIG. 30 is a diagram showing an example of a cutting override setting switch.

The program of FIG. 29 is a program that processes the setting results of a cutting override switch as shown in FIG. 30. An operator of a facility selects a cutting override value when the facility works from 25%, 50%, 75% and 100% by means of the cutting override switch provided to a control panel or the like of the facility. An output of the cutting override switch is connected to respective X devices (X285, X286, X287 and X288) of a controller installed for measuring, monitoring and controlling the facility. The controller stores the cutting override values selected through ON/OFF of the respective X devices in a register R (R2500) of the controller.

Figure 31:
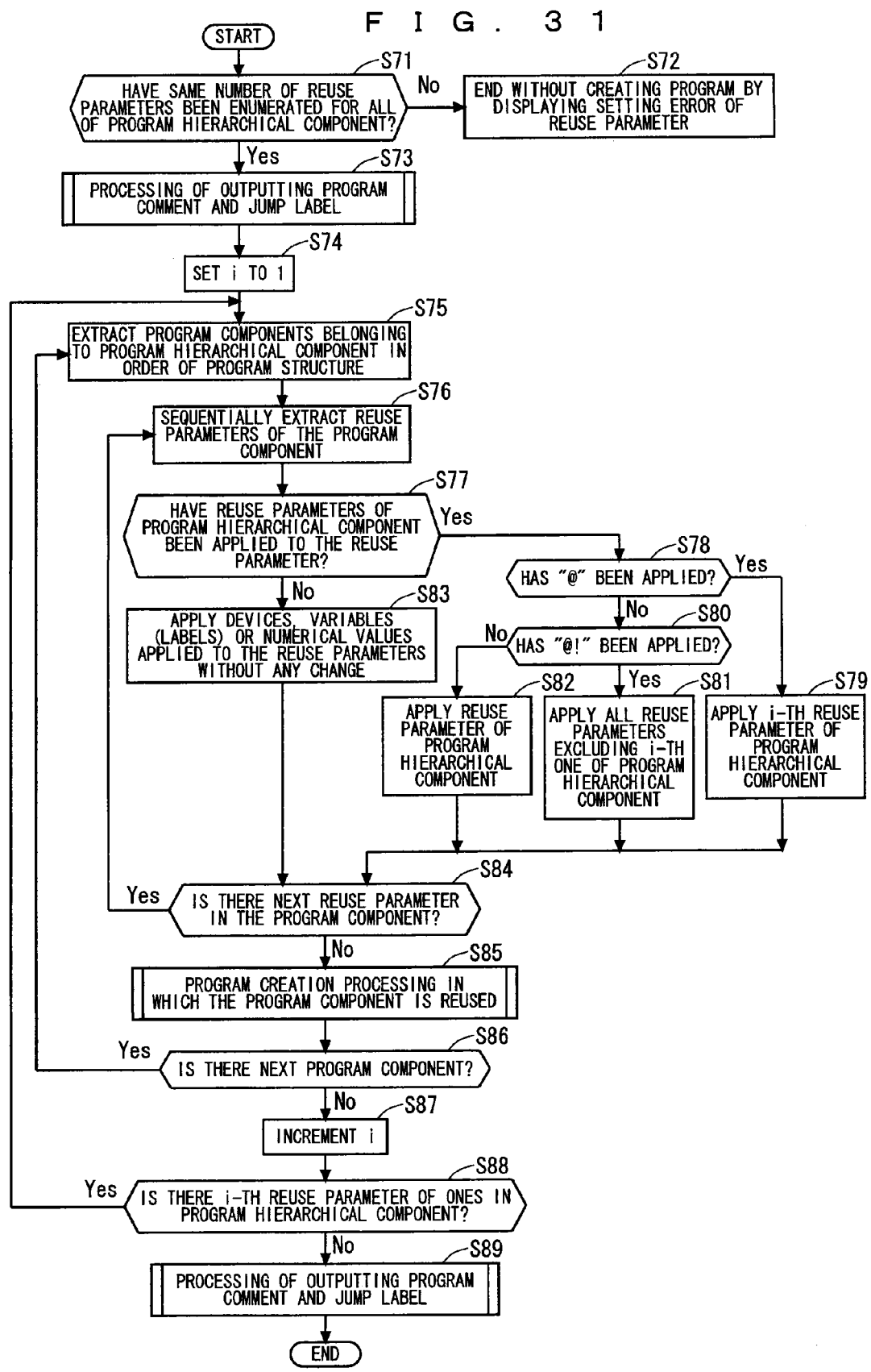
FIG. 31 is a flowchart showing the method of creating a program in which the program hierarchical component according to the third embodiment is reused.

The creation method for a program in which program components are reused, performed by the program creation support device 1, is described below. FIG. 31 is a flowchart of the creation method. The case of creating the ladder program shown in FIG. 7 is taken here as an example.

As shown in FIG. 29, when a user inputs the information required for the program hierarchical component reuse screen and instructs the creation of a program, first, the program creation support device 1 enumerates parameters and checks whether there are a plurality of reuse parameters (ones checked (with "v") in the field of "enumeration" in the parameter definition area on the program hierarchical component definition screen) that can be applied and, in a case where there are a plurality of reuse parameters, checks whether or not the same number of parameters have been applied to all of them (S71). If there is one with a different number, the program creation support device 1 ends the process without creating a program by, for example, display of a setting error of a reuse parameter (S72).

Next, the program creation support device 1 performs the process corresponding to the setting contents of the program comment and the jump label (program pointer) as reuse parameters (S73). This process is identical to the process of Steps S31 to S34 of FIG. 11.

Thereafter, the program is created by reusing program components for the number of the parameters enumerated and applied to the reuse parameters. First, an index i for counting the number of reuses is set to one (S74). The index i is increased by one every time the reuse of a program component is completed, and the program component is repeatedly reused until the value of i exceeds the number of enumerated parameters.

The program components are reused in order of a program structure of a program hierarchical component, that is, in the order set in the program component order setting area on the program hierarchical component definition screen. The program creation support device 1 extracts program components in order of a program structure of a program hierarchical component (S75).

Then, program creation support device 1 sequentially extracts the reuse parameters of the extracted program components (S76), and checks whether reuse parameters of the program hierarchical component have been applied thereto (S77). If the reuse parameters of the program hierarchical component have been applied, it is judged whether the symbol "@" has been added thereto (S78), the symbol "@!" has been added thereto (S80), or neither.

If the symbol "@" has been added to the reuse parameter of the program component, an i-th reuse parameter of the program hierarchical component is applied thereto (S79). If the symbol "@!" has been added to the reuse parameter of the program component, all reuse parameters excluding the i-th one of the program hierarchical component are enumerated and applied thereto (S81). If none of those symbols has been added, the reuse parameter of the program hierarchical component is applied to the reuse parameter of the program component (S82).

In a case where the reuse parameters of the program hierarchical component have not been applied to the extracted reuse parameters of the program component (No in S77), the devices, variables (labels) or numerical values applied to the reuse parameters of the program hierarchical component are applied without any change (S83).

The process (S76 through S83) regarding the reuse parameters of the program component is executed on all the reuse parameters of the program component (S84). Upon completion of the process on all the reuse parameters (No in S84), a program in which the program component is reused is created based on the processing results (S85). In this program creation step, the process similar to the creation method for a program shown in FIG. 11 is performed.

The process from the extraction of program components (S75) to the creation of a program by reusing the program components (S85) is executed on all the program components of the program hierarchical component in the specified order (S86). Upon completion of the above-mentioned process for all the program components (No in S86), the index i is incremented (S87), and the above-mentioned process is repeated until the index i after being incremented exceeds the number of parameters enumerated in the reuse parameters of the program hierarchical component (S88).

Finally, the process corresponding to the setting contents of the program comment and jump label (program pointer) as reuse parameters is performed (S89). This is the same process as the process of Steps S44 to S47 of FIG. 11.

The program creation method described above is described specifically by taking, as an example, a case where the reuse parameters are set as shown in FIG. 28 for the program hierarchical component defined as shown in FIG. 25 and FIG. 26.

As shown in FIG. 28, when a user inputs the information required for the program hierarchical component reuse screen and orders the creation of a program, the program creation support device 1 checks the number of parameters enumerated in Nos. 1 to 4 reuse parameters whose field "enumeration" are checked (with "v") (S71). In this case, four parameters are enumerated in each of them, and thus a setting error does not occur. Accordingly, the creation of a program is executed.

"Cutting override setting switch" has been set in the program comment of a reuse parameter, and thus, the program creation support device 1 first outputs, as a program comment, "start of cutting override setting switch" obtained by providing "start of" thereto (S73). A jump label has not been set.

After setting the index i to one, the program creation support device 1 extracts the program components in order of the structure of the program hierarchical component (S75). As defined in FIG. 25 and FIG. 26, the first program component of the program hierarchical component is a self-holding process program component, which is extracted. Then, the reuse parameters of the extracted self-holding process program component are sequentially extracted (S76).

First, applied to No. 1 reuse parameter VB1 of the self-holding process program component is one obtained by adding the symbol "@" to No. 1 reuse parameter VB of the program hierarchical component. Accordingly, the first (i-th) device X285 among the devices X285, X286, X287 and X288 that have been enumerated and set therein is applied to No. 1 reuse parameter VB1 of the self-holding process program component (S79).

Applied to No. 2 reuse parameter VB2 of the self-holding process program component is one obtained by adding the symbol "@!" to No. 1 reuse parameter VB of the program hierarchical component. Accordingly, the devices X286, X287 and X288 excluding the first (i-th) one among the devices X285, X286, X287 and X288 that have been enumerated and set therein are applied to No. 2 reuse parameter VB2 of the self-holding process program component (S81).

Applied to No. 3 reuse parameter VB3 of the self-holding process program component is one obtained by adding the symbol "@" to No. 3 reuse parameter VM of the program hierarchical component. Accordingly, the first (i-th) device M4002 among the devices M4002, M4003, M4004 and M4005 that have been enumerated and set therein is applied to No. 3 reuse parameter VB3 of the self-holding process program component (S79).

The program created by reusing the self-holding process program component is output based on the application results of the reuse parameters described above (S85).

After the end of the program creation by reusing the self-holding process program component, a numerical value setting process program component that is the second program component of the program hierarchical component is extracted (S75). Then, the reuse parameters of the extracted numerical value setting process program component are sequentially extracted (S76), and the process similar to the above is performed.

Applied to No. 1 reuse parameter VB1 of the numerical value setting process program component is one obtained by adding the symbol "@" to No. 3 reuse parameter VM of the program hierarchical component. Accordingly, the first (i-th) device M4002 among the devices M4002, M4003, M4004 and M4005 that have been enumerated and set therein is applied to No. 1 reuse parameter VB1 of the numerical value setting process program component (S79).

Applied to No. 2 reuse parameter VK2 of the numerical value setting program component is one obtained by adding the symbol "@" to No. 3 reuse parameter VK of the program hierarchical component. Accordingly, the first (i-th) numerical value 25 (in FIG. 29, expressed "K25" in decimal) among the numerical values 25, 50, 75 and 100 that have been enumerated and set therein is applied to No. 2 reuse parameter VK2 of the numerical value setting process program component (S79).

Applied to No. 3 reuse parameter VD3 of the numerical value setting process program component is No. 4 reuse parameter VD of the program hierarchical component. The symbol "@" or the symbol "@!" has not been added thereto, and accordingly the device R2500 set therein is applied to No. 3 reuse parameter VD3 of the numerical value setting process program component without any change (S82).

The program created by reusing the numerical value setting process program component is output based on the application results of the reuse parameters described above (S85).

Upon completion of the program creation by reusing the self-holding process program component and the numerical value setting process program component in this manner, the index i is incremented (S87). In the example of FIG. 28, four parameters are enumerated, and accordingly, as to the indices i of 2, 3 and 4, the program creation by reusing the self-holding process program component and the numerical value setting process program component is repeated through the procedure similar to the above.

Finally, the process corresponding to the setting contents of the program comment and jump label (program pointer) as the reuse parameters is performed (S89). In the example of FIG. 28, "end of cutting override setting switch" obtained by providing "end of" to the set program comment "cutting override setting switch" is output as a program comment. The jump label has not been set, and accordingly, a return instruction is not output.

Through the procedure described above, the program shown in FIG. 29 is created.

The program hierarchical component according to the present embodiment is capable of creating a program configured by the combination of a plurality of program components through reuse. On that occasion, by enumerating a plurality of parameters (such as devices, variables (labels) and numerical values) and applying those to the reuse parameters of the program hierarchical component, it is possible to create a program having a configuration in which the program components are reused a plurality of times. The program hierarchical component may take various forms in accordance with the number of enumerated parameters to be applied to the reuse parameters. The program creation support device 1 according to the present embodiment is characterized by including the program component defining unit 12 capable of defining such program components.

The combination of the first and second embodiments enables to create programs in more forms compared with the first and second embodiments. The program creation support device 1 according to the present embodiment is characterized by including the program component defining unit 12 capable of defining such program components.

Accordingly, it is possible to reduce the efforts in the design regarding the selection of program components and combination thereof for creating a program conforming to the specification description, leading to a significant reduction in the efforts of creating a program that adequately has the functions described in the specifications. Further, it is possible to automatically create the additional information file of the program created by reusing program components, and the presence of the additional information facilitates the understanding of the created program, leading to a reduction of the efforts in understanding the created program.

<Fourth Embodiment>

A program creation support device 1 according to a fourth embodiment creates a program for controlling machine tools. Described below as an example is a case where the program creation support device 1 creates a ladder program. First, a machine tool that uses the ladder program created by the program creation support device 1 is described before describing the program creation support device 1.

Figure 33:
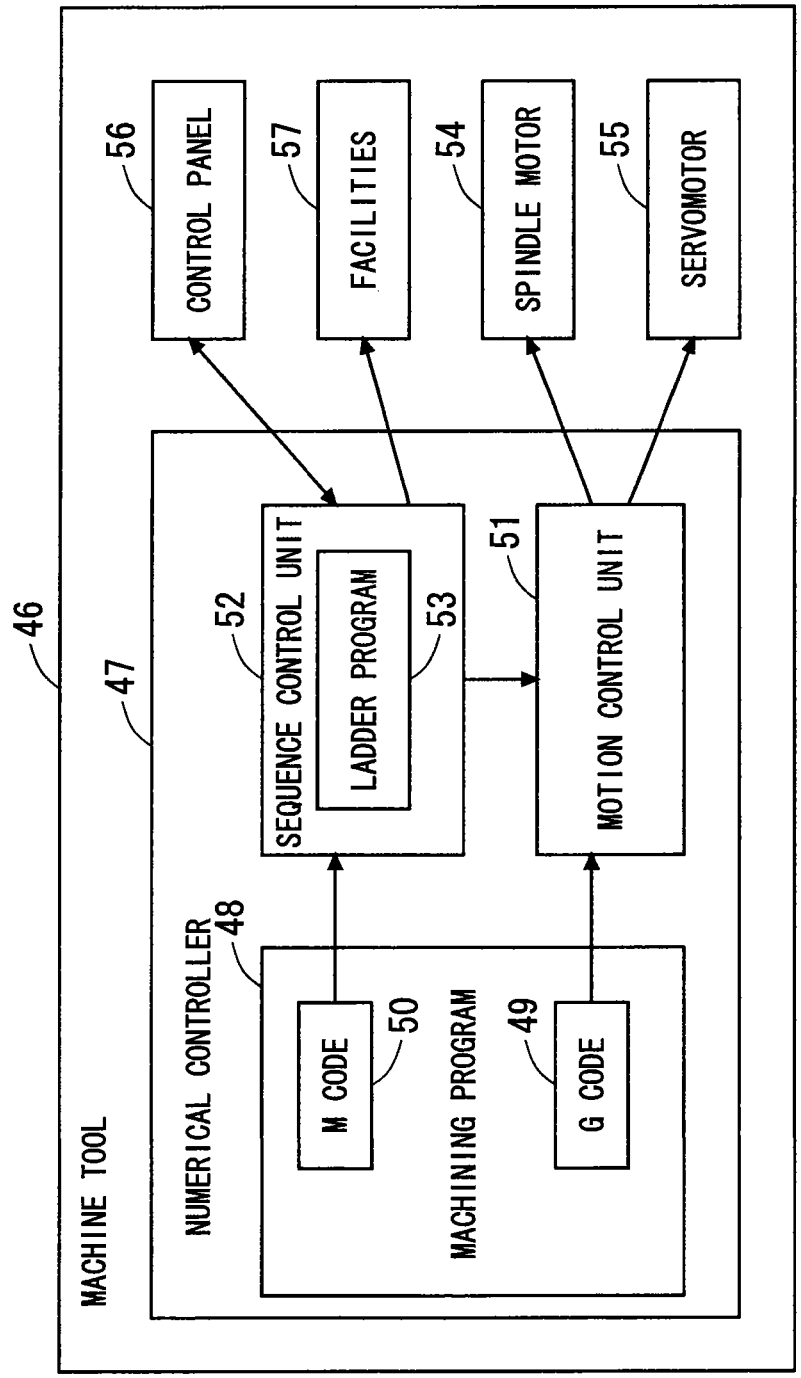
FIG. 33 is a block diagram showing a configuration of a machine tool according to a fourth embodiment.

FIG. 33 is a block diagram showing the configuration of the machine tool. A machine tool 46 includes a computerized numerical controller (hereinafter, denoted as "CNC") 47, a spindle motor 54 and a servomotor 55 that cause a tool and a workpiece of the machine tool 46 to rotate and move, a control panel 56 for operating the machine tool 46, and facilities 57. In the following, the machine tool 46 including the CNC 47, which is shown in FIG. 33, is referred to as a "CNC machine tool 46" in some cases.

The CNC 47 is configured as, for example, a computer installed in the CNC machine tool 46, and includes a motion control unit 51 having a motion control function and a sequence control unit 52 having a sequence control function. The CNC 47 stores a machining program 48 in which a machining procedure in the CNC machine tool 46 is described, and the CNC 47 interprets the machining program 48 to, for example, control the spindle motor 54 and the servomotor 55 and control the facilities 57.

Specifically, a G code 49 instructing amounts and speeds of movements of the tool and workpiece is described in the machining program 48, and the motion control unit 51 of the CNC 47 controls the rotations and movements of the spindle motor 54 and servomotor 55 based on the command (numerical value) of the G code 49. This enables the machine tool 46 including the CNC 47 to rotate and move the tool and workpiece with desired amount and speed of movement.

Further, an M code 50 instructing the control of the facilities 57 is described in the machining program 48, and the sequence control unit 52 of the CNC 47 controls the facilities 57 based on the command of the M code 50. The sequence control unit 52 has a function similar to that of PC, and accordingly may be implemented as hardware that is equivalent to PC but is different from PC or as hardware of PC.

Specifications regarding the creation of a ladder program of the CNC machine tool 46 as described above are disclosed in, for example, Non-Patent Document 2 (Non-Patent Document 2: PLC programming manual IB-1500035, <http://wwwf2.mitsubishielectric.co.jp/melfansweb/index_j.htm>).

For the proper operation of the CNC machine tool 46 as described above, the CNC machine tool 46 needs to include a ladder program 53 (hereinafter, "M code processing program") for controlling the facilities 57 as instructed in the M code 50, and also needs to include a ladder program 53 (hereinafter, "control panel processing program") for controlling the machine tool 46 with the control panel 56.

<Configuration of Program Creation Support Device 1>

The program creation support device 1 according to the present embodiment creates a control panel processing program and an M code processing program used in the CNC machine tool 46 in accordance with the specifications of the control panel 56 and the specifications of the M codes 50. The program creation support device 1 according to the present embodiment is described below. Note that the program creation support device that creates the control panel processing program and M code processing program may be a device that is equivalent to the program creation support device for creating a ladder program of PC but is different therefrom, or a program creation support device for creating a ladder program of PC may be applied thereto. While the CNC machine tool 46 generally includes a large number of switches in the control panel 56 and has several tens to several hundreds of M codes 50, in the following, description is given by taking, as an example, typical switches for selection of an operation mode and override and typical M codes such as M3, M4, M5 and M30.

The program creation support device 1 according to the present embodiment has the same hardware configuration as that of the block diagram shown in FIG. 2. To describe the hardware configuration with reference to FIG. 2, the storage unit 5 stores the data of the specifications about the CNC machine tool 46 and the file regarding the measurement, monitoring and control program. The program creation support device 1 displays the specifications to be input on the display unit 3, and the microprocessor 2 executes the program creation process in accordance with the specifications set by a user in the input unit 4.

Figure 34:
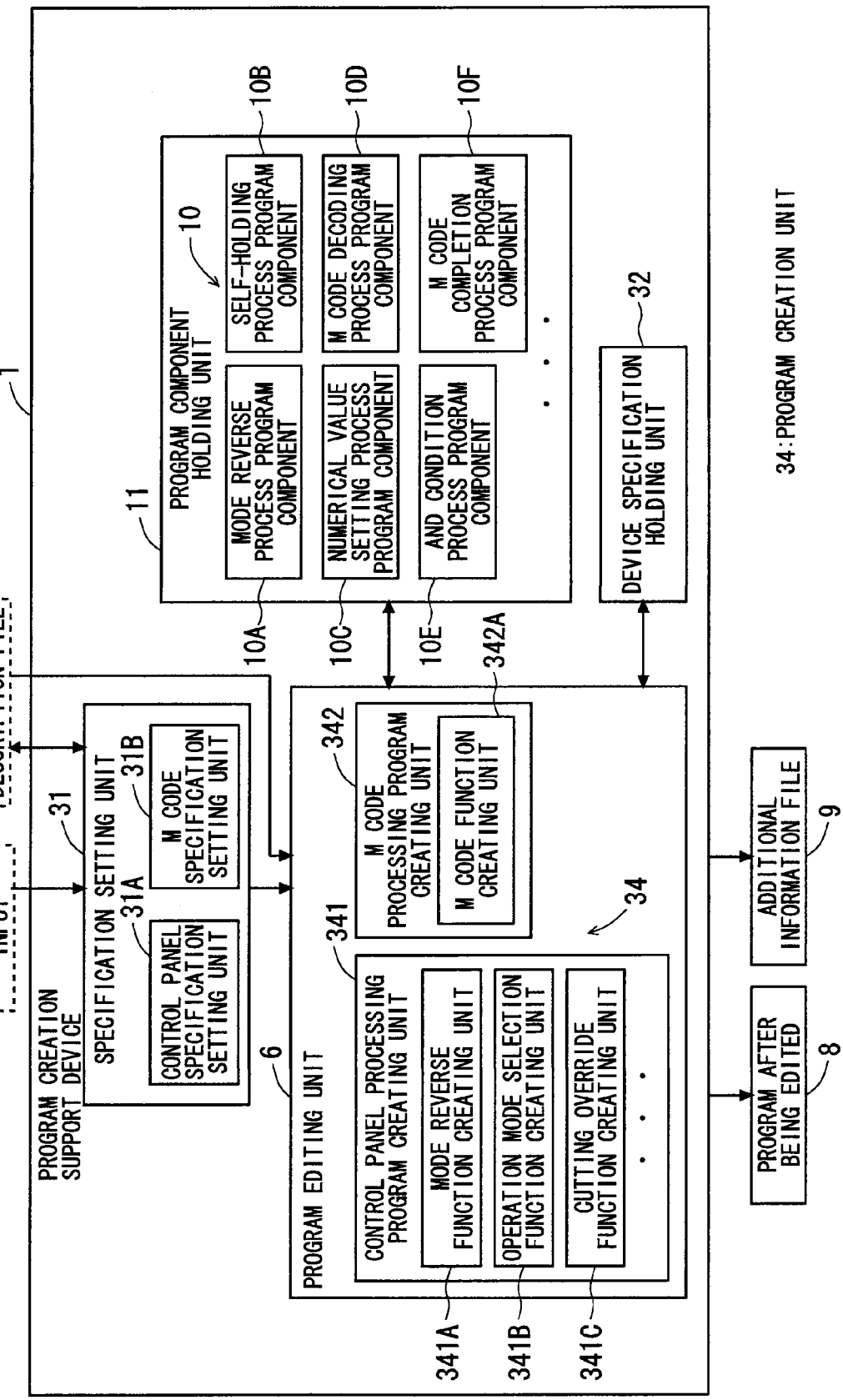
FIG. 34 is a diagram showing a software configuration of a program creation support device according to the fourth embodiment.

FIG. 34 is a diagram showing a functional block configuration (software block configuration) of the program creation support device 1 according to the present embodiment. The program creation support device 1 further includes a specification setting unit 31 and a device specification holding unit 32 for the program editing unit 6 and the program component holding unit 11 described in the embodiments above, respectively. For simplicity of the diagram, the program component defining unit 12 and the like are not shown in FIG. 34.

The specifications of the control panel 56, M code 50 and the like are input to the program creation support device 1 as a specification input 29 from the outside (specification input 29). The program creation support device 1 is connected to a specification description file 30 in which the specifications of the control panel 56, M code and the like are described and is capable of reading and writing the specification description file 30 regarding the specifications of the control panel 56, M code and the like.

The specification setting unit 31 receives the specifications of the control panel 56 and M codes 50 from the specification input 29 and the specification description file 30 and sets the specifications of the control panel 56 and the specifications of the M codes 50. In the present embodiment, the specification setting unit 31 includes a control panel specification setting unit 31A that receives the specifications of the control panel 56 and sets (stores) the specifications of the control panel 56, and an M code specification setting unit 31B that receives the specifications of the M codes 50 and sets (stores) the specifications of the M codes 50. For example, the specification setting unit 31 outputs the specifications (specification data) that have been set to the program editing unit 6 and outputs them so as to be written in the specification description file 30.

The program component holding unit 11 preliminarily holds the program components 10 such as a ladder component, which are used when the program editing unit 6 creates a program. The program components 10 may be ones defined in any of the first to third embodiments or may be ones defined in a conventional manner other than the above. The program component holding unit 11 according to the present embodiment includes, as the program components 10, a mode reverse process program component 10A, a self-holding process program component 10B, a numerical value setting process program component 10C, an M code decoding process program component 10D, an AND condition process program component 10E and an M code completion process program component 10F.

FIG. 35 is a diagram showing the specifications of the device addresses regarding the motion control input/output held by the device specification holding unit 32. The device specification holding unit 32 holds the specifications of the devices as shown in FIG. 35, as the specifications regarding the ladder program used by the CNC machine tool 46. Specifically, the device specification holding unit 32 holds a table in which the names that specify a motion control input/output are associated with device addresses to which the input/output thereof is assigned. The specifications of the device addresses regarding the creation of a ladder program by the CNC machine tool 46 are disclosed in, for example, Non-Patent Document 3 (Non-Patent Document 3: PLC interface manual IB-1500000, <http://wwwf2.mitsubishi-electric.co.jp/melfansweb/index_j.htm>).

The program editing unit 6 receives the specifications from the specification setting unit 31 and reads the specifications stored in the specification description file 30, to thereby obtain the specifications of the control panel 56 and M code 50. In the present embodiment, the program editing unit 6 includes a program creating unit 34. The program creating unit 34 applies the specifications of the control panel 56 and M code 50 that have been described in the specification description file 30 and the specifications of the control panel 56 and M code 50 that have been set in the specification setting unit 31 to the reuse parameters 22 of the program components 10, to thereby create a program from the program components 10. The program creating unit 34 according to the present embodiment refers to the specifications of the devices held by the device specification holding unit 32 in a case of creating a program from the program components 10.

In the present embodiment, the program creating unit 34 includes a control panel processing program creating unit 341 and an M code processing program creating unit 342, and includes means for creating a program for each functional specifications. Next, the control panel processing program creating unit 341 and the M code processing program creating unit 342 are described.

The control panel processing program creating unit 341 applies the specifications of the control panel 56 described in the specification description file 30 and the specifications of the control panel 56 set in the specification setting unit 31 to the reuse parameters 22 of the program components 10 held in the program component holding unit 11, to thereby create the control panel processing program from the program components 10.

In the present embodiment, the control panel processing program creating unit 341 includes a mode reverse function creating unit 341A, an operation mode selection function creating unit 341B and a cutting override function creating unit 341C (hereinafter, which are denoted collectively by "function creating units 341A to 341C" in some cases), and each of the function creating units 341A to 341C creates a control panel processing program for performing control in a different manner in the control panel 56. Specifically, the mode reverse function creating unit 341A creates a control panel processing program for performing mode reverse control in the control panel 56, the operation mode selection function creating unit 341B creates a control panel processing program for performing operation mode selection control in the control panel 56, and the cutting override function creating unit 31C creates a control panel processing program for performing cutting override control in the control panel 56.

The M code processing program creating unit 342 applies the specifications of the M codes 50 described in the specification description file 30 and the specifications of the M codes 50 set in the specification setting unit 31 to the reuse parameters 22 of the program components 10 held by the program component holding unit 11, to thereby create the M code processing program from the program components 10. In the present embodiment, the M code processing program creating unit 342 includes an M code function creating unit 342A, and the M code function creating unit 342A creates an M code processing program.

The program editing unit 6 outputs the created control panel processing program and M code processing program as the program after being edited 8 and outputs the additional information file 9 related thereto if required. For example, in a case where the program after being edited 8 is a ladder program, the program editing unit 6 outputs the comments describing the contents of the respective devices used in the ladder program as the additional information file 9, as described in the first embodiment.

<Setting of Specifications in Control Panel Specification Setting Unit 31A>

Next, an example in which the specifications of the control panel 56 are set by the control panel specification setting unit 31A of the specification setting unit 31 is described.

Figure 36:
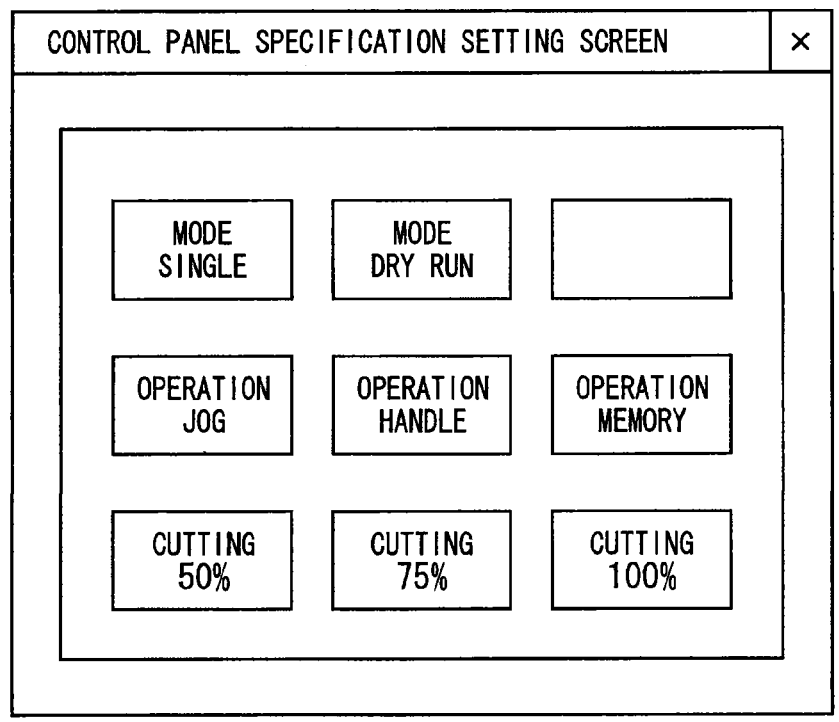
FIG. 36 is a diagram showing setting in specifications of a control panel.

FIG. 36 is a diagram showing an example of the screen (hereinafter, "control panel specification setting screen") for setting the specifications of the respective switches on the control panel 56 in the CNC machine tool 46 including the control panel 56 in which buttons other than toggle type, for example, press button switches are arranged. On the control panel specification setting screen shown in FIG. 36, a plurality of switches are displayed in a manner of being arranged in matrix and, upon double-click (selection) of any one of the switches by a user with a mouse, a switch specification setting screen corresponding to the switch is displayed.

Figure 37:
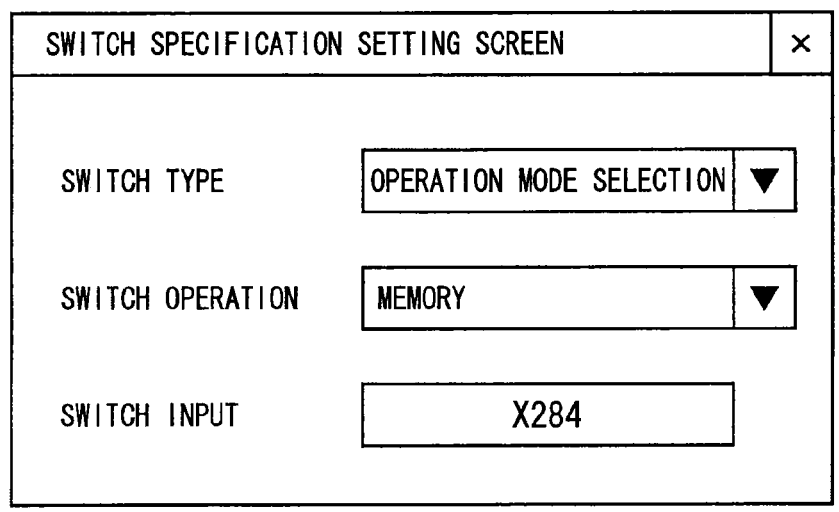
FIG. 37 is a diagram showing setting in specifications of a control panel.

FIG. 37 is a diagram showing a switch specification setting screen displayed in a case where a switch designated as "operation memory" is selected in FIG. 36. In this switch specification setting screen, a switch type, a switch operation and a switch input are set for the one switch selected in FIG. 36. Here, the character string displayed in the frame defining a switch shown in FIG. 36 is the combination of the leading portion of the character string set in the switch type and the character string set in the switch operation, which are shown in FIG. 37. For example, in the case where "operation mode selection" is set in the switch type and "memory" is set in the switch operation as shown in FIG. 37, "operation memory" obtained by combining the leading portion "operation" of the character string "operation mode selection" and "memory" is displayed in the frame of the switch as shown in FIG. 36. The switch (upper right switch in FIG. 36) in which a character string is not provided in FIG. 36 indicates that the switch type and switch operation are not set in FIG. 37.

As to the setting on the switch specification setting screen shown in FIG. 37, first, the switch type is set, and then, the switch operation is set.

A drop-down list or combo box (hereinafter, referred to as a "drop-down list or the like") is provided next to the character string "switch type", and a user selects one desired switch type from the list displayed therein, whereby a switch type is set. The switch types required for the control panel 56 of the CNC machine tool 46 are displayed in the list of the drop-down list or the like. In the present embodiment, the control panel specification setting unit 31A displays the types of the control panel processing programs that can be created by the control panel processing program creating unit 341, that is, the names ("mode reverse", "operation mode selection" and "cutting override") of the functions of the function creating units 341A to 341C included in the control panel processing program creating unit 341 on the list. One of them is set as the switch type by a user.

A drop-down list or the like is provided next to the character string "switch operation", and a desired switch operation is set from the list displayed therein. Specifically, the switch operations corresponding to the switch type that has been selected are displayed in the list, and one of them is set. As a result, a switch operation corresponding to a switch type is set for the control panel processing program that can be created by the control panel processing program creating unit 341.

In the present embodiment, upon setting of "mode reverse" in the switch type, "single block" and "dry run" are displayed in the drop-down list or the like of the switch operation as the switch operations in mode reverse, and one of them is set. Upon setting of "operation mode selection" in the switch type, "jog", "handle" and "memory" are displayed in the drop-down list or the like of the switch operation as the switch operations in operation mode selection, and one of them is set. Upon setting of "cutting override" in the switch type, in a case where the cutting override is expressed in % values, "25", "50", "75" and "100" are displayed in the drop-down list or the like of the switch operation as the switch operation in cutting override, and one of them is set.

Set in a box next to the character string "switch input" is an input device of PC assigned to the switch. If it is predetermined that each switch is assigned to a specific input device, the address of the device may be displayed such that address setting is omitted.

FIG. 38 is a diagram showing the screen for setting the specifications of the respective switches in a display form different from the display forms shown in FIG. 36 and FIG. 37. Similarly to the description above, "single block" and "dry run" are set in the field of the switch operation for "mode reverse", "jog", "handle" and "memory" are set in the field of the switch operation for "operation mode selection", and "25", "50", "75" and "100" are displayed in the field of the switch operation for "cutting override".

<Setting of Specifications in M Code Specification Setting Unit 31B>

Next, description is given of an example in which the specifications of the M codes 50 are set by the M code specification setting unit 31B of the specification setting unit 31.

FIG. 39 is a diagram showing an example of the screen for setting the functional specifications of the M codes 50 included in the CNC machine tool 46. M code numbers are set in the field "M code", and brief descriptions of the M code 50 are set in the field "function name".

In the field "start of function", "simultaneously with block start" and "after completion of block axis movement" are selectively displayed in a drop-down list or the like, and one of them is set. In this case, "simultaneously with block start" means that in a case where the M code 50 is instructed in the same block as the axis movement, the execution of the function of the M code 50 is started simultaneously with the start of the axis movement instructed in the block. "After completion of block axis movement" means that in a case where the M code 50 is instructed in the same block as the axis movement, the execution of the function of the M code 50 is started after the completion of the axis movement instructed in the block.

Nothing is set in the field "cancellation of function" in a case where the function of the M code 50 is effective only within the assigned block. However, in a case where it is intended to make the function of the M code 50 effective until it is cancelled or changed by other M codes 50 even after the block assigned as the function of the M code 50 is passed through the block, the other M codes 50 are enumerated and set in the field "cancellation of function". M code numbers different from the M code number set in the field of "M code" are set in the field "cancellation of function". For example, in a case where "M3" is set in the field "M code", M code numbers other than M3 are set in the field "cancellation of function", while in a case where "M4" is set in the field "M code", M code numbers other than M4 are set in the field "cancellation of function".

Set in the field "output of function" are addresses of devices such as a Y device being an output device and an M device being an internal device, to which the function of the M code 50 is output. Nothing is set in this field in a case where it is not required for the M code 50 to output a function.

Set in the field "completion of function" are addresses of the devices such as an X device being an input device and the M device being an internal device, which serve as the conditions for the completion of the function of the M code 50. Nothing is set in this field in a case where the function is completed simultaneously with the output of the function of the M code 50.

Next, each M code 50 set per row in the table shown in FIG. 39 is specifically described.

The M code 50 indicated by M03 (M3) represents an M code function of performing spindle forward rotation and, in a case where it is instructed in the same block as the axis movement, starts the function (spindle forward rotation) of the M code 50 simultaneously with the start of axis movement instructed in the block. The function of spindle forward rotation is continued until reverse rotation or stop is instructed, and thus the M code 50 indicated by M4 that performs the function of spindle reverse rotation and the M code 50 indicated by M5 that performs the function of spindle stop are set in the field "cancellation of function" as other M codes 50 that cancel the M code function of M3. Note that in the specifications shown in FIG. 39, Y1898 being an output device for allowing the forward rotation of a spindle is set in the field "output of function" as a function output destination device. In the specifications in which the function of M3 is completed if the spindle reaches a predetermined speed of rotation, X188D being an input device that shows, in a case where the spindle reaches the predetermined speed of rotation, the reaching is set in the field "completion of function" as a function completion condition device.

The M code 50 indicated by M04 (M4) represents an M code function of performing spindle reverse rotation and, in a case where it is instructed in the same block as the axis movement, starts the function (spindle reverse rotation) of the M code 50 simultaneously with the start of axis movement instructed in the block. The function of spindle reverse rotation is continued until forward rotation or stop is instructed, and thus the M code 50 indicated by M3 that performs the function of spindle forward rotation and the M code 50 indicated by M5 that performs the function of spindle stop are set in the field "cancellation of function" as other M codes 50 that cancel the M code function of M4. Note that in the specifications shown in FIG. 39, Y1899 being an output device for allowing the reverse rotation of a spindle is set in the field "output of function" as a function output destination device. In the specifications in which the function of M4 is completed if the spindle reaches a predetermined speed of rotation, X188D being an input device that shows, in a case where the spindle reaches the predetermined speed of rotation, the reaching is set in the field "completion of function" as a function completion condition device.

The M code 50 indicated by M05 (M5) represents an M code function of stopping a spindle and, in a case where it is instructed in the same block as the axis movement, starts the function (spindle stop) of the M code 50 simultaneously with the start of axis movement instructed in the block. The function of spindle stop is to cancel other M code functions, which is not canceled by other M code 50, and accordingly nothing is set in the field "cancellation of function". The function of spindle stop is to stop the operation, and thus nothing is set in the field "output of function" as well. In this diagram, X188C being an input device that shows, in a case where the speed of rotation of the spindle becomes zero, that fact is set in the field "completion of function" as a function completion condition device.

M30 represents an M code function of processing an end of data and, in a case where it is instructed in the same block as axis movement, starts the function (processing of the end of data) of the M code 50 simultaneously with the start of axis movement instructed in the block. The function of processing the end of data is to reset the CNC machine tool 46. Accordingly, the function of processing the end of data is not canceled by other M code 50, and thus cancellation of function is not set. In this diagram, YC1A being a device that resets the CNC machine tool 46 is set in the field "output of function" as a function output destination device. The function of M30 is completed simultaneously with the output of function.

<Program Component>

Next, description is given of the program components 10 that are reused in the creation of programs such as a control panel processing program by the control panel processing program creating unit 341 and reused in the creation of programs such as an M code processing program by the M code processing program creating unit 342.

As shown in FIG. 34, the mode reverse process program component 10A, the M code completion process program unit 10F are held in the program component holding unit 11 as the program components 10. Among those, the self-holding process program component 10B and the M code completion process program component 10F have been described in the first embodiment and the second embodiment, which are not described. The mode reverse process program component 10A, numerical value setting process program component 10C, M code decoding process program component 10D and AND condition process program component 10E are mainly described below. The numerical value setting process program component 10C has been described in detail in the third embodiment, which is briefly described here.

Figure 40:
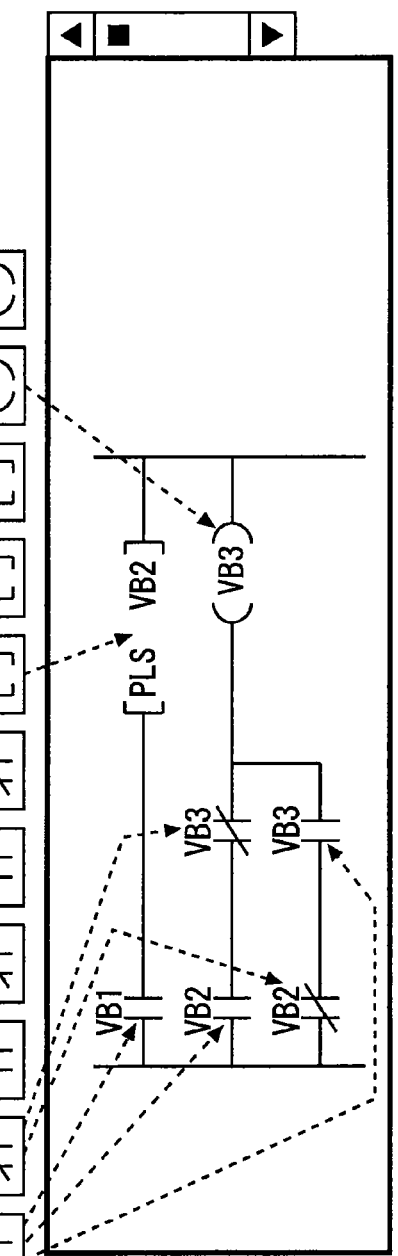
FIG. 40 is a diagram showing a mode reverse process program component according to the fourth embodiment.

FIG. 40 is a diagram showing the mode reverse process program component 10A obtained by segmentalizing the program that processes the function of mode reverse into components. Merely upon specifying devices or variables (labels) in the reuse parameters of the mode reverse process program component 10A shown in FIG. 40, a program (program component POU) that processes the function of mode reverse is automatically created based on the parameters.

Next, the behavior of a mode reverse process ladder program is described assuming that devices or the like are specified in the reuse parameters of the mode reverse process program component 10A shown in FIG. 40. In the initial state, VB1, VB2 and VB3 are all turned off. Upon turning-on of VB1 being a device that instructs mode reverse, VB2 is turned on for an amount of one scanning of PC by a PLS instruction, and upon turning-on of VB2, VB3 is reversed, that is, is turned on. While VB2 is turned off by a PLS instruction upon the next scanning of PC, VB3 is held to be turned on. Even if VB1 is turned off after a lapse of time, VB3 is held to be turned on. Upon turning-on of VB1 again after a lapse of time further, VB2 is turned on for an amount of one scanning of PC by a PLS instruction, and upon turning-on of VB2, VB3 is reversed, that is, turned off. While VB2 is turned off by a PLS instruction upon the next scanning of PC, VB3 is held to be turned off. Even if VB1 is turned off after a lapse of time, VB3 is held to be turned off.

Figure 27:
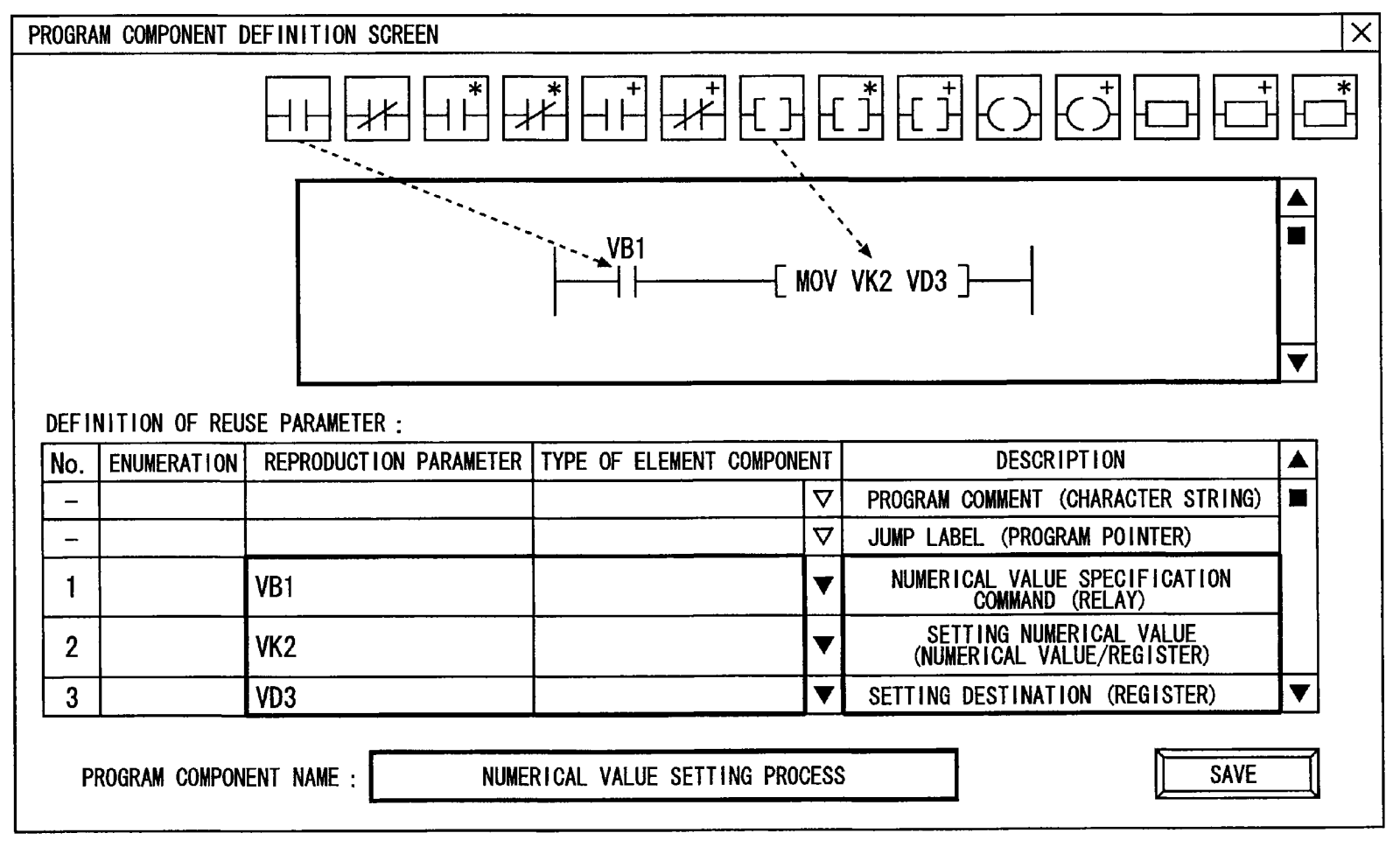

Next, the behavior of the numerical value setting process ladder program that processes the function of numerical value setting is described assuming that devices or the like are specified in the reuse parameters of the numerical value setting process program component 10C shown in FIG. 27. VB1 is turned off in the initial state, and the process of setting a numerical value to VD3 is not performed, and thus the numerical value of VD3 becomes equal to an initial value (that is, zero). Upon turning-on of VB1 being the device that instructs numerical value setting, the numerical value applied to VK2 by an MOV instruction is set to VD3. Even if VB1 is turned off after a lapse of time, the numerical value of VD3 is held, which is not always the case when a numerical value is set to VD3 in another location of the ladder program. In a case where it is desired that VD3 be held at the numerical value of VK2 even if the numerical value is set to VD3 in another location, it suffices that VB1 is held to be always turned on.

FIG. 41 is a diagram showing the M code decoding process program component 10D obtained by segmentalizing the program that processes the decoding function of the M code 50 into components. Merely upon specifying devices or variables (labels) to the reuse parameters of the M code decoding processing program component 10D shown in FIG. 41, a program (program component POU) that processes the decoding function of the M code 50 is automatically created based on the parameters.

Next, the behavior of the M code decoding process ladder program is described assuming that devices or the like are specified in the reuse parameters of the M code decoding process program component 10D shown in FIG. 41. In the initial state, VB1 and VB4 are both turned off. If VB1 is turned on and the value of VD2 is identical to the value of VD3, VB4 is turned on. If VB1 is turned off or the value of VD2 is different from the value of VK3, VB4 is turned off.

FIG. 42 is a diagram showing the AND condition process program component 10E obtained by segmentalizing the program that processes AND conditions into components. Merely upon specifying devices or variables (labels) in the reuse parameters of the AND condition process program component 10E shown in FIG. 42, a program (program component POU) that processes the AND conditions is automatically created based on the parameters. The AND condition processing is extremely typical in the ladder and is used frequently, and thus detailed description thereof is omitted.

<Creation of Control Panel Processing Program>

Next, description is given of the operation of applying, by the control panel processing program creating unit 341 (such as mode reverse function creating unit 341A) shown in FIG. 34, the device specifications shown in FIG. 35 and the specifications of the control panel 56 shown in FIG. 38 to the reuse parameters of the program component 10, to thereby create a control panel processing program from this program component 10.

Figures 43, 44:
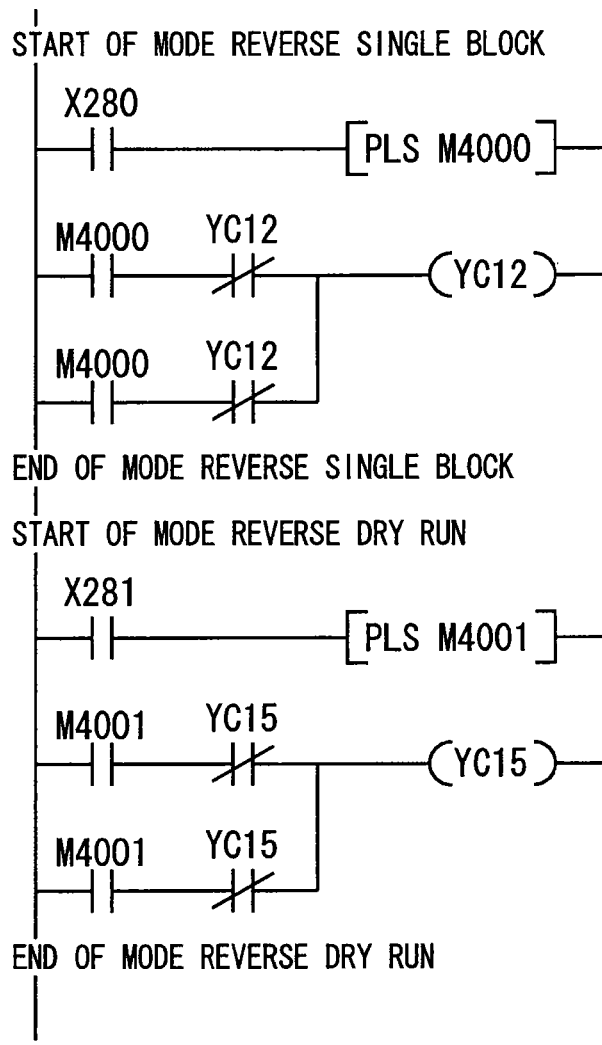
FIG. 43 is a diagram showing a control panel processing program created by a mode reverse function creating unit.
FIG. 44 is a diagram showing attributes of the mode reverse function creating unit.

FIG. 43 is a diagram showing an example of the control panel processing program created by the mode reverse function creating unit 341A. Described below is the operation of applying, by the mode reverse function creating unit 341A, the device specifications (FIG. 35) and the specifications (FIG. 38) of the control panel 56 regarding "mode reverse" to the reuse parameters of the mode reverse process program component 10A shown in FIG. 40, to thereby create the control panel processing program for controlling mode reverse shown in FIG. 43 from the mode reverse process program component 10A. Note that the control panel processing program for controlling mode reverse, which is created by the mode reverse function creating unit 341A, is also referred to as a "mode reverse switch process program" in some cases.

FIG. 44 shows the attributes of the mode reverse function creating unit 341A. Displayed in the switch type and switch operation of FIG. 44 are the contents regarding mode reverse among the specifications of the control panel 56 (FIG. 38). It is displayed here in the switch type "mode reverse" that the switch operations "single block" and "dry run" are set in the specifications of the control panel 56. Further, it is displayed in "used component" of FIG. 44 that the program component 10 used by the mode reverse function creating unit 341A is the mode reverse process program component 10A.

Figure 45:
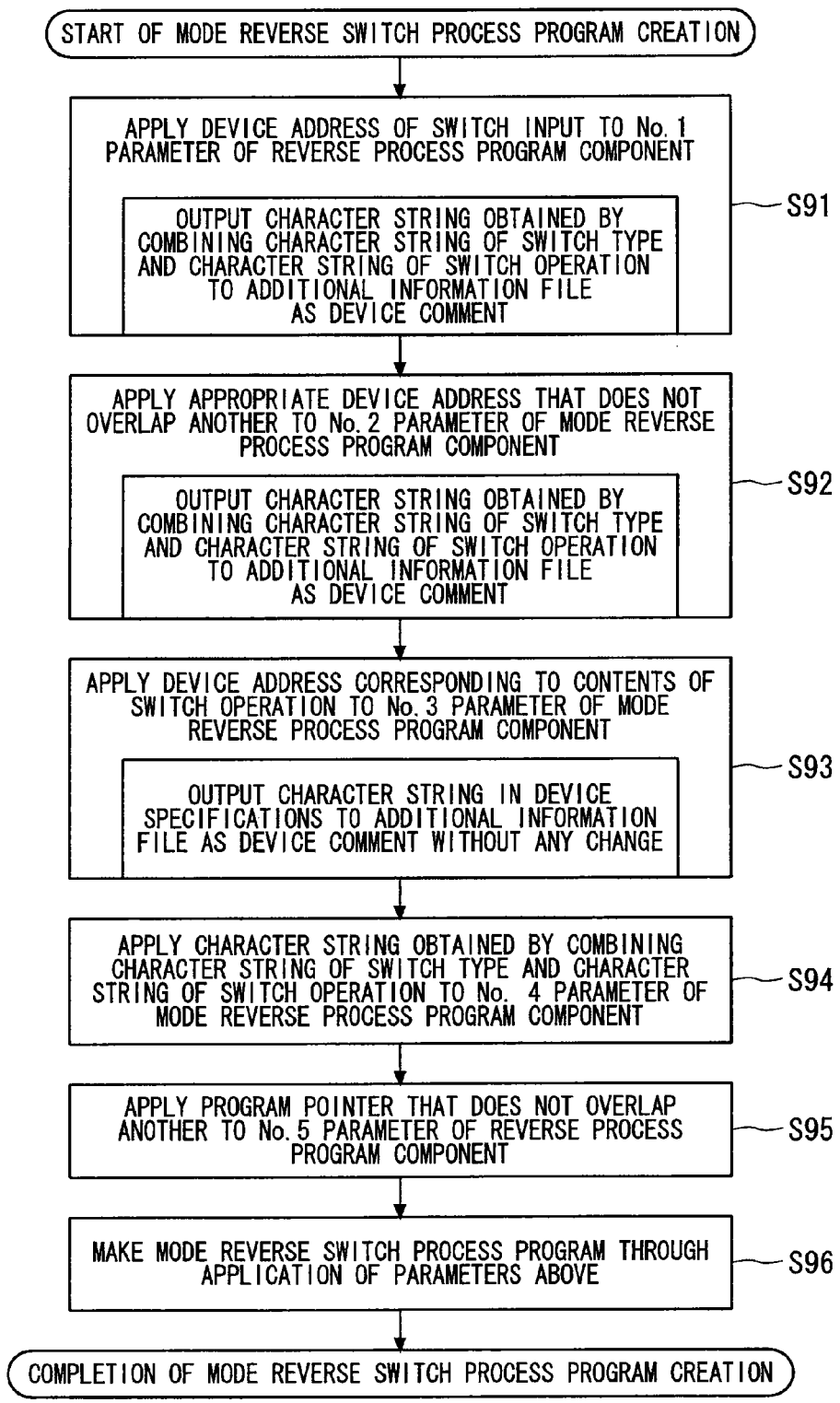
FIG. 45 is a flowchart showing an operation of the mode reverse function creating unit.

FIG. 45 is a flowchart showing the operation of the mode reverse function creating unit 341A in a case of creating a mode reverse switch process program. This operation is described below with reference to FIG. 45.

In Step S91, the mode reverse function creating unit 341A applies the device addresses set in the switch input in the specifications of the control panel 56 (FIG. 38) to No. 1 reuse parameter (in this case, VB1) of the mode reverse process program component 10A shown in FIG. 40. For example, the mode reverse function creating unit 341A reads the rows set as "mode reverse" from the specifications of the control panel 56 (FIG. 38) in order from the top (in this case, reads "single block" in the first row). Then, the mode reverse function creating unit 341A applies the device address (in this case, X280) set in the switch input of "single block" to No. 1 reuse parameter (VB1) of the mode reverse process program component 10A shown in FIG. 40. As a result, the left portion at the first stage of the mode reverse switch process program shown in FIG. 43 is created.

In Step S92, the mode reverse function creating unit 341A applies one internal and local device address that is not set in the specifications of the control panel 56 and the specifications of the M codes 50 (that is, appropriate device address that is not used in an overlapped manner) to No. 2 reuse parameter (in this case, VB2) of the mode reverse process program component 10A shown in FIG. 40. For example, the mode reverse function creating unit 341A applies M4000 to No. 2 reuse parameter (VB2) of the mode reverse process program unit 10A shown in FIG. 40 as a device address that is not set in the specifications of the control panel 56 and the specifications of the M codes 50. Note that the device addresses of M 4000s are device addresses that are not set in the specifications of the control panel 56 and the specifications of the M codes 50. The device addresses automatically assigned by the program creating unit 34 as described above may be held in the device specification holding unit 32 such that the device specification holding unit 32 is referred to. As a result, the right portion at the first stage and left portions at the second and third stages of the mode reverse switch process program shown in FIG. 43 are created.

In Step S93, the mode reverse function creating unit 341A extracts a device address corresponding to the contents of the field "switch operation" in the specifications of the control panel 56 (FIG. 38) from the device specifications (FIG. 35), and applies the device address to No. 3 reuse parameter (in this case, VB3) of the mode reverse process program component 10A shown in FIG. 40. For example, in the specifications of the control panel 56 shown in FIG. 38, "single block" is set in the field "switch operation". Accordingly, the mode reverse function creating unit 341A extracts a device address (in this case, YC12) corresponding to "single block" from the device specifications shown in FIG. 35, and applies YC12 to a reuse parameter represented as No. 3 reuse parameter (VB3) of the mode reverse process program component 10A shown in FIG. 40. As a result, the center portion and right portion at the second stage and the right portion at the third stage of the mode reverse switch process program shown in FIG. 43 are created.

In the description of Steps S91 to S93 above, the description has been given of the operation of applying the device specifications (FIG. 35) and the specifications of the control panel 56 (FIG. 38) to the reuse parameters VB1 to VB3 of the mode reverse process program component 10A by the mode reverse function creating unit 341A. The mode reverse function creating unit 341A according to the present embodiment also outputs device comments in the same Steps S91 to S93 in parallel with the above-mentioned operation.

Figures 46, 47:
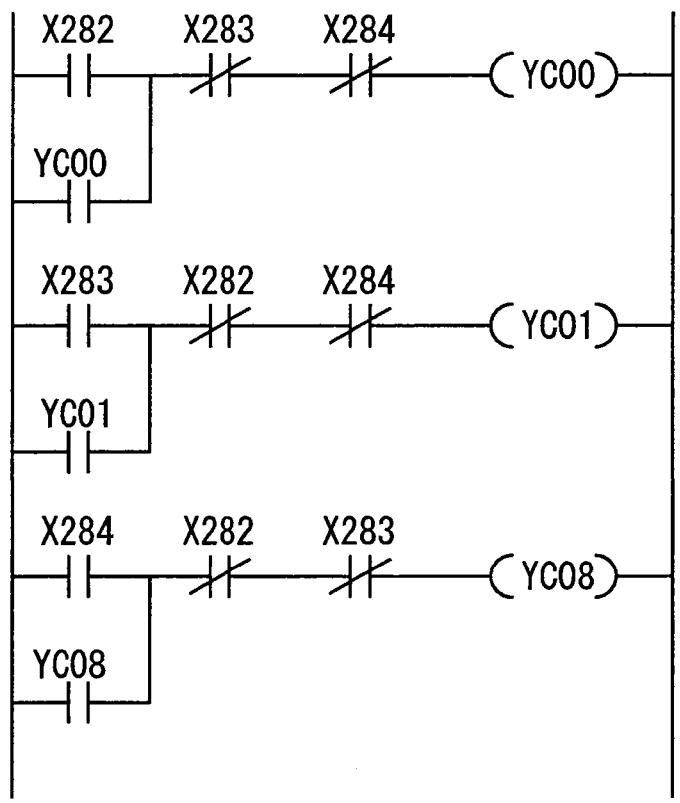
FIG. 46 is a diagram showing device comments obtained by the mode reverse function creating unit.
FIG. 47 is a diagram showing a control panel processing program created by an operation mode selection function creating unit.

Specifically, in Step S91, the mode reverse function creating unit 341A outputs the character string obtained by combining the character string of the switch type and the character string of the switch operation in the specifications of the control panel 56 (FIG. 38) to the additional information file 9 as the device comment of the device address of Step S91. Similarly, in Step S92, the mode reverse function creating unit 341A outputs the character string obtained by combining the character string of the switch type and the character string of the switch operation in the specifications of the control panel 56 to the additional information file 9 as the device comment of the device address of Step S92. In Step S93, the mode reverse function creating unit 341A outputs the character string of the name corresponding to the device address of Step S93 in the device specifications (FIG. 35) to the additional information file 9 as the device comment of the device address. The list of the device comments obtained through the above is shown in FIG. 46.

After Steps S91 to S93 above, in a case where the program comment shown in FIG. 40 is required, in Step S94, the mode reverse function creating unit 341A applies the character string obtained by combining the character string of the switch type and the character string of the switch operation as the program comment. For example, in a case where the switch type is the character string "mode reverse" and the switch operation is the character string "single block", the mode reverse function creating unit 341A creates the character string "mode reverse single block" as a program comment, which are provided preceding and following the program created in Steps S91 to S93. As a result, in FIG. 43, the character string "start of mode reverse single block" is provided preceding this program, and the character string "end of mode reverse single block" is provided following the program.

In Step S95, in a case where the jump label shown in FIG. 40 is required, the mode reverse function creating unit 341A selects a program pointer that is not used in another program and applies the selected program pointer as the jump label.

The mode reverse function creating unit 341A performs the operations of Steps S91 to S95 described above for all the switch operations regarding "mode reverse" among the specifications of the control panel 56 (FIG. 38). For example, in the specifications of the control panel 56 shown in FIG. 38, "dry run" of the second row is set as a switch operation of mode reverse in addition to "single block" of the first row, and accordingly the operations of Steps S91 to S95 are performed also for "dry run". Accordingly, the portion from "start of mode reverse dry run" to "end of mode reverse dry run" of the mode reverse switch process program shown in FIG. 43 is created. In the example shown in FIG. 43, a device address "M4001" that does not overlap M4000 is applied in "dry run".

In Step S96, the mode reverse function creating unit 341A treats the mode reverse process program component 10A to which the above-mentioned parameters have been applied as a mode reverse switch process program. As a result, a mode reverse switch process program shown in FIG. 43 is created from the specifications of the control panel 56 shown in FIG. 38.

FIG. 47 is a diagram showing an example of the control panel processing program created by the operation mode selection function creating unit 341B. Next, description is given of the operation of applying, by the operation mode selection function creating unit 341B, the device specifications (FIG. 35) and the specifications (FIG. 38) of the control panel 56 regarding "operation mode selection" to the reuse parameters of the self-holding process program component 10B shown in FIG. 3, to thereby create the control panel processing program for controlling operation mode selection shown in FIG. 47 from the self-holding process program component 10B. Note that the control panel processing program for controlling operation mode selection, which is created by the operation mode selection function creating unit 341B, is also referred to as an "operation mode selection switch processing program" in some cases. In the creation of the operation mode selection switch processing program, the operation mode selection function creating unit 341B sets the device comment, program comment and jump label similarly to the mode reverse function creating unit 341A. The description thereof and results thereof are omitted here.

Figures 48, 49:
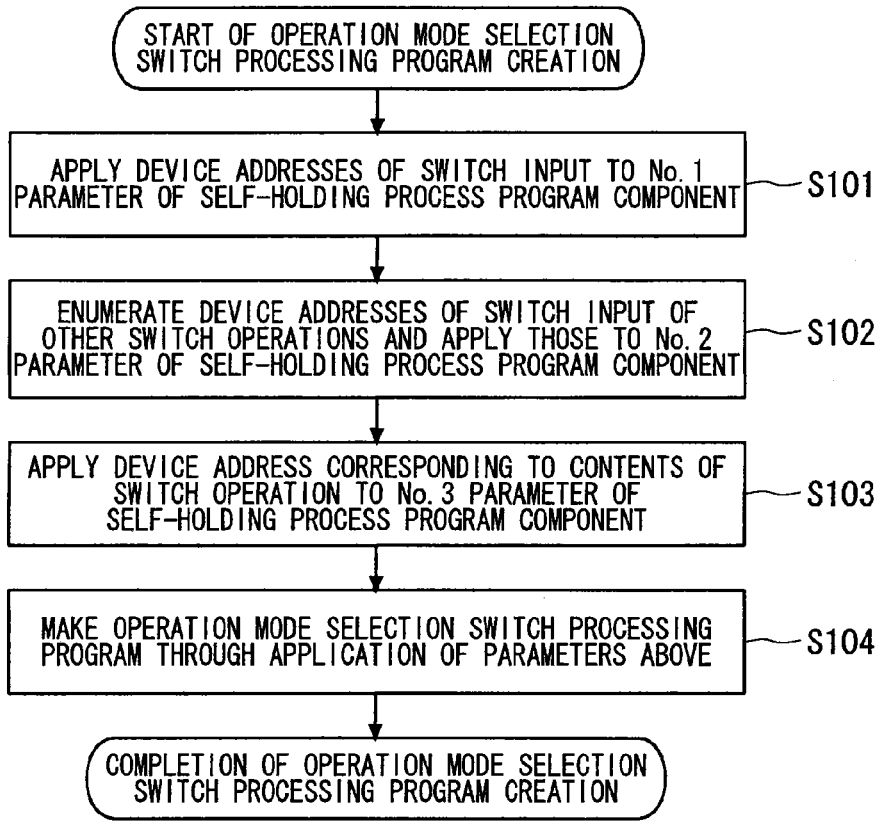
FIG. 48 is a diagram showing attributes of the operation mode selection function creating unit.
FIG. 49 is a flowchart showing an operation of the operation mode selection function creating unit.

FIG. 48 shows the attributes of the operation mode selection function creating unit 341B. Displayed in the switch type and switch operation of FIG. 48 are the contents regarding "operation mode selection" among the specifications of the control panel 56 (FIG. 38). It is displayed here in the switch type "operation mode selection" that the switch operations of "jog", "handle" and "memory" are set in the specifications of the control panel 56. "Used component" of FIG. 48 displays that the program component 10 used by the operation mode selection function creating unit 341B is the self-holding process program component 10B.

FIG. 49 is a flowchart showing the operation of the operation mode selection function creating unit 341B in a case of creating an operation mode selection switch processing program. This operation is described below with reference to FIG. 49.

In Step S101, the operation mode selection function creating unit 341B applies the device addresses set in the switch input in the specifications of the control panel 56 (FIG. 38) to No. 1 reuse parameter (in this case, VB1) of the self-holding process program component 10B shown in FIG. 3. For example, the operation mode selection function creating unit 341B reads the rows set as "operation mode selection" from the specifications of the control panel 56 (FIG. 38) in order from the top (in this case, reads "jog" of the third row). Then, the operation mode selection function creating unit 341B applies the device address (in this case, X282) set to the switch input of "jog" to No. 1 reuse parameter (VB1) of the self-holding process program component 10B shown in FIG. 3. As a result, the left portion at the first stage of the operation mode selection switch processing program shown in FIG. 47 is created.

In the switch "operation mode selection", when one switch operation is instructed from the control panel 56, the operation modes that have been instructed are canceled, and an operation mode of the instructed one switch operation is performed. For example, upon instruction of the switch operation "jog" from the control panel 56, the operation modes of "handle" and "memory" that have been instructed are canceled, and an operation mode of "jog" is performed. Upon instruction of the switch operation "handle" from the control panel 56, the operation modes of "jog" and "memory" that have been instructed are canceled, and the operation mode of "handle" is performed. Similarly to the above, the operation mode of "memory" is performed for the switch operation "memory".

Then, in Step S102, the operation mode selection function creating unit 341B enumerates the device addresses set in the switch input regarding the switch operations other than the switch operation of Step S101 among the switch operations in an operation selection mode, and applies those to No. 2 reuse parameter (in this case, VB2) of the self-holding process program component 10B shown in FIG. 3. For example, in a case where the switch operation of Step S101 is "jog", the operation mode selection function creating unit 341B enumerates the device addresses (in this case, X283 and X284) set in the switch input regarding "handle" and "memory" in FIG. 38, and applies those to No. 2 reuse parameter (VB2) of the self-holding process program component 10B shown in FIG. 3. As a result, the center portion at the first stage of the operation mode selection switch processing program shown in FIG. 47 is created.

In Step S103, the operation mode selection function creating unit 341B extracts the device address corresponding to the contents of the field "switch operation" in the specifications of the control panel 56 (FIG. 38) from the device specifications (FIG. 35), and applies the device address to No. 3 reuses parameter (in this case, VB3) of the self-holding process program component 10B shown in FIG. 3. For example, "jog" is set in the field "switch operation" in the specifications of the control panel 56 shown in FIG. 38, and accordingly, the operation mode selection function creating unit 341B extracts the device address (in this case, YC00) corresponding to "jog" from the device specifications shown in FIG. 35, and applies YC00 to No. 3 reuse parameter (VB3) of the self-holding process program component 10B shown in FIG. 3. As a result, the right portion at the first stage and the second stage of the operation mode selection switch processing program shown in FIG. 47 are created.

The operation mode selection function creating unit 341B performs the operations of Steps S101 to S103 described above for all the switch operations regarding "operation mode selection" among the specifications of the control panel 56 (FIG. 38). For example, in the specifications of the control panel 56 shown in FIG. 38, "handle" of the fourth row and "memory" of the fifth row are set as the switch operations in the operation mode selection in addition to "jog" of the third row, and accordingly, the operations of Step S101 to S103 are performed for each of "handle" and "memory". As a result, the third stage to the sixth stage of the operation mode selection switch processing program shown in FIG. 47 are created.

In Step S104, the operation mode selection function creating unit 341B treats the self-holding process program component 10B to which the above-mentioned parameters have been applied as the operation mode selection switch processing program. As a result, the operation mode selection switch processing program shown in FIG. 47 is created from the specifications of the control panel 56 shown in FIG. 38.

FIG. 29 described above is a diagram showing an example of the control panel processing program created by the cutting override function creating unit 341C. Next, description is given of the operation of applying, by the cutting override function creating unit 341C, the device specifications (FIG. 35) and the specifications of the control panel 56 (FIG. 38) regarding "cutting override" to the reuse parameters of the self-holding process program component 10B (FIG. 3) and numerical value setting process program component 10C (FIG. 27), to thereby create the control panel processing program for controlling cutting override shown in FIG. 29 from the self-holding process program component 10B and the numerical value setting process program component 10C. In the following, the control panel processing program for controlling cutting override, which is created by the cutting override function creating unit 341C, is also referred to as an "override switch processing program" in some cases. In the creation of the override switch processing program, the cutting override function creating unit 341 sets a device comment, a program comment and a jump label similarly to the mode reverse function creating unit 341A. The description thereof and results thereof are omitted here.

FIG. 50 shows the attributes of the cutting override function creating unit 341C. The contents regarding cutting override among the specifications of the control panel 56 (FIG. 38) are displayed in the switch type and switch operation of FIG. 50. It is displayed here in the switch type "cutting override" that the switch operations of "25", "50", "75" and "100" are set in the specifications of the control panel 56. Displayed in "used component" of FIG. 50 is that the program components 10 used by the cutting override function creating unit 341C are the self-holding process program component 10B and the numerical value setting process program component 10C.

Figure 51:
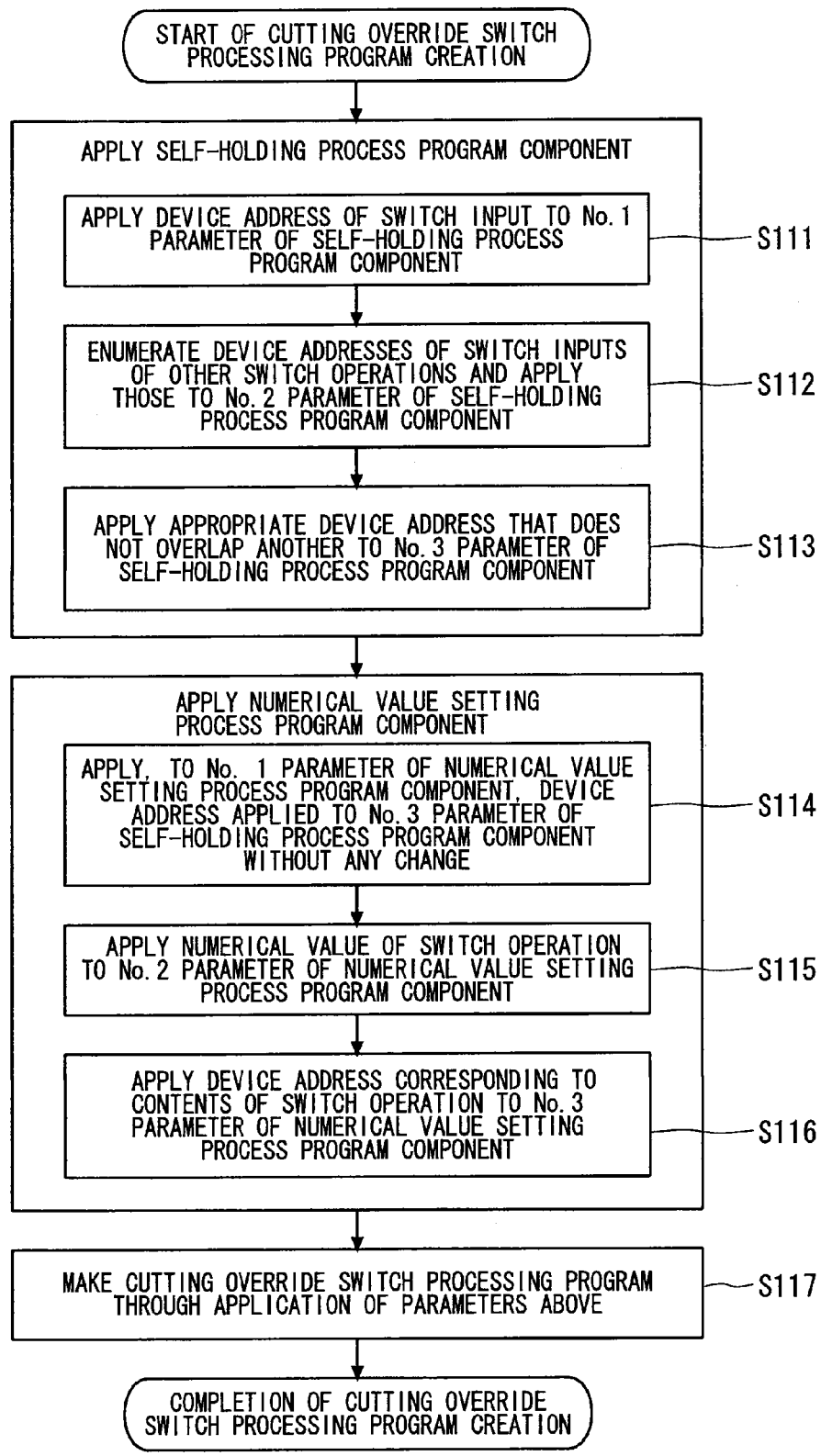
FIG. 51 is a flowchart showing an operation of the cutting override function creating unit.

FIG. 51 is a flowchart showing the operation of the cutting override function creating unit 341C in the case of creating the cutting override switch processing program. This operation is described below with reference to FIG. 51.

In Steps S111 to S113, the cutting override function creating unit 341C creates the cutting override switch processing program from the self-holding process program component 10B shown in FIG. 3.

In Step S111, the cutting override function creating unit 341C applies the device address set in the switch input in the specifications of the control panel 56 (FIG. 38) to No. 1 reuse parameter (in this case, VB1) of the self-holding process program component 10B shown in FIG. 3. For example, the cutting override function creating unit 341C reads the rows set as "cutting override" from the specifications of the control panel 56 (FIG. 38) in order from the top (in this case, reads "25" in the sixth row). Then, the cutting override function creating unit 341C applies the device address (in this case, X285) set in the switch input of "25" to No. 1 reuse parameter (in this case, VB1) of the self-holding process program component 10B shown in FIG. 3. As a result, the left portion at the first stage of the cutting override switch processing program shown in FIG. 29 is created.

In the switch "cutting override", upon instruction of one switch operation from the control panel 56, the operation modes that have been instructed are canceled and the operation mode of the instructed one switch operation is performed. For example, upon instruction of the switch operation "25" from the control panel 56, the operation modes of "50", "75" and "100" that have been instructed are canceled and the operation mode of "25" is performed. Upon instruction of the switch operation "50" from the control panel 56, the operation modes of "25", "'75" and "100" that have been instructed are canceled and the operation mode of "50" is performed. Similarly to the above, the operation modes of "75" and "100" are performed for the switch operations "75" and "100", respectively.

Then, in Step S112, the cutting override function creating unit 341C enumerates the device addresses set in the switch input regarding the switch operations other than the switch operation of Step S111 among the switch operations of cutting override, and applies those to No. 2 reuse parameter (in this case, VB2) of the self-holding process program component 10B shown in FIG. 3. For example, in a case where the switch input of Step S111 is "25", the cutting override function creating unit 341C enumerates the device addresses (in this case, X286 to X288) set in the switch input regarding "50", "75" and "100" in FIG. 38, and applies those to the reuse parameter (VB2) of the self-holding process program component 10B shown in FIG. 3. As a result, the center portion at the first stage of the cutting override switch processing program shown in FIG. 29 is created.

In Step S113, the cutting override function creating unit 341C applies one internal and local device address that is not set in the specifications of the control panel 56 and the specifications of the M codes 50 to No. 3 reuse parameter (in this case, VB3) of the self-holding process program component 10B shown in FIG. 3. For example, the cutting override function creating unit 341C applies M4002 to No. 3 reuse parameter (VB3) of the self-holding process program component 10B shown in FIG. 3 as a device address that is not set in the specifications of the control panel 56 and the specifications of the M codes 50. As a result, the right portion at the first stage and the second stage of the cutting override switch processing program shown in FIG. 29 are created.

Next, in Steps S114 to S116, the cutting override function creating unit 341C creates the cutting override switch processing program from the numerical value setting process program component 10C shown in FIG. 27.

In Step S114, the cutting override function creating unit 341C applies the device address applied to No. 3 reuse parameter (VB3) of the self-holding process program component 10B in Step S113 to No. 1 reuse parameter (VB1) of the numerical value setting process program component 10C shown in FIG. 27. For example, the cutting override function creating unit 341C applies M4002 applied to No. 3 reuse parameter (VB3) of the self-holding process program component 10B to No. 1 reuse parameter (VB1) of the numerical value setting process program component 10C shown in FIG. 27. As a result, the left portion at the third stage of the cutting override switch processing program shown in FIG. 29, in which the processing results of the self-holding process program are received in the numerical value setting process program, is created.

In Step S115, the cutting override function creating unit 341C applies, to No. 2 reuse parameter (in this case, VK2) of the numerical value setting process program component 10C shown in FIG. 27, the device address obtained by adding "K" preceding the numerical value set in the switch operation in the specifications of the control panel 56 (FIG. 38). For example, the cutting override function creating unit 341C applies, to No. 2 reuse parameter (VK2) of the numerical value setting process program component 10C shown in FIG. 27, the device address "K25" regarding the switch operation of "25" in the specifications of the control panel 56 (FIG. 38). As a result, the right portion at the third stage of the cutting override switch processing program shown in FIG. 29 is created.

In Step S116, the cutting override function creating unit 341C extracts a device address corresponding to the contents of the field "switch type" in the specifications of the control panel 56 (FIG. 38) from the device specifications (FIG. 35), and applies the device address to No. 3 reuse parameter (in this case, VD3) of the numerical value setting process program component 10C shown in FIG. 27. For example, in the specifications of the control panel 56 shown in FIG. 38, "cutting override" is set in the field "switch type". Accordingly, the cutting override function creating unit 341C extracts the device address (in this case, R2500) corresponding to "cutting override" from the device specifications shown in FIG. 35, and applies R2500 to No. 3 reuse parameter (VD3) of the numerical value setting process program component 10C shown in FIG. 27. As a result, the right portion at the third stage of the cutting override switch processing program shown in FIG. 29 is created.

The cutting override function creating unit 341 C performs the operations of Steps S111 to S116 described above for all the switch operations regarding "cutting override" among the specifications of the control panel 56 (FIG. 38). For example, in the specifications of the control panel 56 shown in FIG. 38, "50" of the seventh row, "75" in the eighth row and "100" of the ninth row are set as switch operations in addition to "25" of the sixth row, and thus, the operations of Steps S111 to S116 are performed for each of "50", "75" and "100". As a result, the fourth stage to the twelfth stage of the cutting override switch processing program shown in FIG. 29 are created.

In Step S117, the cutting override function creating unit 341C combines the self-holding process program component 10B and numerical value setting process program component 10C to which the above-mentioned parameters have been applied, to thereby make the cutting override switch processing program. As a result, the cutting override switch processing program shown in FIG. 29 is created from the specifications of the control panel 56 shown in FIG. 38.

The description has been given of the operation of creating the cutting override switch processing program by the cutting override function creating unit 341C, which is not always the case. Alternatively, the program hierarchical component that performs the process of exclusive selection numerical value setting described in the third embodiment with reference to FIG. 25 may be used as the cutting override function creating unit 341C. In this case, the cutting override function creating unit 341C creates the application relationship of the reuse parameters shown in FIG. 28 based on the device specifications (FIG. 35) and the specifications of the control panel 56 (FIG. 38) set as "cutting override".

Specifically, from the specifications of the control panel 56 (FIG. 38), the cutting override function creating unit 341C applies the device address (X285) set in the switch input in the sixth row in which the switch type "cutting override" is set to No. 1 parameter of the program hierarchical component as shown in FIG. 28, and applies the numerical value "25" set in the switch operation therein to No. 2 parameter of the program hierarchical component. Then, the cutting override function creating unit 341C applies the device address (M4002) in M4000s to No. 3 parameter of the program hierarchical component, and extracts the device address (R2500) corresponding to the switch type "cutting override" from the device specifications (FIG. 35) and applies R2500 to No. 4 parameter of the program hierarchical component.

Similarly, from the specifications of the control panel 56 (FIG. 38), the cutting override function creating unit 341C applies the device address (X286) set in the switch input in the seventh row in which the switch type "cutting override" is set to No. 1 parameter of the program hierarchical component, and applies the numerical value "50" set in the switch operation therein to No. 2 parameter of the program hierarchical component Then, the cutting override function creating unit 341C applies the device address (M4003) in M4000s to No. 3 parameter of the program hierarchical component. The cutting override function creating unit 341C performs similar process for the eighth row and ninth row in the specifications of the control panel 56 (FIG. 38), to thereby create the application relationship of the reuse parameters shown in FIG. 28. Then, the cutting override function creating unit 341C may perform an operation identical to the operation described in the third embodiment, to thereby create the cutting override switch processing program shown in FIG. 29.

<Creation of M Code Processing Program>

The description has been given of the operation of creating a control panel processing program by the control panel processing program creating unit 341 shown in FIG. 34. Described now is the operation of applying, by the M code processing program creating unit 342 shown in FIG. 34, that is, M code function creating unit 342A, the device specifications (FIG. 35) and the specifications of the M codes 50 shown in FIG. 39 to the reuse parameters of the program components 10 to create an M code processing program from the program components.

Figure 52:
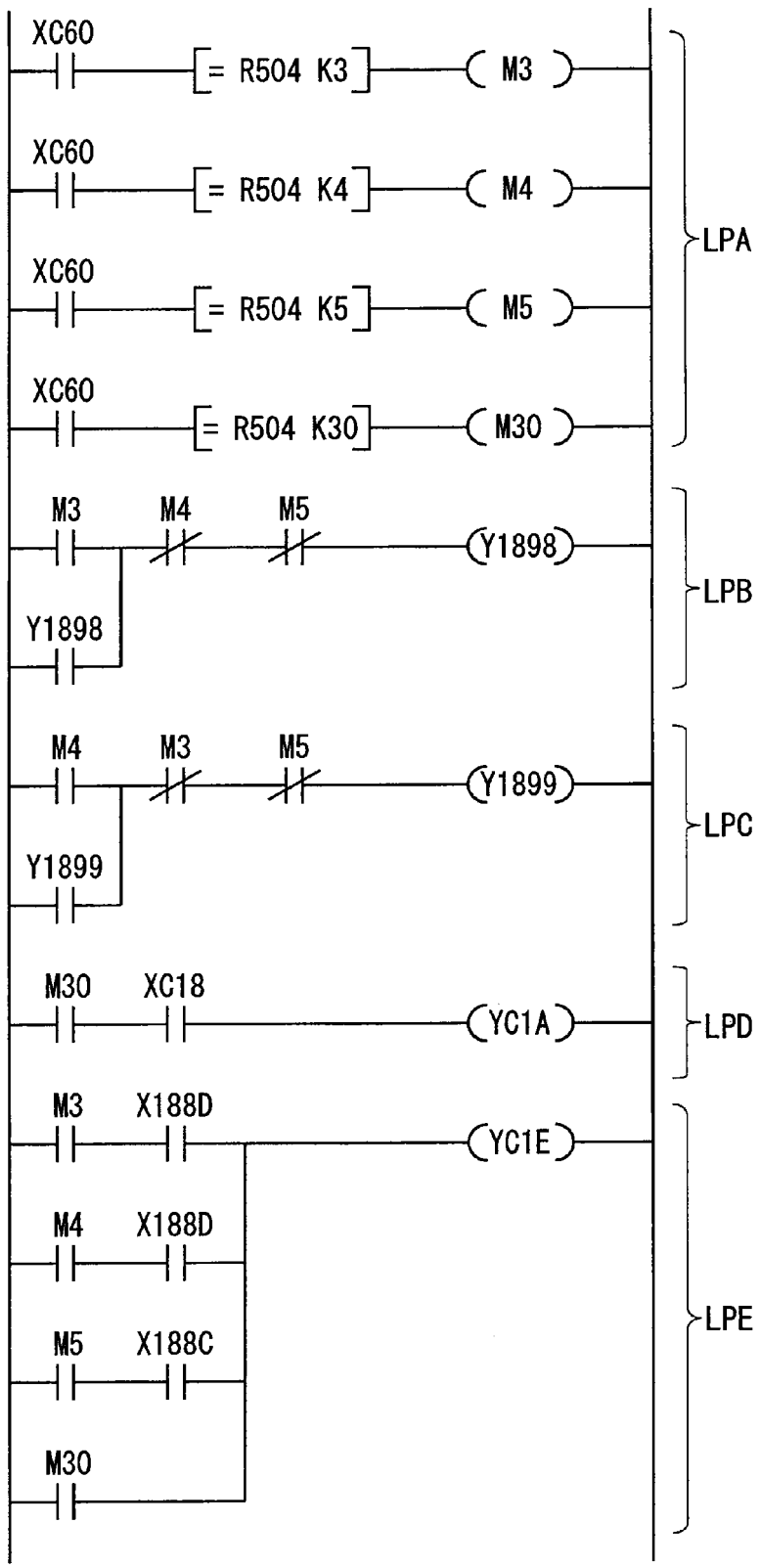
FIG. 52 is a diagram showing an M code processing program created by an M code function creating unit.

FIG. 52 is a diagram showing an example of the M code processing program created by the M code function creating unit 342A. The M code processing program shown in FIG. 52 consists of a decoding process program LPA for the M code 50, functional processing programs LPB, LPC and LPD for the M codes 50, and a completion process program LPE for the M code 50.

Figures 53, 54:
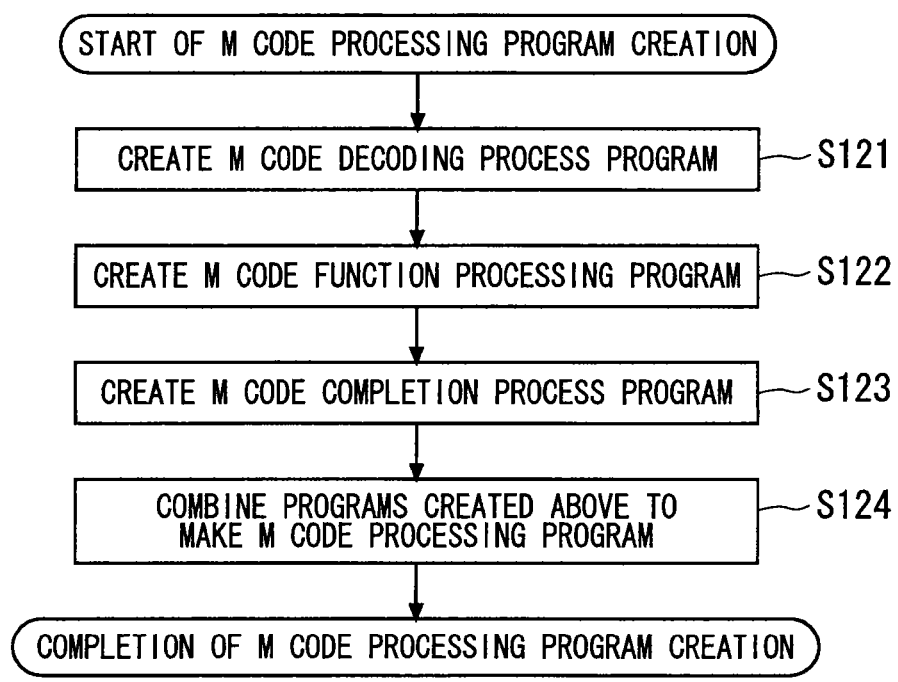
FIG. 53 is a diagram showing attributes of the M code function creating unit.
FIG. 54 is a flowchart showing an operation of the M code function creating unit.

FIG. 53 shows the attributes of the M code function creating unit 342A. It is displayed in "used component" of FIG. 53 that the program components 10 used by the M code function creating unit 342A are the M code decoding process program component 10D, self-holding process program component 10B, AND condition process program component 10E and M code completion process program component 10F.

FIG. 54 is a flowchart showing the operation of creating a decoding process program by the M code function creating unit 342A. This operation is described below with reference to FIG. 54.

In the present embodiment, in Step S121, the M code function creating unit 342A creates the decoding process program LPA for the M code 50 shown in FIG. 52 with the use of the M code decoding process program component 10D shown in FIG. 41. In Step S122, the M code function creating unit 342A creates the function processing programs LPB, LPC and LPD for the M codes 50 shown in FIG. 52 with the use of the self-holding process program component 10B shown in FIG. 3 and the AND condition process program component 10E shown in FIG. 42. In Step S123, the M code function creating unit 342A creates the completion process program LPE for the M code 50 shown in FIG. 52 with the use of the M code completion process program component 10F shown in FIG. 18. In Step S124, the M code function creating unit 342A combines the programs created in Steps S121 o S123 to create the M code processing program shown in FIG. 52.

The operation of creating the decoding process program LPA, function processing programs LPB, LPC and LPD, and completion process program LPE for the M codes 50 by the M code function creating unit 342A is described below in detail. First, the operation of creating the decoding process program LPA for the M code 50 by the M code function creating unit 342A is described.

FIG. 55 is a flowchart showing the operation of creating, by the M code function creating unit 342A, the decoding process program LPA for the M code 50 with the use of the M code decoding process program component 10D shown in FIG. 41. In the present embodiment, the M code function creating unit 342A performs each process shown in FIG. 55 for the setting of each row in the specifications of the M codes 50 (FIG. 39) in order from the top. Description is now given of the operation of performing, by the M code function creating unit 342A, the process for the setting of M3 in the specifications of the M codes 50 (FIG. 39) to create the first stage of the decoding process program LPA shown in FIG. 52.

In Step S131, the M code function creating unit 342A extracts a device address (in this case, XC60) corresponding to an M code strobe from the device specifications (FIG. 35), and applies the device address to No. 1 reuse parameter (in this case, VB1) of the M code decoding process program component 10D shown in FIG. 41.

In Step S132, the M code function creating unit 342A extracts a device address (in this case, R504) corresponding to the M code data from the device specifications (FIG. 35), and applies the device address to No. 2 reuse parameter (in this case, VD2) of the M code decoding process program component 10D shown in FIG. 41.

In Step S133, from the specifications of the M codes 50 (FIG. 39), the M code function creating unit 342A adds K preceding a numerical value (in this case, 3) of the M code number (in this case, M3) set in the field "M code" to create a character string (K3), and applies the character string to No. 3 reuse parameter (in this case, VK3) of the M code decoding process program component 10D shown in FIG. 41.

In Step S134, from the specifications of the M codes 50 (FIG. 39), the M code function creating unit 342A applies the M code number (in this case, M3) set in the field "M code" to No. 4 reuse parameter (in this case, VB4) of the M code decoding process program component 10D shown in FIG. 41 as a device address without any change.

Through the operations above, the first stage of the decoding process program LPA shown in FIG. 52 is created for the setting of M3 in the specifications of the M codes 50 (FIG. 39). The M code function creating unit 342A performs the operations of Steps S131 to S134 in order of the setting of M4, setting of M5, in the specifications of the M codes 50 (FIG. 39) until there can be found no setting. As a result, the second to fourth stages of the decoding process program LPA shown in FIG. 52 are created.

In Step S135, the M code function creating unit 342A treats the M code decoding process program component 10D to which the above-mentioned parameters have been applied as a decoding process program. As a result, the decoding process program LPA shown in FIG. 52 is created from the specifications of the M codes 50 shown in FIG. 39.

Next, description is given of the operation of creating the function processing programs LPB, LPC and LPD for the M codes 50 by the M code function creating unit 342A.

Figure 56:
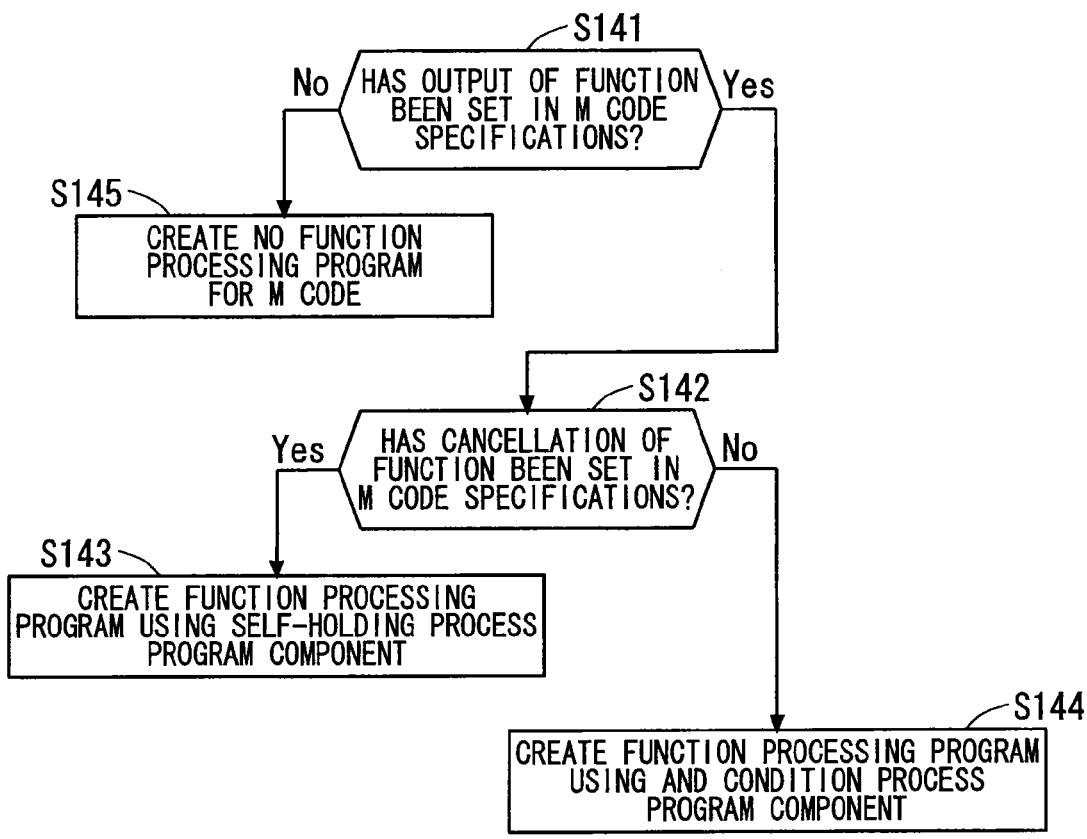
FIG. 56 is a flowchart showing an operation of creating a function processing program by the M code function creating unit.

FIG. 56 is a flowchart showing the operation of creating function processing programs of the respective M codes 50 by the M code function creating unit 342A. In the present embodiment, the M code function creating unit 342A performs the process shown in FIG. 56 for the setting of each row in the specifications of the M codes 50 (FIG. 39) in order from the top.

In Step S141, the M code function creating unit 342A judges whether an output of function has been set in a row to be processed in the specifications of the M codes 50 (FIG. 39). The M code function creating unit 342A proceeds to Step S142 in a case of judging that the output of function has been set, and proceeds to Step S145 in the other case. For example, in the setting shown in FIG. 39, the M code function creating unit 342A proceeds to Step S142 because the output of function has been set in the settings of M3, M4 and M30, or proceeds to Step S145 because the output of function has not been set in the setting of M5.

In Step S142, the M code function creating unit 342A judges whether the cancellation of function has been set in the row to be processed in the specifications of the M codes 50 (FIG. 39). The M code function creating unit 342A proceeds to Step S143 in a case of judging that the cancellation of function has been set or proceeds to Step S144 in the other case. For example, the M code function creating unit 342A proceeds to Step S143 because the cancellation of function has been set in the settings of M3 and M4, and proceeds to Step S144 because the cancellation of function has not been set in the setting of M30.

In Step S143, the M code function creating unit 342A creates a function processing program for the M code 50 based on the setting of the row to be processed in the specifications of the M codes 50 (FIG. 39) and the self-holding process program component 10B. For example, the M code function creating unit 342A creates the function processing programs LPB and LPC shown in FIG. 52 based on the settings of M3 and M4 in the specifications of the M codes 50 shown in FIG. 39 and the self-holding process program component 10B shown in FIG. 3, respectively. The operation in Step S143 is described below in detail. After that, the M code function creating unit 342A returns to Step S141, targeting the setting of the row below the one undergoing a current process in the specifications of the M codes 50 (FIG. 39).

In Step S144, the M code function creating unit 342A creates a function processing program for the M code 50 based on the setting of a row to be processed in the specifications of the M codes 50 (FIG. 39) and the AND condition process program component 10E. For example, the M code function creating unit 342A creates the function processing program LPD shown in FIG. 52 based on the setting of M30 in the specifications of the M codes 50 shown in FIG. 39 and the AND condition process program component 10E shown in FIG. 42. The operation in Step S144 is described below in detail. After that, in the specifications of the M codes 50 (FIG. 39), the M code function creating unit 342A returns to Step S141, targeting the setting of the row below the one undergoing a current process.

In Step S145, the M code function creating unit 342A does not create a function processing program for the M code 50, as to the setting of a row to be processed in the specifications of the M codes 50 (FIG. 39). For example, a function processing program for the M code 50 is not created, as to the setting of M5 in the specifications of the M codes 50 shown in FIG. 39. Therefore, as shown in FIG. 52, the function processing program LPD corresponding to the setting of M30 in the specifications of the M codes 50 is created below the function processing programs LPB and LPC corresponding to the settings of M3 and M4 in the specifications of the M codes 50. After Step S145, the M code function creating unit 342A returns to Step S141, targeting the setting of the row below the one undergoing a current processing in the specifications of the M codes 50 (FIG. 39).

Next, the operation of Step S143 described above is described.

FIG. 57 is a flowchart showing the operation of creating a function processing program by the M code function creating unit 342A in Step S143 described above, that is, in the case where the cancellation of function has been set in a row to be processed. Description is given below by taking, as an example, the operation of creating the function processing program LPB shown in FIG. 52 by the M code function creating unit 342A based on the setting of M3 in the specifications of the M codes 50 (FIG. 39).

First, in Step S151, from the specifications of the M codes 50 (FIG. 39), the M code function creating unit 342A applies the M code number (in this case, M3) set in the field "M code" to No. 1 reuse parameter (in this case, VB1) of the self-holding process program component 10B shown in FIG. 3 as a device address without any change.

In Step S152, the M code function creating unit 342A judges whether "after completion of block axis movement" has been set in the field "start of function" in the specifications of the M codes 50 (FIG. 39). The M code function creating unit 342A proceeds to Step S153 in a case of judging that "after completion of block axis movement" has been set or does not perform Step S153 and proceeds to Step S154 in the other case. In the setting of M3 shown in FIG. 39, "after completion of block axis movement" has not been set in the field "start of function", and accordingly Step S153 is not performed after Step S152 and Step S154 is performed.

In Step S153, the M code function creating unit 342A extracts device addresses corresponding to the completion of a movement instruction from the device specifications (FIG. 35), and enumerates the device addresses and applies those to No. 1 reuse parameter (in this case, VB1) of the self-holding process program component 10B shown in FIG. 3. If Step S153 is performed in the setting of M3 shown in FIG. 39, the M code function creating unit 342A extracts XC18 corresponding to the completion of movement instruction from the device specifications (FIG. 35), and adds the device address to M3 applied to No. 1 reuse parameter (VB1) of the self-holding process program component 10B in series.

In Step S154, from the specifications of the M codes 50 (FIG. 39), the M code function creating unit 342A applies the M code numbers (in this case, M4 and M5) set in the field "cancellation of function" to No. 2 reuse parameter (in this case, VB2) of the self-holding process program component 10B shown in FIG. 3 as device addresses without any change.

In Step S155, from the specifications of the M codes 50 (FIG. 39), the M code function creating unit 342A applies the device address (in this case, Y1898) set in the output of function to No. 3 reuse parameter (in this case, VB3) of the self-holding process program component 10B shown in FIG. 3.

In Step S156, the M code function creating unit 342A treats the self-holding process program component 10B to which the parameters above have been applied as a function processing program including the cancellation of function. As a result, the function processing program LPB shown in FIG. 52 is created based on the setting of M3 in the specifications of the M codes 50 shown in FIG. 39. The M code function creating unit 342A performs a similar operation also for the setting of M4 in the specifications of the M codes 50 (FIG. 39), to thereby create the function processing program LPC shown in FIG. 52.

Next, the operation of Step S144 above is described.

FIG. 58 is a flowchart showing the operation of creating a function processing program by the M code function creating unit 342A in Step S144 above, that is, in the case where the cancellation of function has not been set in a row to be processed. Description is given below of the operation of creating the function processing program LPD shown in FIG. 52 by the M code function creating unit 342A based on the setting of M30 in the specifications of the M codes 50 (FIG. 39).

First, in Step S161, from the specifications of the M codes 50 (FIG. 39), the M code function creating unit 342A applies the M code number (in this case, M30) set in the field "M code" to No. 1 reuse parameter (in this case, VB1) of the AND condition process program component 10E shown in FIG. 42 as a device address without any change.

In Step S162, the M code function creating unit 342A judges whether "after completion of block axis movement" has been set in the field "start of function" in the specifications of the M codes 50 (FIG. 39). The M code function creating unit 342A proceeds to Step S163 in a case of judging that "after completion of block axis movement" has been set or does not perform Step S163 and proceeds to Step S164 in the other case. In the setting of M30 shown in FIG. 39, "after completion of block axis movement" has been set in the field "start of function", and accordingly, Step S163 is performed after Step S162 and then Step S164 is performed.

In Step S163, the M code function creating unit 342A extracts device address corresponding to "completion of movement instruction" from the device specifications (FIG. 35), and enumerates the device address and applies it to No. 1 reuse parameter (in this case, VB1) of the AND condition process program component 10E shown in FIG. 42. Upon execution of Step S163 in the setting of M30 shown in FIG. 39, the M code function creating unit 342A extracts XC18 corresponding to "completion of movement instruction" from the device specifications (FIG. 35), and adds the device address to M30 applied to No. 1 reuse parameter (in this case, VB1) of the AND condition process program component 10E in series.

In Step S164, from the specifications of the M codes 50 (FIG. 39), the M code function creating unit 342A applies a device address (in this case, YC1A) set in "output of function" to No. 2 reuse parameter (in this case, VB2) of the AND condition process program component 10E shown in FIG. 42.

In Step S165, the M code function creating unit 342A treats the AND condition process program component 10E to which the parameters above have been applied as a function processing program that does not include "cancellation of function". Accordingly, the function processing program LPD shown in FIG. 52 is created based on the setting of M30 in the specifications of the M codes 50 shown in FIG. 39.

Next, description is given of the operation of creating the completion process program LPE for the M code 50 by the M code function creating unit 342A.

Figure 59:
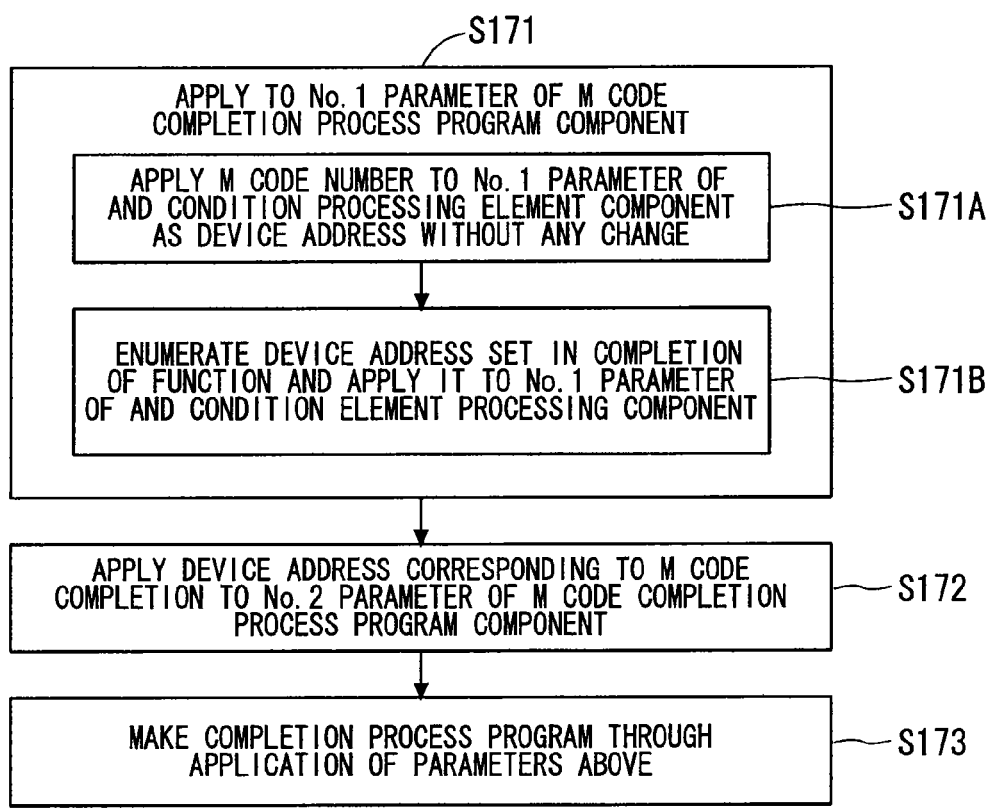
FIG. 59 is a flowchart showing an operation of creating a completion process program by the M code function creating unit.

FIG. 59 is a flowchart showing the operation of creating a completion process program for the M code 50 by the M code function creating unit 342A with the use of the M code completion process program component 10F shown in FIG. 18.

In Step S171, from the specifications of the M codes 50 (FIG. 39), the M code function creating unit 342A applies all the M code numbers (in this case, M3, M4, M5 and M30) set in the field "M code" to No. 1 parameter of the AND condition processing element component shown in FIG. 17, which corresponds to No. 1 parameter of the M code completion process program component 10F shown in FIG. 18, as device addresses without any change. Step S171 is described below in detail by division into Step S171A and Step S171B.

In Step S171A, from the specifications of the M codes 50 (FIG. 39), the M code function creating unit 342A applies the M code number set in the field "M code" of the first row to No. 1 reuse parameter (in this case, VB1) of the AND condition processing element component shown in FIG. 17 as a device address without any change. Then, in Step S171B, in a case where a device address has been set in "completion of function" in the first row, the M code function creating unit 342A enumerates (adds in series) the device address and applies it to No. 1 reuse parameter (in this case, VB1) of the AND condition processing element component shown in FIG. 17, and then returns to Step S171A and performs an operation similar to that of the first row for the settings of the second row and thereafter. Meanwhile, in a case where the device address has not been set in "completion of function" in the first row, in Step S171B, the M code function creating unit 342A returns to Step S171A without any change and performs an operation similar to that of the first row also for the settings of the second row and thereafter.

For example, in the setting of the first row shown in FIG. 39, the M code number set in the field "M code" is M3, and thus M3 is applied to VB1 of the AND condition processing element component. In the setting of the first row, a device address "X188D" is set in the field "completion of function", and thus X188D is enumerated (added in series) and applied to M3 applied to the AND condition processing element component. As a result, the left portion (M3 and X188D) at the first stage of the completion process program LPE shown in FIG. 52 is created.

Next, in the setting of the second row shown in FIG. 39, the M code number set in the field "M code" is M4, and thus M4 is applied to VB1 of the AND condition processing element component. In the setting of the second row, the device address "X188D" is set in the field "completion of function", and thus X188D is enumerated (added in series) and applied to M4 applied to the AND condition processing element component. Then, the M code function creating unit 342A adds the thus created program, below the program (M3 and X188D) obtained based on the setting of the first row in parallel. As a result, the second stage (M4 and X188D) of the completion process program LPE shown in FIG. 52 is created.

Similarly, in the setting of the third row shown in FIG. 39, the M code number set in the field "M code" is M5, and thus M5 is applied to VB1 of the AND condition processing element component. In the setting of the third row, the device address "X188C" is set in the field "completion of function", and thus X188C is enumerated (added in series) and applied to M5 applied to the AND condition processing element component. Then, the M code function creating unit 342A adds the thus created program, below the program (M4 and X188D) obtained based on the setting of the second row in parallel. As a result, the third stage (M5 and X188C) of the completion process program LPE shown in FIG. 52 is created.

Similarly, in the setting of the fourth row shown in FIG. 39, the M code number set in the field "M code" is M30, and thus M30 is applied to VB1 of the AND condition processing element component. In the setting of the fourth row, a device address is not set in the field "completion of function", and thus, the M code function creating unit 342A adds the program obtained by applying M30 to the AND condition processing element component, below the program (M5 and X188C) obtained based on the setting of the third row. As a result, the fourth stage (M30) of the completion process program LPE shown in FIG. 52 is created.

In Step S172, the M code function creating unit 342A extracts the device address (in this case, YC1E) corresponding to "completion of M code" from the device specifications (FIG. 35), and applies the device address to No. 2 reuse parameter (in this case, YC1E) of the M code completion process program component 10F shown in FIG. 18. As a result, the right side at the first stage of the completion process program LPE shown in FIG. 52 is created.

In Step S173, the M code function creating unit 342A treats the M code completion process program component 10F to which the parameters above have been applied as a completion process program for the M code 50. As a result, the completion process program LPE shown in FIG. 52 is created from the specifications of the M codes 50 shown in FIG. 39.

<Conclusion>

The operation of creating the control panel processing program by the control panel processing program creating unit 341 and the operation of creating the M code processing program by the M code processing program creating unit 342 have been described by taking the case where those programs are ladder programs as an example. The program editing unit 6 combines the control panel processing program created by the control panel processing program creating unit 341 and the M code processing program created by the M code processing program creating unit 342 to make the program of the CNC machine tool 46. On this occasion, a program may be created as one program or may be created through division in component units.

In the case of creation through division in component units, division may be performed in units of program components that constitute the program creation, such as division into a mode reverse switch process, an operation mode selection switch process, a cutting override switch process, an M code decoding process, an M code function process and an M code completion process (in this case, six divided programs are created), or division may be made roughly, such as division into a control panel process and an M code process (in this case, two divided programs are created). Alternatively, divided programs may be created by the same file, or may be created through classification into different files for each divided program.

Figure 60:
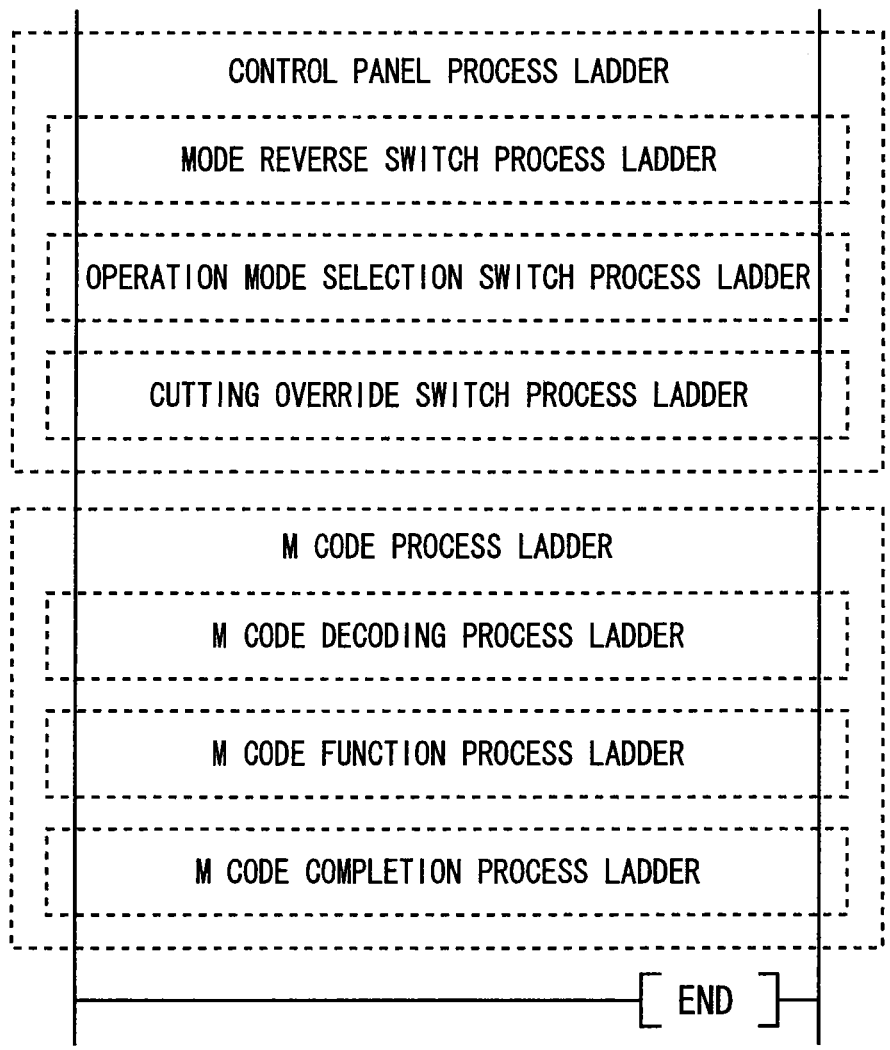
FIG. 60 is a diagram showing an example of a ladder program created by a program editing unit.
Figure 61:
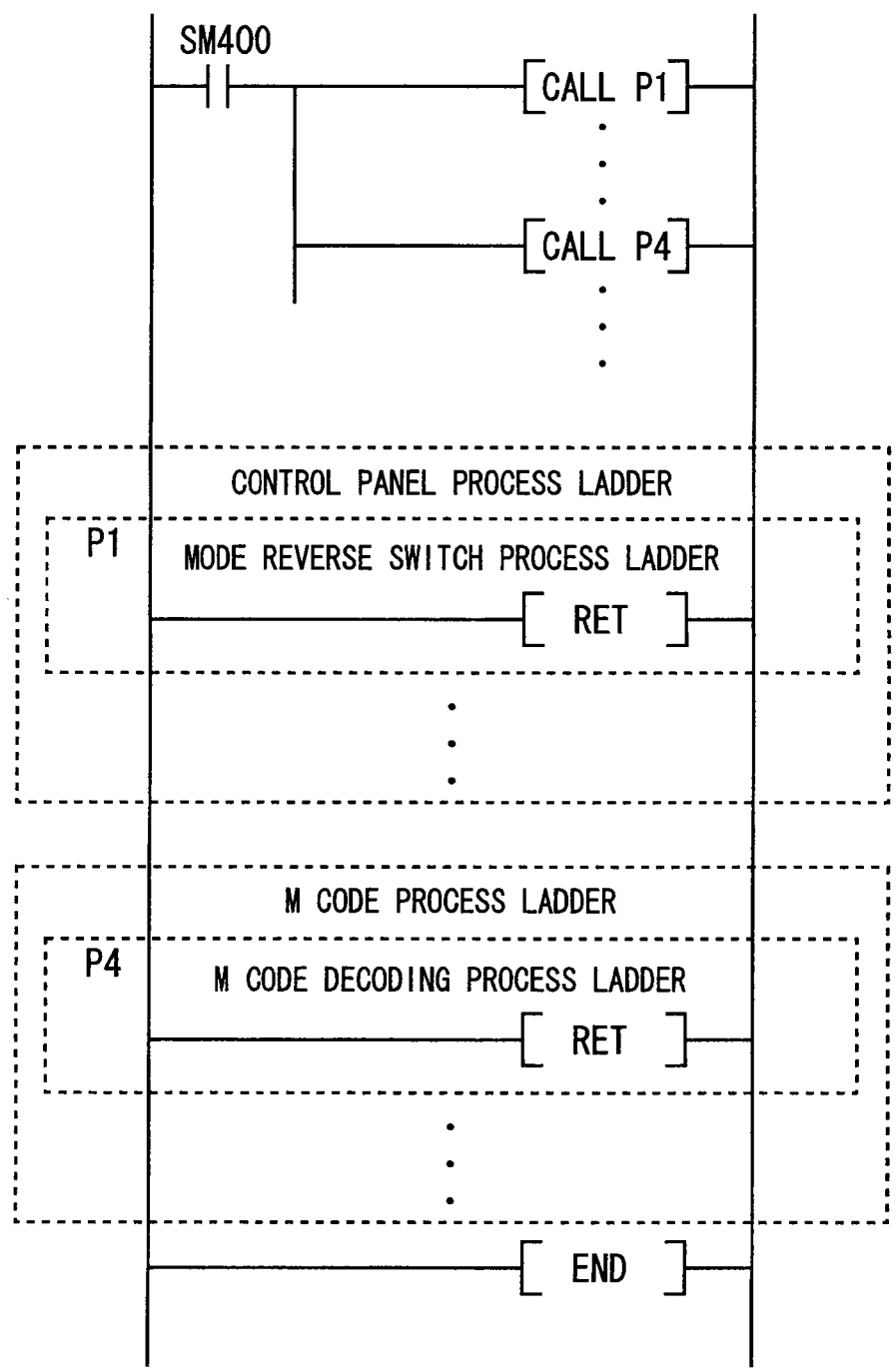
FIG. 61 is a diagram showing another example of the ladder program created by the program editing unit.

In a case where the program created by the program editing unit 6 is a ladder program, an END processing instruction is added to the last of the ladder program obtained by combining a control panel processing program and an M code processing program, which is treated as the ladder program of the CNC machine tool 46. In this case, the ladder program may be created as one ladder program as shown in FIG. 60 or may be created through division in component units as shown in FIG. 61. In the case of creation through division in component units, division may be performed in units of program components that constitute the program creation, such as division into a mode reverse switch process, an operation mode selection switch process, a cutting override switch process, an M code decoding process, an M code function process and an M code completion process (in this case, six divided ladder programs are created), or division may be made roughly, such as division into a control panel process and an M code process (in this case, two divided ladder programs are created). In the case of the division in component units, it is required to create a ladder program consisting of a call instruction for calling a division program to the head of the ladder program, and a program pointer being a jump label and a RET instruction need to be created in the head and end of the division program, respectively. Also in the case of creating those, it is possible to use the technology described in the present embodiment. Alternatively, the divided ladder programs may be created in the same file or may be created through division into a different file for each divided ladder program.

The provision of device comments to device addresses used in the creation of ladder programs is a convenience when checking ladder programs. For example, in the case of the control panel 56, it suffices that the control panel processing program creating unit 341 is configured so as to create a device comment for the device address set in the switch input, by combining a character string selected in "switch type" and a character string selected/set in "switch operation". Meanwhile, in the case of the M code 50, it suffices that the M code processing program creating unit 342 is configured so as to, for example, provide a character string set in "function name" to the same device address as the M code 50 as a device comment and create a device comment for the device set in "output of function" by combining a character string set in "name of function" and a character string set in "output of function".

In a specific example, a procedure thereof is similar to the procedure of the creation by combining device comments in the course of creating a program by the mode reverse function creating unit 341A, which has been described with reference FIG. 45, and through this procedure, the device comments shown in FIG. 43 are created.

According to the program creation support device 1 of the present embodiment described above, the specifications described in the specification description file 30 and the specifications set in the specification setting unit 31 are applied to parameters to be applied or parameters to be enumerated and applied in the reuse of program components 10, to thereby create a measurement, monitoring and control program executed by a controller or microcomputer from the program components 10. Accordingly, a program is created almost automatically, which enables to create a program that sufficiently operates with the functions described in the specifications without problems and to reduce the efforts in the creation of a program.

While the present invention has been shown and described in detail, the foregoing description is in all aspects illustrative, and the present invention is not limited thereto. That is, numerous modifications and variations can be devised in the described aspects without departing from the scope of the invention.

Description of Symbols

1 program creation support device, 2 microprocessor, 3 display unit, 4 input unit, 5 storage unit, 6 program editing unit, 8 program after being edited, 9 additional information file, 10 program component, 11 program component holding unit, 12 program component defining unit, 14 reuse parameter, 15 program element component defining unit, 17 program element component, 18 reuse parameter, 19 program hierarchical component defining unit, 21 program hierarchical component, 22 reuse parameter, 30 specification description file, 31 specification setting unit, 31A control panel specification setting unit, 31B M code specification setting unit, 32 device specification holding unit, 34 program creating unit, 341 control panel processing program creating unit, 342 M code processing program creating unit.

The invention claimed is:

1. A program creation support device, comprising:
a microprocessor;
a program component including at least one program element, for creating, upon a user setting a content of a reuse parameter corresponding to each program element,
a program in accordance with the set content;
a program component holding unit holding said program component; and
a program editing unit editing the program by reuse of said program component,
wherein said program element includes an ANDed program element indicating AND combination of the same program elements and an ORed program element indicating an OR combination of the same program elements, wherein
said ANDed program element creates, from the number of parameters that are set in the case of reusing, a program in which the program elements to which those parameters are applied are all ANDed, and said ORed program element creates, from the number of parameters that are set in the case of reusing, a program in which the program elements to which those parameters are applied are all ORed;
and said program creation support device further comprising a program component defining unit allowing a user to define a new program component,
wherein in a case of defining reuse parameters to be applied to respective elements of said new program component as component variables used for the description of said new program component, by defining in said program component defining unit, said new program component including at least one of said ANDed program element and said ORed program element,
said program creation support device allows the component variables to enumerate and set two or more parameters only in a case of defining reuse parameters to be applied to said ANDed program element as component variables used for the description of said new program component, and allows the component variables to enumerate and set two or more parameters only in a case of defining reuse parameters to be applied to said ORed program element as component variables used for the description of said new program component; and
said program creation support device, in accordance with the definitions of said component variables, upon parameters being enumerated and set in the reuse parameter of said new program component, maintains a logical structure between program elements constituting the program component, enumerates and applies parameters in reuse parameters of said ANDed program element or said ORed program element included in the program component, and creates via a microprocessor, a program including the same program elements where said parameters which being set to said ANDed program element are all said ANDed or the same program elements where said parameters which being set to said ORed program element are all said ORed.

2. A program creation support device, comprising:
a microprocessor;
a program component including at least one program element, for creating, upon a user setting a content of a reuse parameter corresponding to each program element,
a program in accordance with the set content;
a program component holding unit holding said program component; and
a program editing unit editing the program by reuse of said program component,
wherein said program component includes at least one of an ANDed program element indicating AND combination of the same program elements and an ORed program element indicating OR combination of the same program elements;
said program creation support device creates, upon a parameter being enumerated and set in the reuse parameter of said ANDed program element or said ORed program element, a program including the same program elements which are said ANDed or said ORed at the number of times corresponding to the number of said enumerated parameter;
said program component holding unit further holds a program element component that is usable as a constituent element of the program component and includes at least one program element, for creating, upon a user setting a content of a reuse parameter corresponding to each program element, a program in accordance with the set content;
said program element component is usable as a constituent element of another program element component;
said program component or said program element component includes at least one of an ANDed program element component indicating AND combination of the same program element components and an ORed program element component indicating OR combination of the same program element components; and
said program creation support device creates, upon a parameter being enumerated and set in the reuse parameter of said ANDed program element component or said ORed program element component, a program including the same program elements components which are is said ANDed or said ORed at the number of times corresponding to the number of said enumerated parameter.

3. The program creation support device according to claim 2, further comprising:
   a program element component defining unit allowing a user to define a new program element component; and
   a program component defining unit allowing a user to define said new program component using the program element component,
   wherein in a case where said new program element component including at least one of said ANDed program element component and said ORed program element component is defined in said program element component defining unit,
   said program creation support device creates, upon a parameter being enumerated and set in the reuse parameter of said ANDed program element component or said ORed program element component which is included in said new program element component, a program including the same program element components which are said ANDed or said ORed at the number of times corresponding to the number of said enumerated parameter,
   wherein in a case where said new program component including at least one of said ANDed program element and said ORed program element is defined in said program component defining unit,
   said program creation support device creates, upon a parameter being enumerated and set in the reuse parameter of said ANDed program element or said ORed program element which is included in said new program component, a program including the same program elements which are said ANDed or said ORed at the number of times corresponding to the number of said enumerated parameter.

4. The program creation support device according to claim 1, wherein:
   said program component holding unit further holds a program hierarchical component including at least one program component, for creating, upon a user setting a content of a reuse parameter associated with each program element of each program component, a program in accordance with the set content;
   said program editing unit is configured to edit the program by reuse of said program hierarchical component;
   said program hierarchical component is usable as a constituent element of another program hierarchical component;
   said program creation support device creates, upon a plurality of parameters being enumerated and set in the reuse parameter, a program in which a plurality of program components corresponding to the respective parameters are combined; and
   said program creation support device further comprising a program hierarchical component defining unit allowing a user to define a new program hierarchical component using the program component,
   wherein in a case where said new program hierarchical component including said program component including at least one of said ANDed program element and said ORed program element is defined in said program hierarchical component defining unit,
   said program hierarchical component defining unit selects a parameter one by one from a plurality of parameters defined as reuse parameters of said new program hierarchical component and performs, per selection, a definition of applying the selected one parameter to reuse parameters of said program component and a definition of enumerating and applying all parameters excluding the selected one parameter to reuse parameters of said program component; and
   said program creation support device creates a program in accordance with said definition by said program hierarchical component defining unit, upon applying a plurality of parameters being enumerated and set as reuse parameters of said new program hierarchical component, to said program component in said program hierarchical component.

5. The program creation support device according to claim 1, wherein said program editing unit further includes means for creating additional information regarding the program after being edited, based on the parameters set for each reuse parameter.

6. The program creation support device according to claim 1, wherein said program editing unit further includes a program creating unit applying predetermined specifications described in a specification description file to said reuse parameter of the program component held by said program component holding unit to create a program from said program component.

7. The program creation support device according to claim 6, further comprising a specification setting unit setting predetermined specifications,
   wherein said program creating unit applies the predetermined specifications set by said specification setting unit to said reuse parameter of the program component held by said program component holding unit to create a program from said program component.

8. A method implemented by a program creation support device, comprising:
   creating, via a program component including at least one program element and upon a user setting a content of a reuse parameter corresponding to each program element, a program in accordance with the set content;
   holding said program component; and
   editing the program by reuse of said program component, wherein
      said program includes an ANDed program element indicating AND combination of the same program elements and an ORed program element indicating OR combination of the same program elements, wherein
      said ANDed program element creates, from the number of parameters that are set in the case of reusing, a program in which the program elements to which those parameters are applied are all ANDed, and said ORed program element creates, from the number of parameters that are set in the case of reusing, a program in which the program elements to which those parameters are applied are all ORed; and
   said program creation support device further comprising a program component defining unit allowing a user to define a new program component,
      wherein in a case of defining reuse parameters to be applied to respective elements of said new program component as component variables used for the description of said new program component, by defining in said program component defining unit, said new program component including at least one of said ANDed program element and said ORed program element,
      said program creation support device allows the component variables to enumerate and set two or more parameters only in a case of defining reuse parameters to be applied to said ANDed program element as component variables used for the description of said new program component, and allows the component variables to enumerate and set two or more parameters only in a case of defining reuse parameters to be applied to said ORed program element as component variables used for the description of said new program component; and said program creation support device, via a microprocessor and in accordance with the definitions of said component variables, upon parameters being enumerated and set in the reuse parameter of said new program component, maintains a logical structure between program elements constituting the program component, enumerates and applies parameters in reuse parameters of said ANDed program element or said ORed program element included in the program component, and creates via a microprocessor, a program including the same program elements where said parameters which being set to said ANDed program element are all said ANDed or the same program elements where said parameters which being set to said ORed program element are all said ORed.

9. A non-transitory computer-readable medium storing computer-readable instructions thereon which when executed by a computer of a program creation support device cause the computer to perform a method comprising:

creating, via a program component including at least one program element and upon a user setting a content of a reuse parameter corresponding to each program element, a program in accordance with the set content;

holding said program component; and editing the program by reuse of said program component, wherein said program includes an ANDed program element indicating AND combination of the same program elements and an ORed program element indicating an OR combination of the same program elements, wherein said ANDed program element creates, from the number of parameters that are set in the case of reusing, a program in which the program elements to which those parameters are applied are all ANDed, and said ORed program element creates, from the number of parameters that are set in the case of reusing, a program in which the program elements to which those parameters are applied are all ORed; and said program creation support device further comprising a program component defining unit allowing a user to define a new program component, wherein in a case of defining reuse parameters to be applied to respective elements of said new program component as component variables used for the description of said new program component, by defining in said program component defining unit, said new program component including at least one of said ANDed program element and said ORed program element, said program creation support device allows the component variables to enumerate and set two or more parameters only in a case of defining reuse parameters to be applied to said ANDed program element as component variables used for the description of said new program component, and allows the component variables to enumerate and set two or more parameters only in a case of defining reuse parameters to be applied to said ORed program element as component variables used for the description of said new program component; and said program creation support device, in accordance with the definitions of said component variables, upon parameters being enumerated and set in the reuse parameter of said new program component, maintains a logical structure between program elements constituting the program component, enumerates and applies parameters in reuse parameters of said ANDed program element or said ORed program element included in the program component, and creates via a microprocessor, a program including the same program elements where said parameters which being set to said ANDed program element are all said ANDed or the same program elements where said parameters which being set to said ORed program element are all said ORed.

* * * * *